US012645170B2

(12) United States Patent
Takeuchi et al.

(10) Patent No.: US 12,645,170 B2
(45) Date of Patent: Jun. 2, 2026

(54) IMAGE FORMING APPARATUS

(71) Applicant: CANON KABUSHIKI KAISHA, Tokyo (JP)

(72) Inventors: Toshiaki Takeuchi, Shizuoka (JP); Joji Goto, Shizuoka (JP); Takayuki Yada, Shizuoka (JP); Shuichi Gofuku, Shizuoka (JP); Yoshiteru Kaida, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/982,033

(22) Filed: Dec. 16, 2024

(65) Prior Publication Data

US 2025/0208536 A1 Jun. 26, 2025

(30) Foreign Application Priority Data

Dec. 21, 2023 (JP) ................................ 2023-215718

(51) Int. Cl.
*G03G 15/08* (2006.01)
*G03G 15/00* (2006.01)

(52) U.S. Cl.
CPC ..... *G03G 15/0877* (2013.01); *G03G 15/0865* (2013.01); *G03G 15/0891* (2013.01); *G03G 15/50* (2013.01); *G03G 15/70* (2013.01)

(58) Field of Classification Search
CPC .......... G03G 15/0865; G03G 15/0877; G03G 15/0891; G03G 15/50; G03G 15/70
(Continued)

(56) References Cited

U.S. PATENT DOCUMENTS 9,904,211 B2 2/2018 Sato
10,146,156 B2 12/2018 Sato
(Continued)

FOREIGN PATENT DOCUMENTS

JP 2004-347726 A 12/2004
JP 2017-072703 A 4/2017
(Continued)

OTHER PUBLICATIONS

Toshiaki Takeuchi et al., U.S. Appl. No. 18/950,367, filed Nov. 18, 2024.
(Continued)

*Primary Examiner* — Hoan H Tran
(74) *Attorney, Agent, or Firm* — VENABLE LLP

(57) ABSTRACT

An image forming apparatus including a toner cartridge including a first chamber, a discharging port, a second chamber communicated with the discharging port, and a conveying member to convey toner in the first chamber toward the second chamber; an apparatus main body including a toner storing unit provided with a receiving port, and a control unit; and an air supply unit supplying air. The control unit is configure to execute: a first operation in which the conveying member conveys toner from the first chamber toward the second chamber and the air supply unit supplies air from the discharging port toward the receiving port through the second chamber; and a second operation in which the conveying member does not convey toner from the first chamber toward the second chamber, and the air supply unit supplies air from the discharging port toward the receiving port through the second chamber.

14 Claims, 40 Drawing Sheets

(58) Field of Classification Search
USPC ................. 399/107, 110, 111, 260, 262, 263
See application file for complete search history.

(56) References Cited

U.S. PATENT DOCUMENTS

| | | | | |
|---|---|---|---|---|
| 10,670,986 | B2 | 6/2020 | Gofuku et al. | |
| 11,442,379 | B2 * | 9/2022 | Kawamura ........ | G03G 15/0887 |
| 12,393,153 | B2 * | 8/2025 | Hayashida ......... | G03G 15/0896 |

FOREIGN PATENT DOCUMENTS

| | | | |
|---|---|---|---|
| JP | 2023-158936 | A | 10/2023 |
| JP | 2023-178903 | A | 12/2023 |

OTHER PUBLICATIONS

Yosuke Kashiide et al., U.S. Appl. No. 19/069,319, filed Mar. 4, 2025.

* cited by examiner

F–F

D–D

E–E

IMAGE FORMING APPARATUS

BACKGROUND OF THE INVENTION

Field of the Invention

The present invention relates to an image forming apparatus using an electrophotographic system.

Description of the Related Art

As an image forming apparatus, an image forming apparatus using an electrophotographic system (e.g. laser beam printer) is known.

Further, a cartridge containing toner (toner cartridge), which is detachable (replaceable) and supplies toner to a developing unit (e.g. developing roller) in the image forming apparatus is known (Japanese Patent Application Publication No. 2017-72703).

SUMMARY OF THE INVENTION

The present invention provides an image forming apparatus having a function to clean toner in an area around a discharging port of a toner cartridge.

The image forming apparatus includes: a toner cartridge; an apparatus main body from which the toner cartridge is detachable; and an air supply unit. The toner cartridge includes: a first chamber storing toner; a discharging port through which the toner in the first chamber is discharged to an outside of the toner cartridge; a second chamber communicated with the discharging port and provided closer to the discharging port than the first chamber is; and a conveying member conveying the toner in the first chamber toward the second chamber by a rotation of the conveying member. The apparatus main body includes: a toner storing unit provided with a receiving port for receiving toner discharged from the discharging port and storing toner; and a control unit. The air supply unit supplies air such that the toner in the second chamber is conveyed from the discharging port toward the receiving port. The control unit is configured to execute: a first operation in which the conveying member conveys toner from the first chamber toward the second chamber, and the air supply unit supplies air from the discharging port toward the receiving port through the second chamber; and a second operation in which the conveying member does not convey toner from the first chamber toward the second chamber, and the air supply unit supplies air from the discharging port toward the receiving port through the second chamber.

Further features of the present invention will become apparent from the following description of exemplary embodiments with reference to the attached drawings.

DESCRIPTION OF THE EMBODIMENTS

Example 1

FIGS. 1A to 1D are cross-sectional views indicating a laser printer, which is an example of an image forming apparatus according to an embodiment of the present invention. Dimensions, materials and shapes of components related to the image forming apparatus indicating the following embodiment, and relative positions thereof, may be appropriately changed in accordance with a configuration and various conditions of an apparatus to which the present invention is applied, and therefore are not intended to limit the scope of the present invention unless otherwise specified.

General Configuration of Laser Printer

Figure 2:
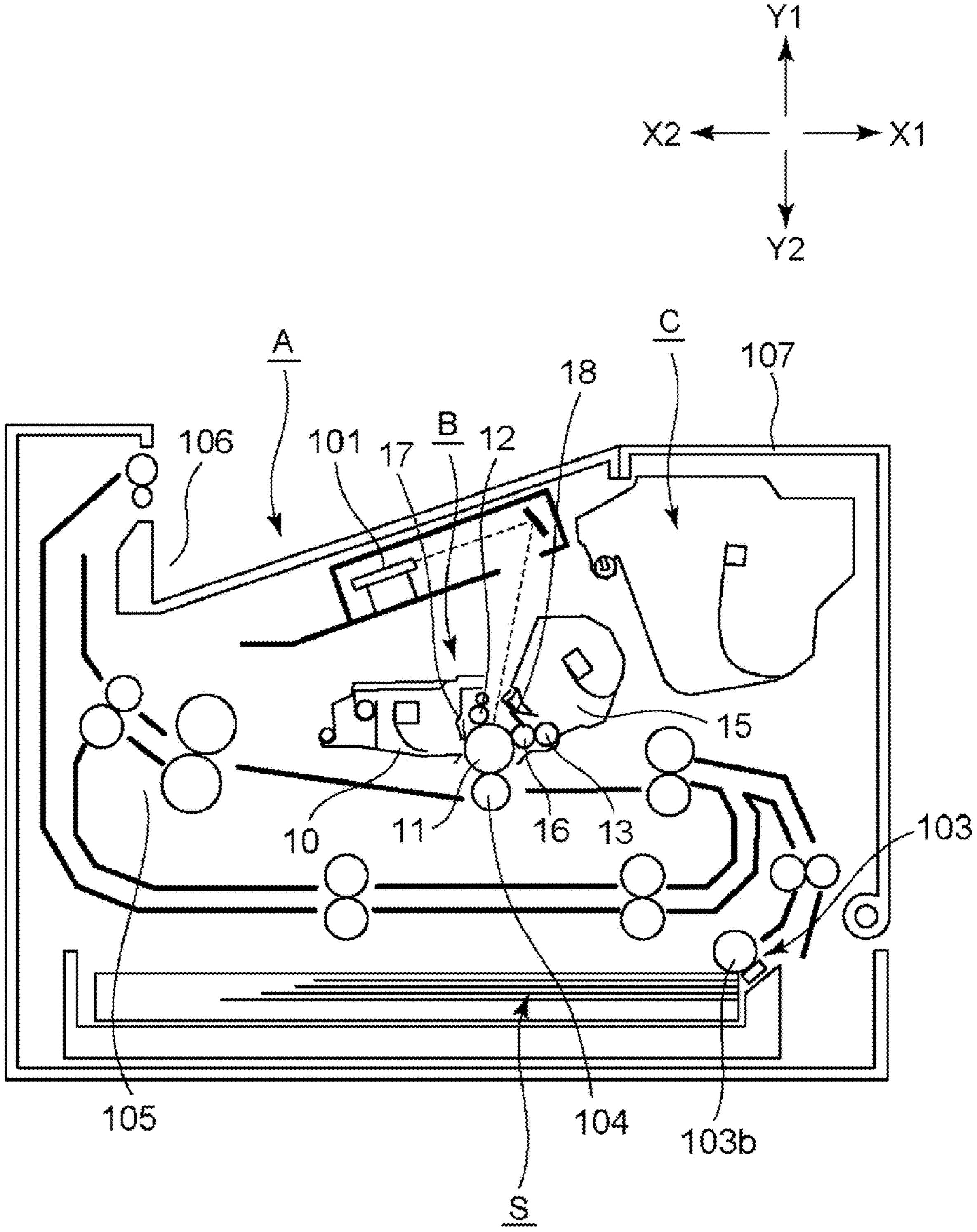
FIG. 2 is a cross-sectional view indicating a laser printer, which is an example of an image forming apparatus according to an embodiment of the present invention.

As illustrated in FIG. 2, a laser printer 1 (image forming apparatus) according to this example includes a printer main body A, where a process cartridge B and a toner cartridge C are attachable and detachable. An attaching and detaching method of the process cartridge B and the toner cartridge C to and from the printer main body A will be described in detail later.

In the printer main body A, a sheet feeding unit 103, a transfer roller 104, a fixing unit 105, and a laser scanner 101 are disposed. The process cartridge B and the toner cartridge C can be attached to the printer main body A, so as to locate on the upper side and the front side in the laser printer 1.

Here the upper side in the laser printer 1 is the Y1 direction indicated in FIG. 2. The lower side in the laser printer 1 is the Y2 direction indicated in FIG. 2, and is the opposite direction of the Y1 direction. The front side (front face side) in the laser printer 1 is the X1 direction indicated in FIG. 2. The rear side (rear face side) in the laser printer 1 is the X2 direction indicated in FIG. 2, and is the opposite direction of the X1 direction. In the installation position (normal attitude) of the laser printer 1, a storing unit of sheet S (recording material) is located on the lower side of the apparatus, a door 107 is located on the upper side of the apparatus, and in this state, a bottom face (side of the storing unit of sheet S) of the laser printer 1 faces the gravity direction.

Figure 3:
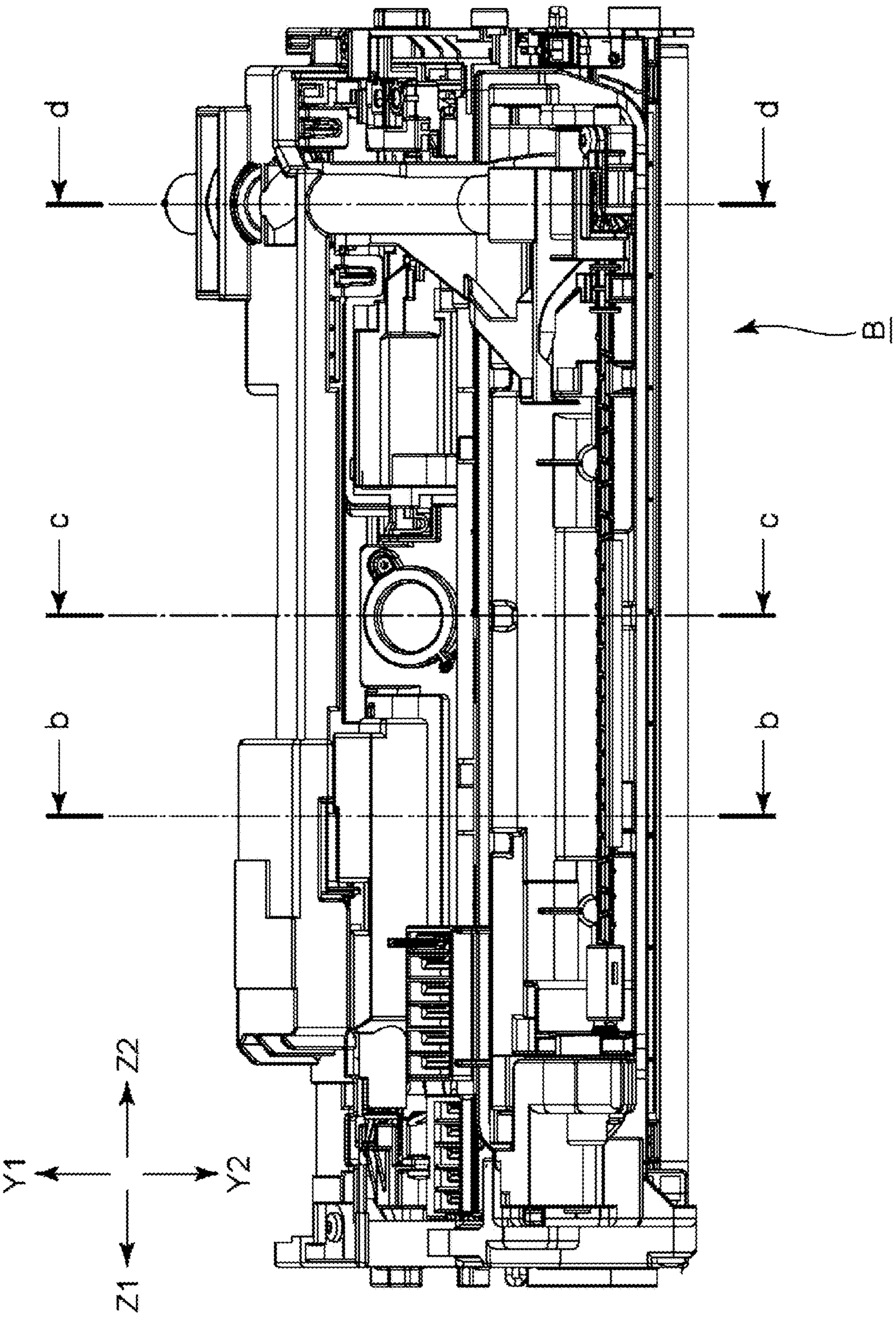
FIG. 3 is a front view of a process cartridge according to an example of the present invention, in a state of viewing the process cartridge in an X1 direction indicated in FIG. 2.
Figure 4:
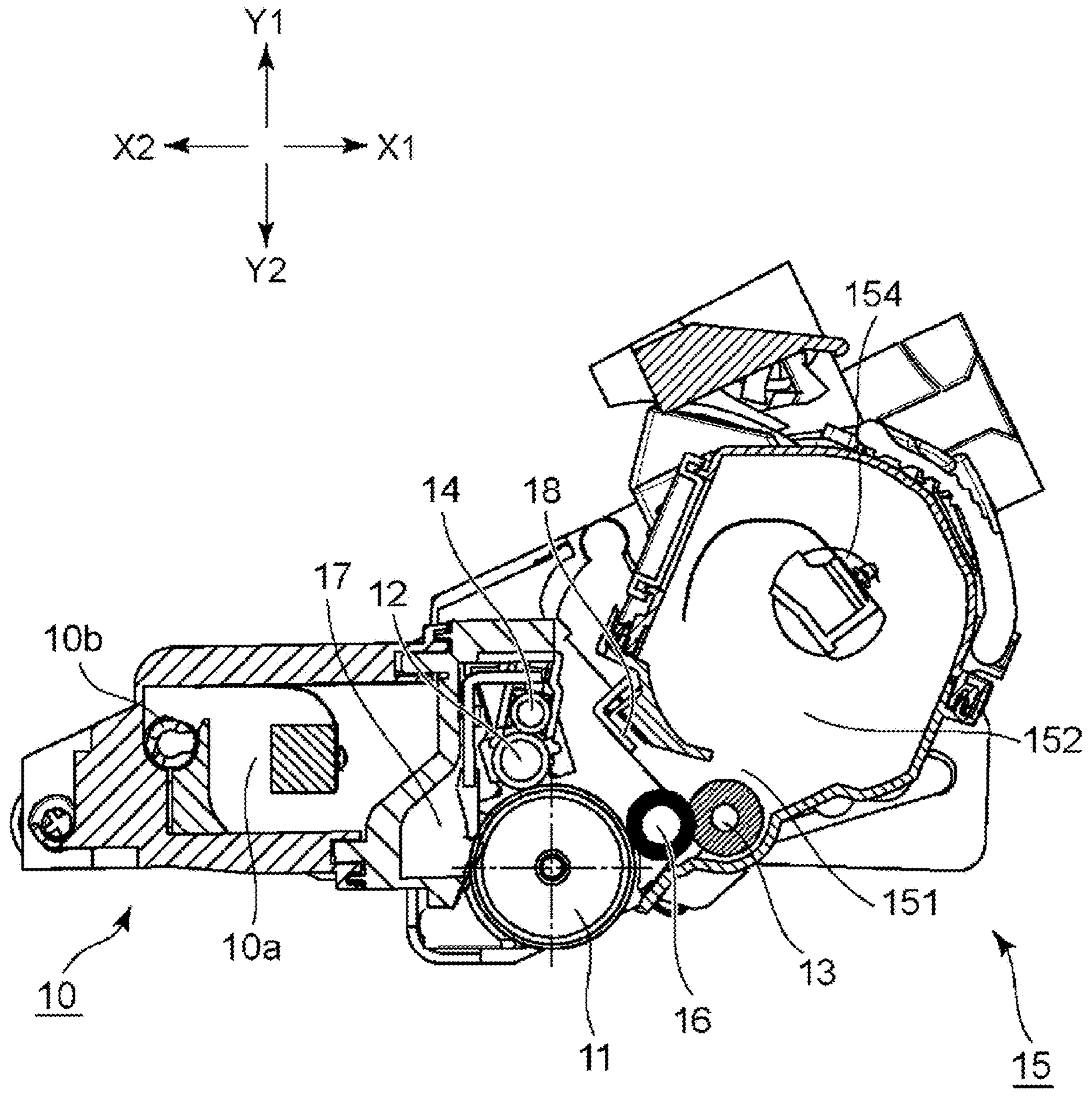
FIG. 4 is a principal sectional view (cross section at the c-c line in FIG. 3) indicating a configuration of the processing cartridge according to an example of the present invention.

The process cartridge B will be described with reference to FIGS. 3 and 4. FIG. 3 is a front view of the process cartridge B according to an example of the present invention, and indicates a state of viewing the process cartridge B in the X1 direction indicated in FIG. 2. FIG. 4 is a principal cross-sectional view (cross section at the c-c line indicated in FIG. 3) indicating a configuration of the process cartridge B according to an example of the present invention.

As illustrated in FIG. 4, the process cartridge B according to this example is constituted of: a cleaning unit 10 (first unit) which includes a photosensitive drum (drum unit) 11 as an image bearing member; and a developing unit 15 (second unit). The developing unit 15 includes a developing roller 16 as a developing unit for bearing developer (toner).

The cleaning unit 10 includes: a cleaning blade 17; a charging roller 12, a charging roller cleaner 14, a waste toner primary storing portion 10*a*, a first waste toner conveying path 10*b*, and a second waste toner conveying path 10*c* (see FIG. 20), and rotatably supports the photosensitive drum 11. The cleaning blade 17 functions as a cleaning unit for the photosensitive drum 11. The charging roller 12 functions as a charging unit for the photosensitive drum 11. The charging roller cleaner 14 functions as a cleaning unit for the charging roller 12. In this example, an axis, which is parallel with the rotation shaft of the photosensitive drum 11, is the Z axis, and the Z1 direction and Z2 direction are the directions of the Z axis. The Z axis is orthogonal to the above-mentioned X axis (X1 direction, X2 direction) and Y axis (Y1 direction, Y2 direction) respectively. In a case where the process cartridge B and the toner cartridge C are attached to the printer main body A, the X axis (X1 and X2 directions), the Y axis (Y1 and Y2 directions) and the Z axis (Z1 and Z2 directions) of the printer main body A, the process cartridge B and the toner cartridge C match.

The charging roller 12 is disposed so as to contact with the outer peripheral surface of the photosensitive drum 11, and the charging roller 12 charges the photosensitive drum 11 by applying voltage (charging bias) from the printer main body A. The charging roller 12 is rotated by the rotation of the photosensitive drum 11.

The cleaning blade 17 is a member having elasticity, and is disposed so as to contact with the outer peripheral surface of the photosensitive drum 11. By the tip of the cleaning blade 17 elastically contacting with the photosensitive drum 11, toner, which remains after the later mentioned sheet S passed through the portion between the photosensitive drum 11 and the transfer roller 104, can be removed from the photosensitive drum 11. The removed toner (hereafter called "waste toner") is conveyed from the later mentioned waste toner primary storing portion 10*a* to the toner cartridge C via the first waste toner conveying path 10*b* and the second waste toner conveying path 10*c*.

The charging roller cleaner 14 is a roller which is disposed to contact with the surface (outer peripheral surface) of the charging roller 12, and is rotated by the rotation of the charging roller 12, so as to clean the charging roller 12.

Figure 5:
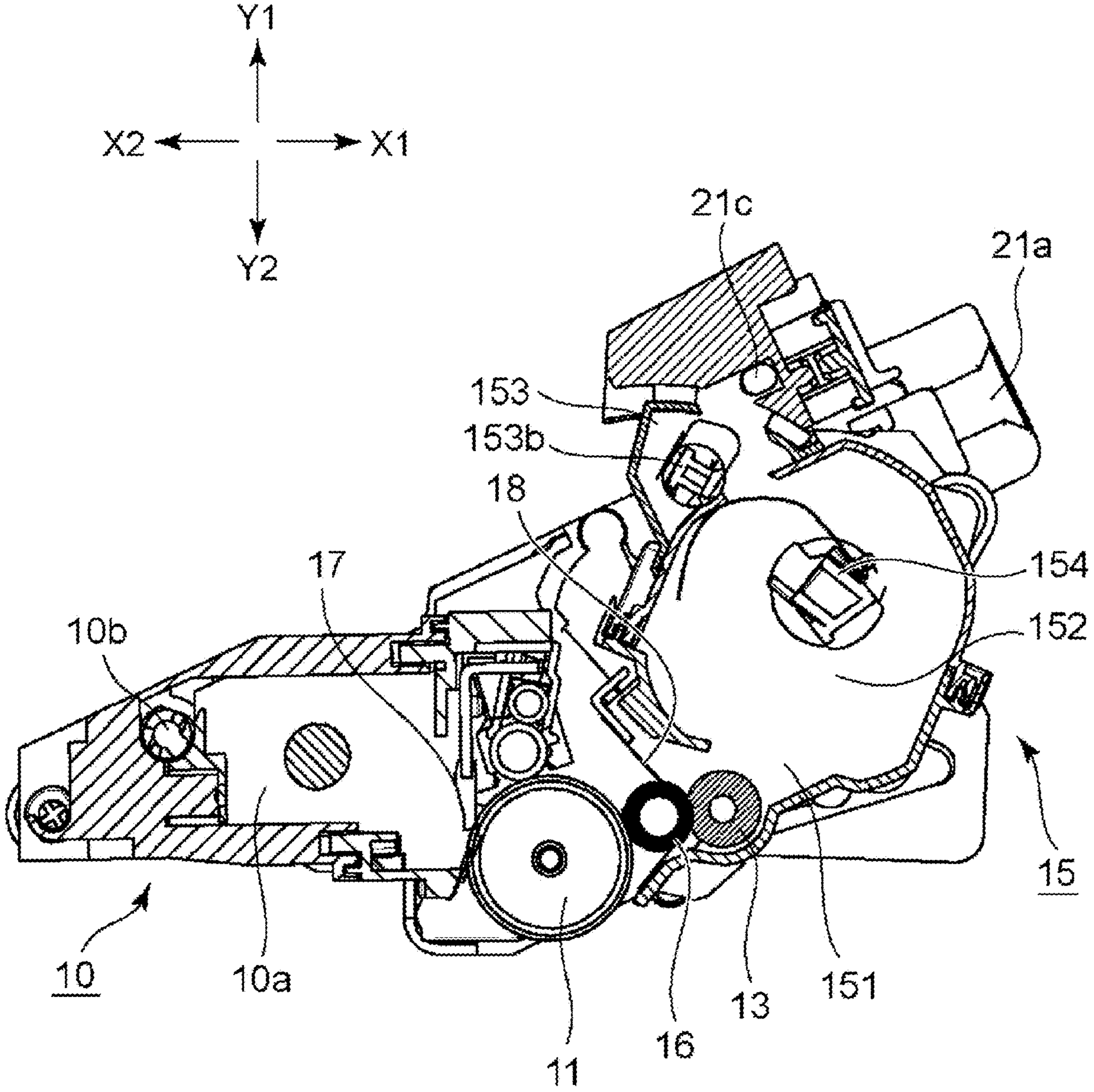
FIG. 5 is a cross-sectional view (cross section at the b-b line in FIG. 3) indicating a replenishing port of the process cartridge according to an example of the present invention.

FIG. 5 is a cross-sectional view (cross section at the b-b line indicated in FIG. 3) indicating a replenishing port of the process cartridge B according to an example of the present invention. As illustrated in FIG. 5, the developing unit 15 includes: a developing chamber 151 in which the developing roller 16 is disposed; a developer storing unit 152 which supplies toner to the developing chamber 151; a toner receiving chamber 153 which receives toner supplied from the toner cartridge C, and a stirring member 154. The developer storing unit 152 and the toner receiving chamber 153 constitute a first toner storing unit.

The developing roller 16 is a developing member (developing unit) which supplies toner to the photosensitive drum 11, and develops an electrostatic latent image formed on the photosensitive drum 11 using the supplied toner. A developing blade 18 contacts with the surface of the developing roller 16 and regulates the amount of toner that adheres to the surface of the developing roller 16. The developing blade 18 also provides triboelectric charges to the toner. In other words, the developing blade 18 is an adjusting unit for adjusting the amount of toner according to the present invention.

The stirring member 154 is a stirring unit for stirring the toner supplied into the developing unit 15, so that the toner is evenly distributed. The toner stored inside the developer storing unit 152 is fed into the developing chamber 151 by the rotation of the stirring member 154, and is supplied to the developing roller 16.

Figure 33:
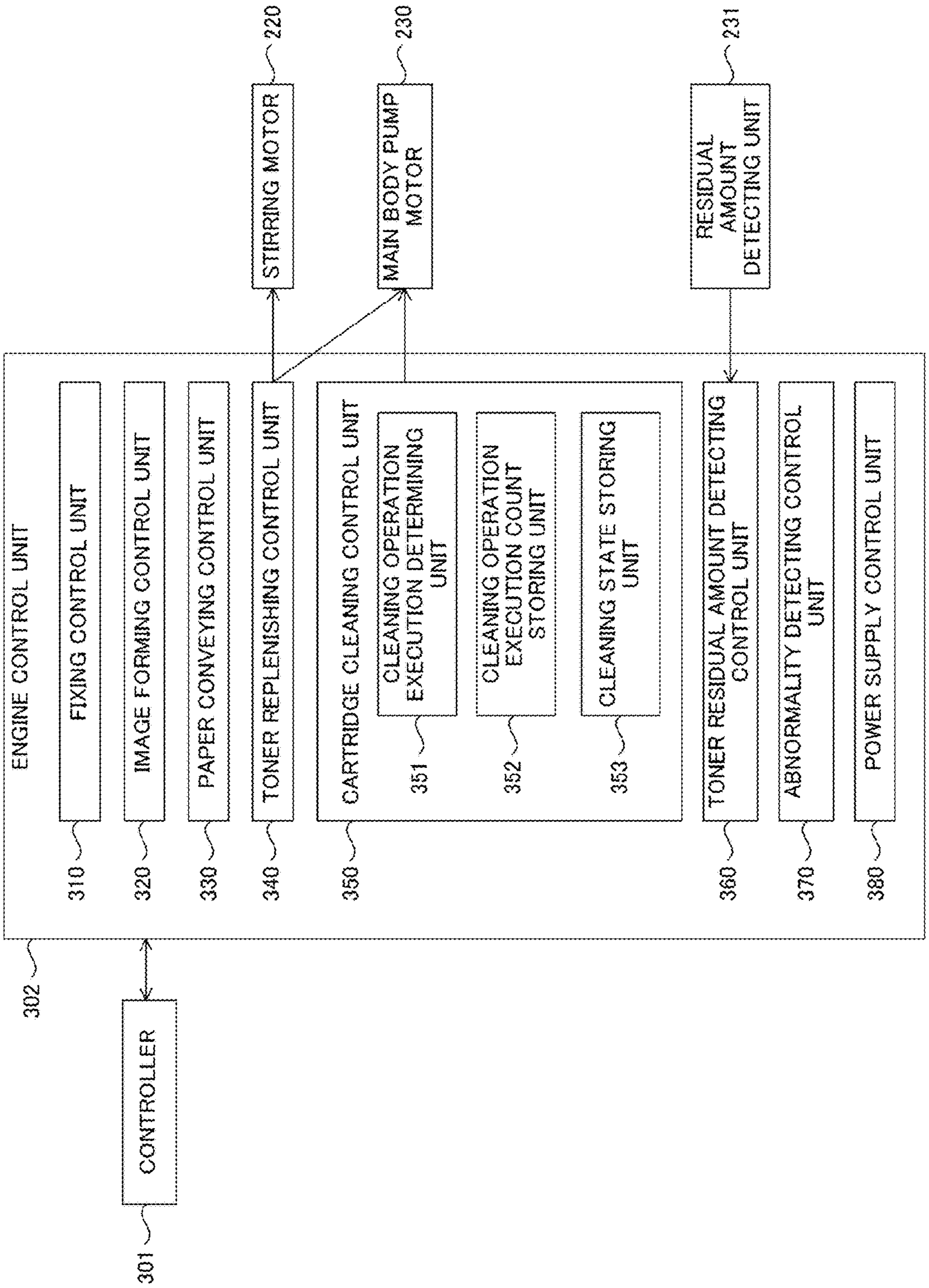
FIG. 33 is a functional block diagram according to an example of the present invention.

The residual amount of toner inside the developer storing unit 152 is detected by a residual amount detecting unit 231 (see FIG. 33), and when the residual amount of toner inside the developer storing unit 152 becomes a predetermined amount or less, toner is supplied from the toner cartridge C to the process cartridge B. Hereafter the operation of supplying toner from the toner cartridge C to the process cartridge B is called "replenishing operation". The toner supplied to the developing unit 15 by the replenishing operation is supplied to the developer storing unit 152 via a replenishing port 21*c*, a transfer port 21*d* (see FIGS. 19A and 19B) of a stay 21 (see FIGS. 1A to 1D), and the toner receiving chamber 153. FIG. 33 is a control block diagram of this example. An engine control unit 302 in FIG. 33 executes the replenishing operation when the residual amount detecting unit 231 detects that the residual amount of toner inside the developer storing unit 152 is a predetermined amount or less.

Now an operation of the laser printer 1 will be described with reference to FIG. 2. The photosensitive drum 11 is driven to rotate by a driving source (not illustrated), and is uniformly charged at a predetermined potential by the charging roller 12. On the surface of the charged photosensitive drum 11, exposure is performed by the laser scanner 101 based on image information, and charges of the exposed portion are removed, whereby an electrostatic latent image is formed. Toner is supplied from the developing roller 16 to the electrostatic latent image on the photosensitive drum 11 formed like this, whereby a toner image is formed.

Here the sheet S is conveyed along the sheet feeding unit 103 in tandem with the toner image forming operation. Specifically, a sheet feeding roller 103*b* rotates to feed the sheet S. Then the sheet S is conveyed to a portion between the photosensitive drum 11 and the transfer roller 104, synchronizing with the timing of forming a toner image on the photosensitive drum 11. While the sheet S is passing through the portion between the photosensitive drum 11 and the transfer roller 104, the toner image is transferred to the sheet S as an unfixed image by the transfer voltage that is applied to the transfer roller 104.

The sheet S, on which the toner image is transferred, is conveyed to the fixing unit 105. The sheet S, conveyed to the fixing unit 105, passes through the fixing unit 105, during which the unfixed image is heated and pressed, and is fixed to the surface of the sheet S. In other words, the fixing unit 105 is a fixing unit according to the image forming apparatus of the present invention. Then the sheet S is conveyed by the sheet feeding unit 103, is discharged to a delivery tray 106, and is loaded thereon. On the front face of the printer main body A, the door 107 is disposed to be rotatable around a rotation shaft (not illustrated). In a state where the door 107 is open, the user can attach and detach the process cartridge B and the toner cartridge C to and from the printer main body A.

Basic Configuration of Toner Cartridge C

Figure 6:
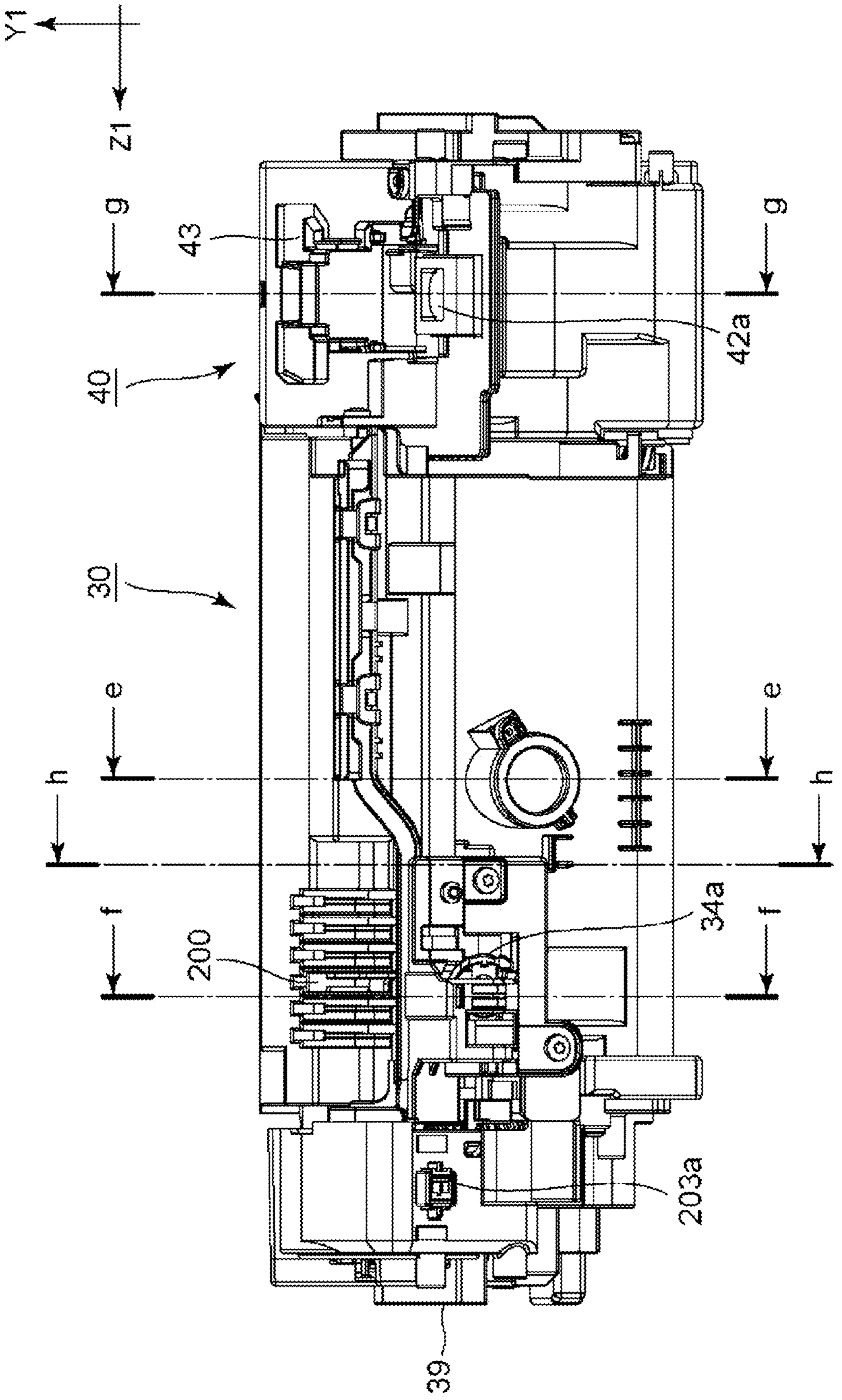
FIG. 6 is a front view of the toner cartridge according to an example of the present invention, in a state where the toner cartridge is attached to the printer main body.
Figure 7:
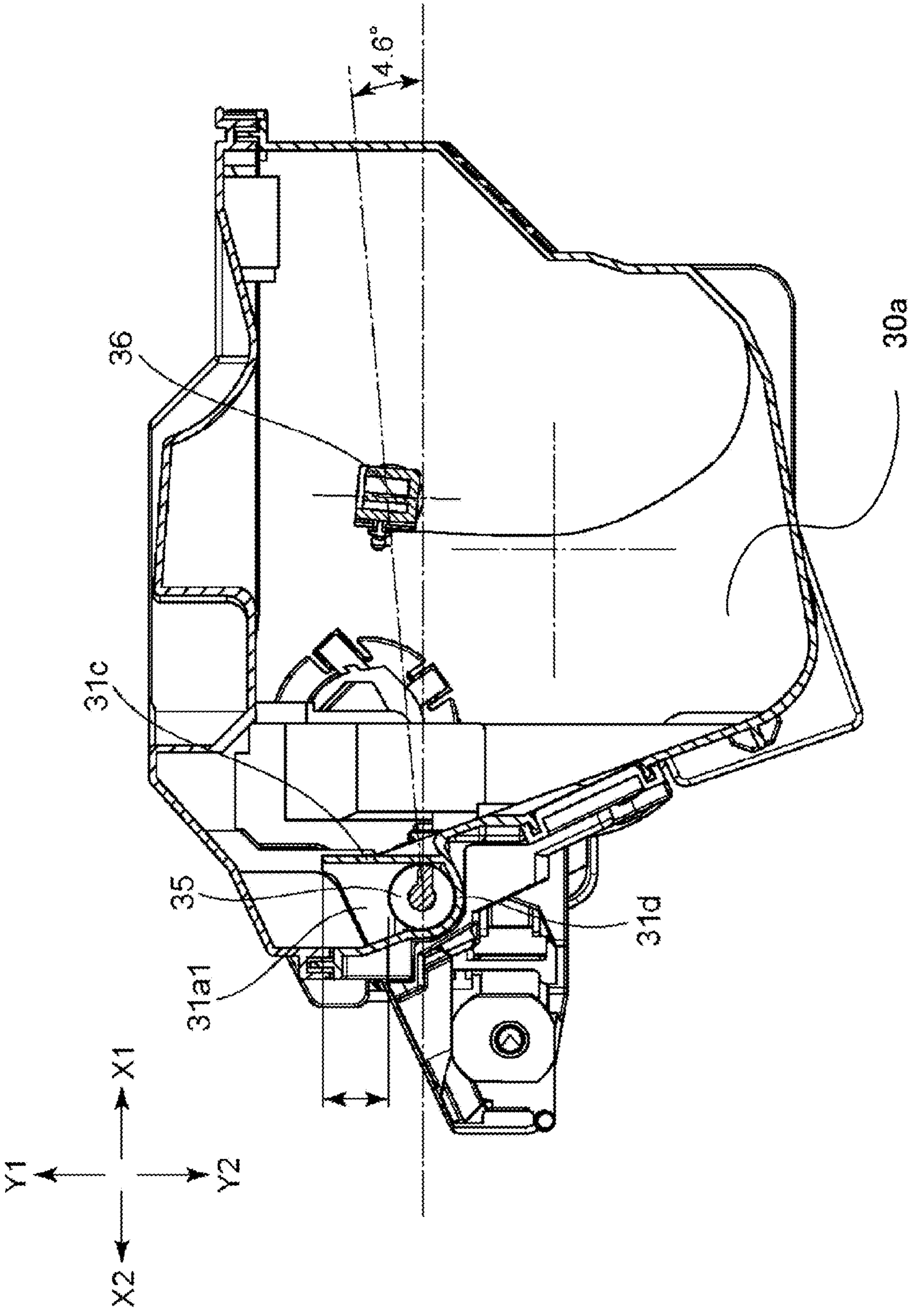
FIG. 7 is a principal cross-sectional view (cross section at the e-e line in FIG. 6) indicating a toner storing unit of the toner cartridge according to an example of the present invention.
Figure 8:
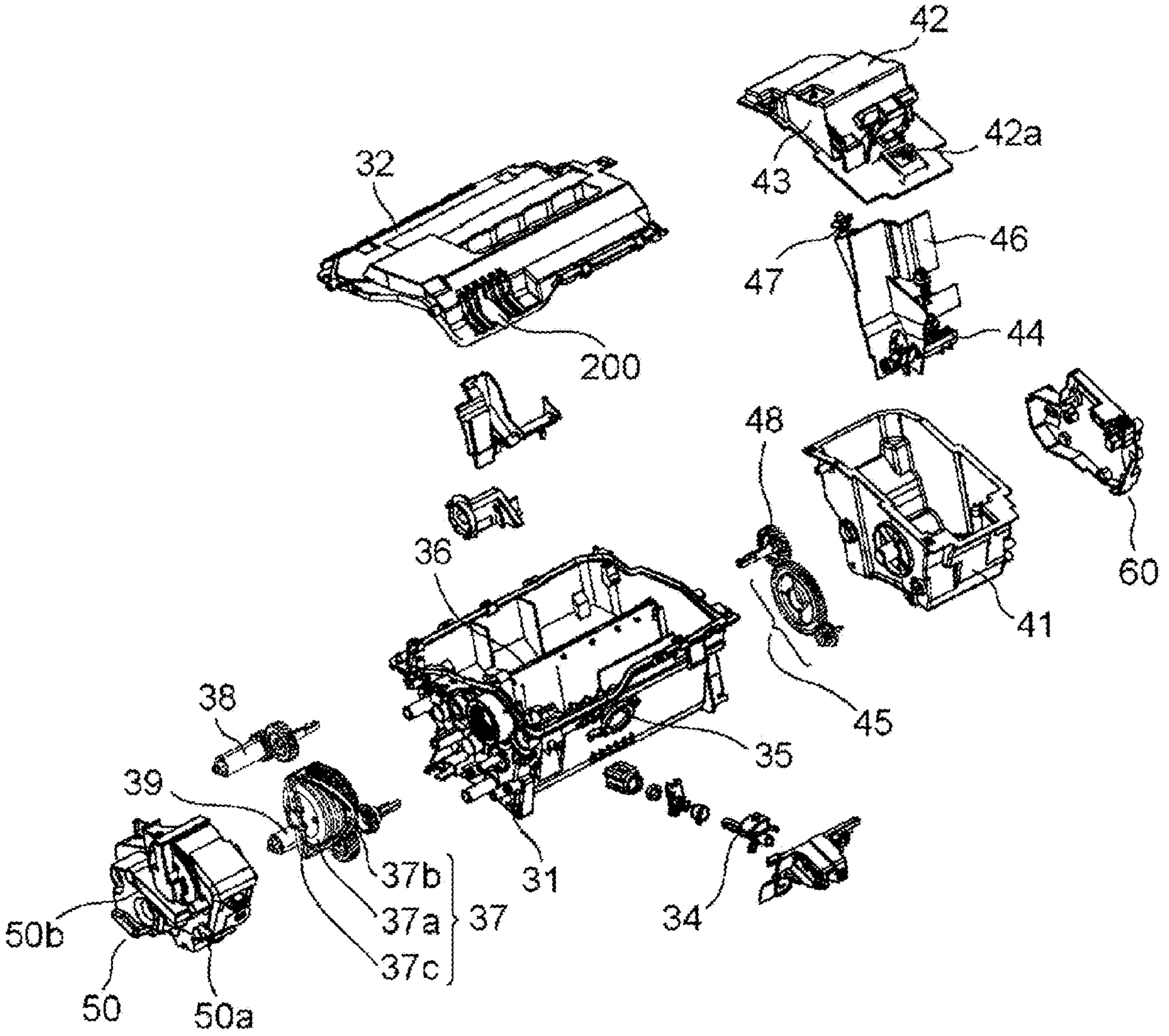
FIG. 8 is an exploded perspective view of the toner cartridge according to an example of the present invention, viewed from the driving side.
Figure 9:
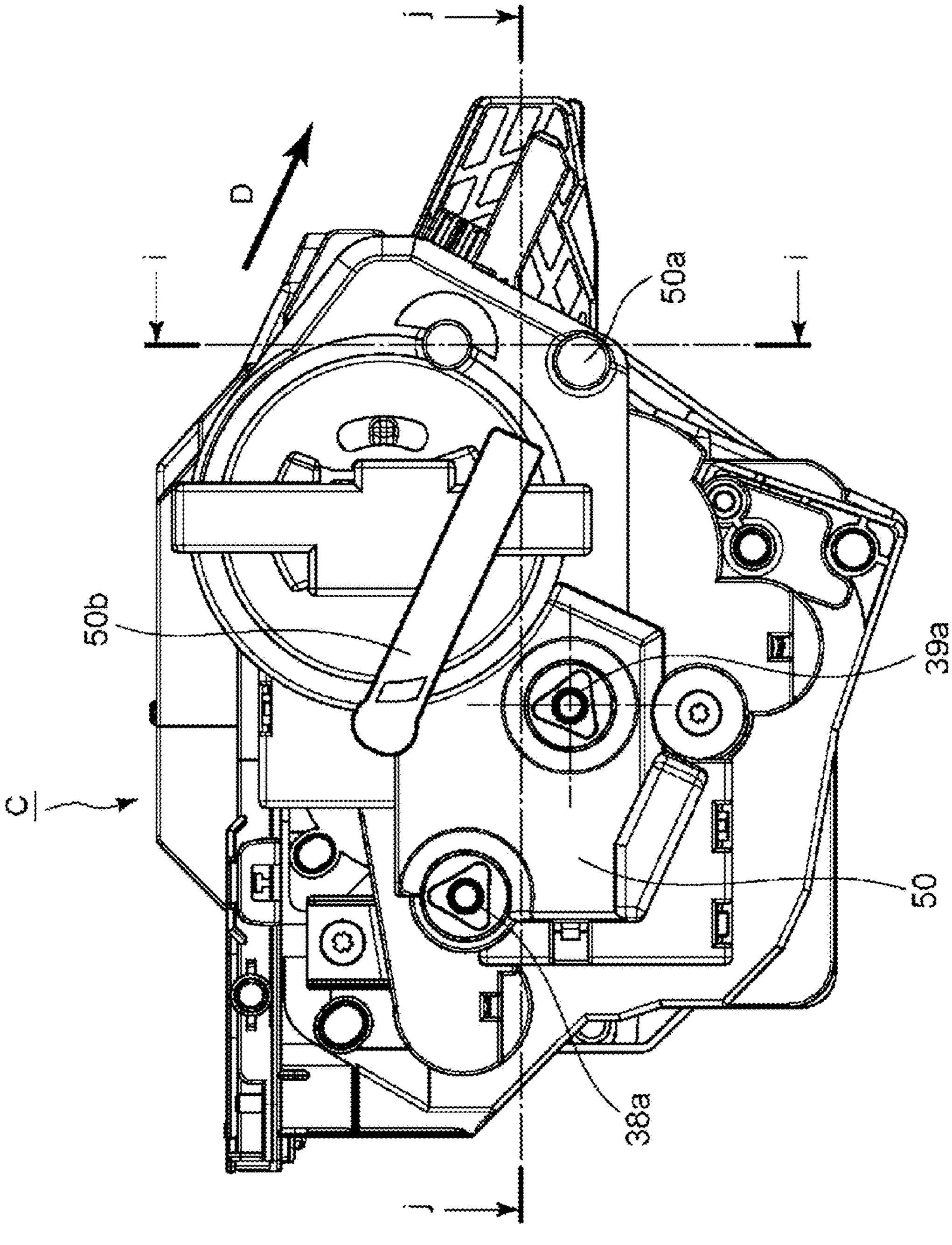
FIG. 9 is a side view of the toner cartridge according to an example of the present invention viewed from the driving side.
Figure 10:
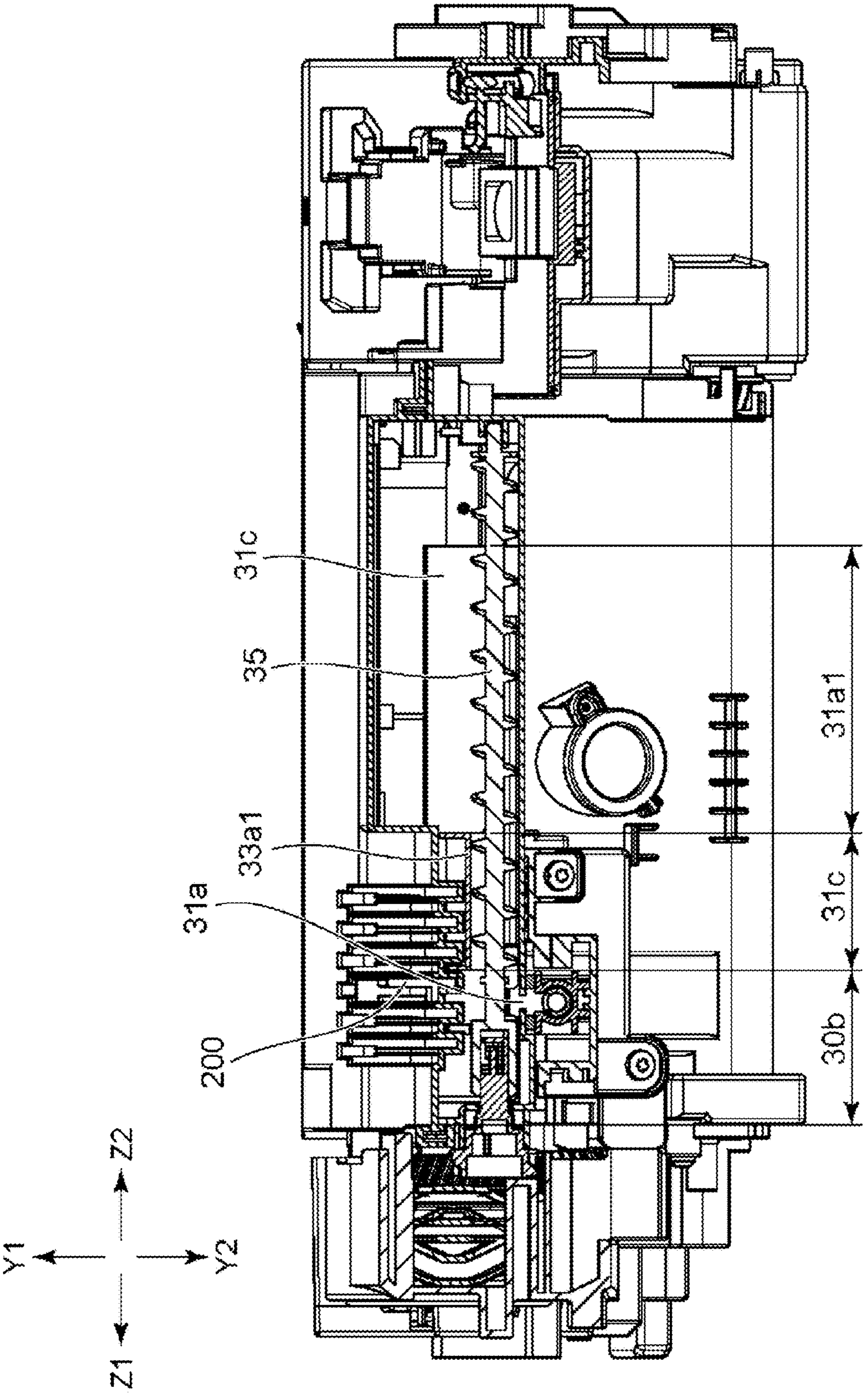
FIG. 10 is a cross-sectional view (cross section at the i-i line indicated in FIG. 9) of the toner cartridge according to an example of the present invention, centered around a rotation shaft of a conveying screw.
Figure 11:
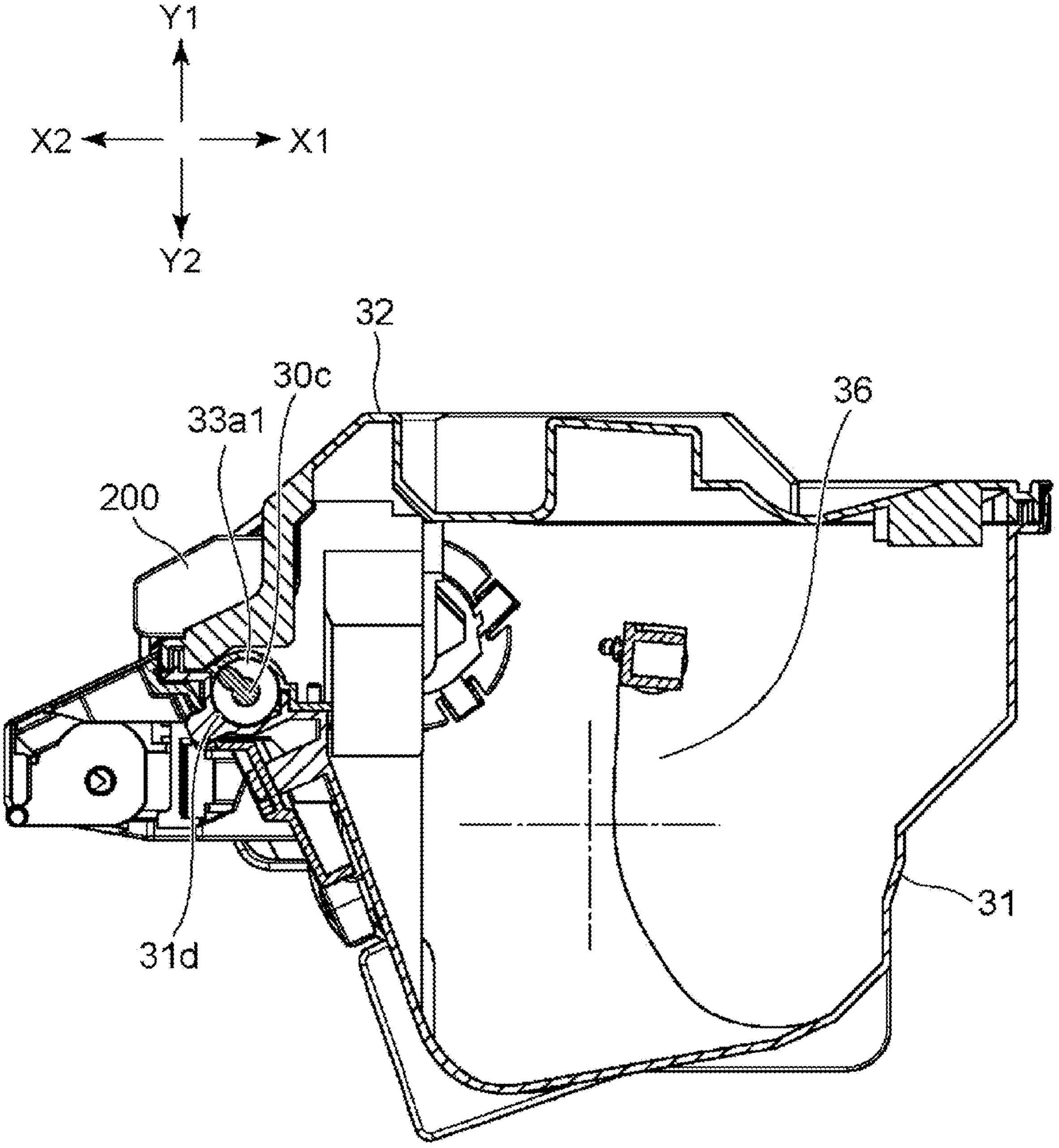
FIG. 11 is a cross-sectional view (cross section at the h-h line indicated in FIG. 6) exemplifying a leveling portion of the toner cartridge according to an example of the present invention.
Figure 12:
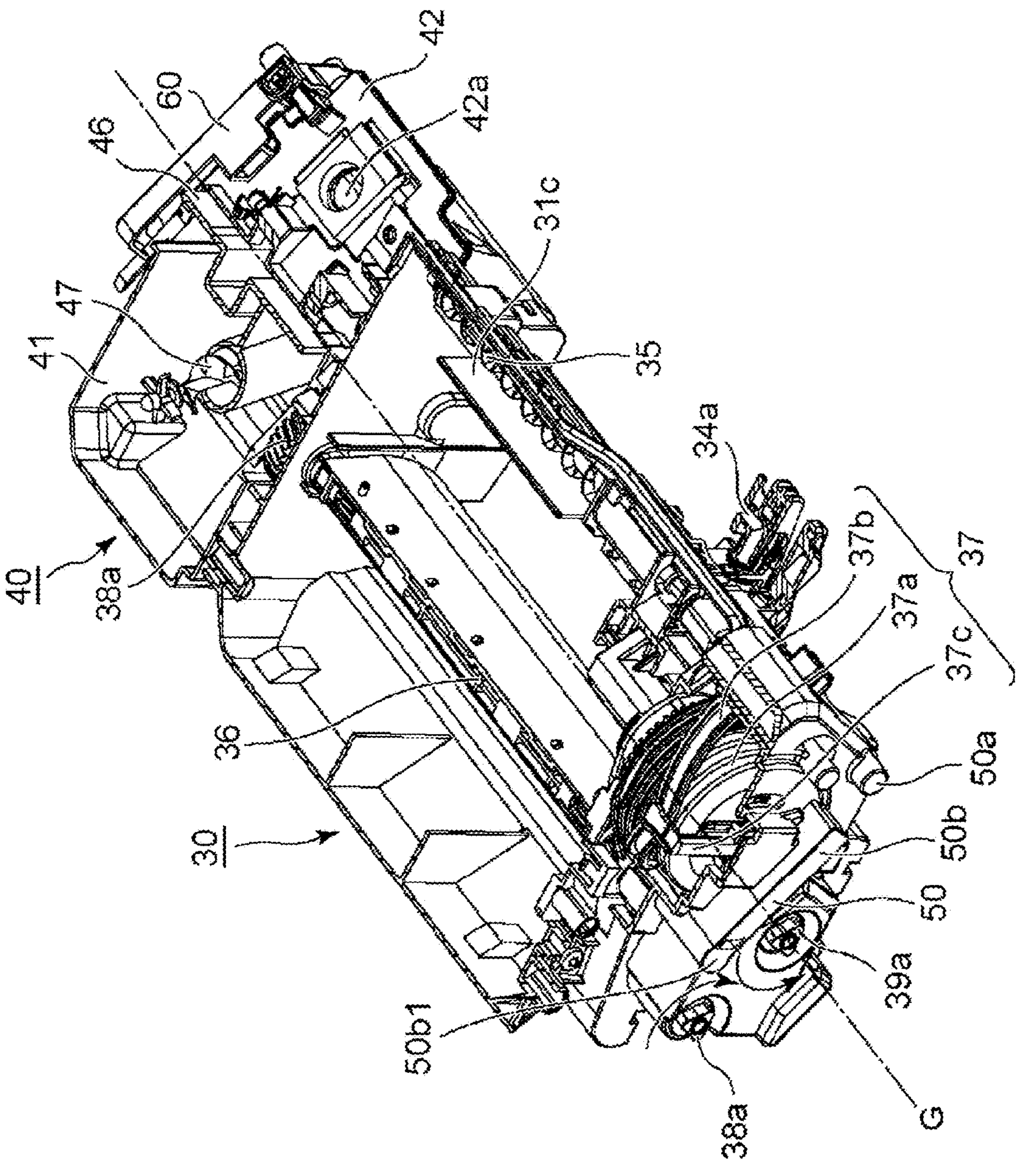
FIG. 12 is a cross-sectional perspective view of the toner cartridge along the longitudinal direction according to an example of the present invention.
Figure 13:
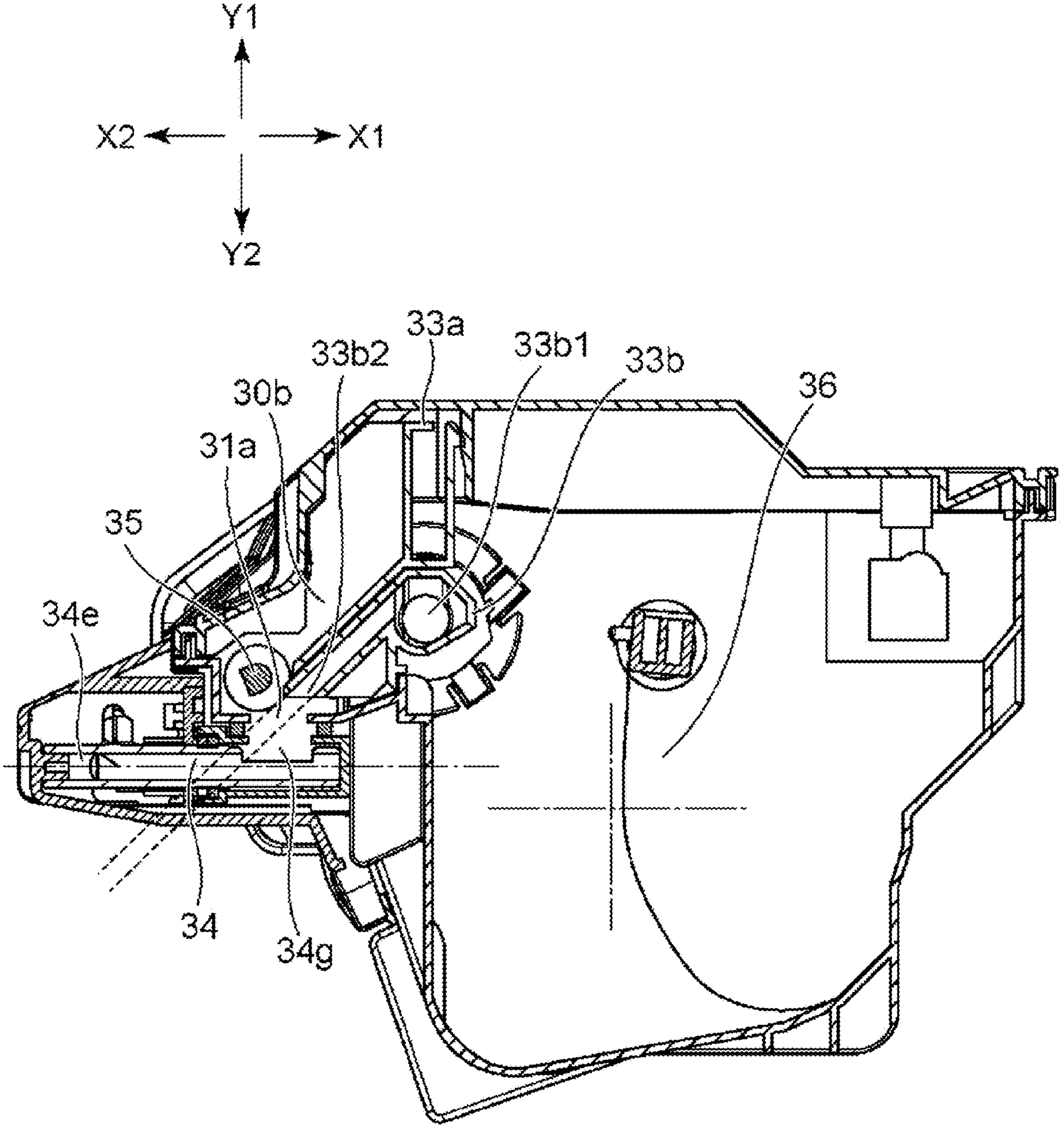
FIG. 13 is a cross-sectional view (cross section at the f-f line indicated in FIG. 6) of the toner cartridge according to an example of the present invention, centered around a rotation shaft of a shutter member.
Figure 14:
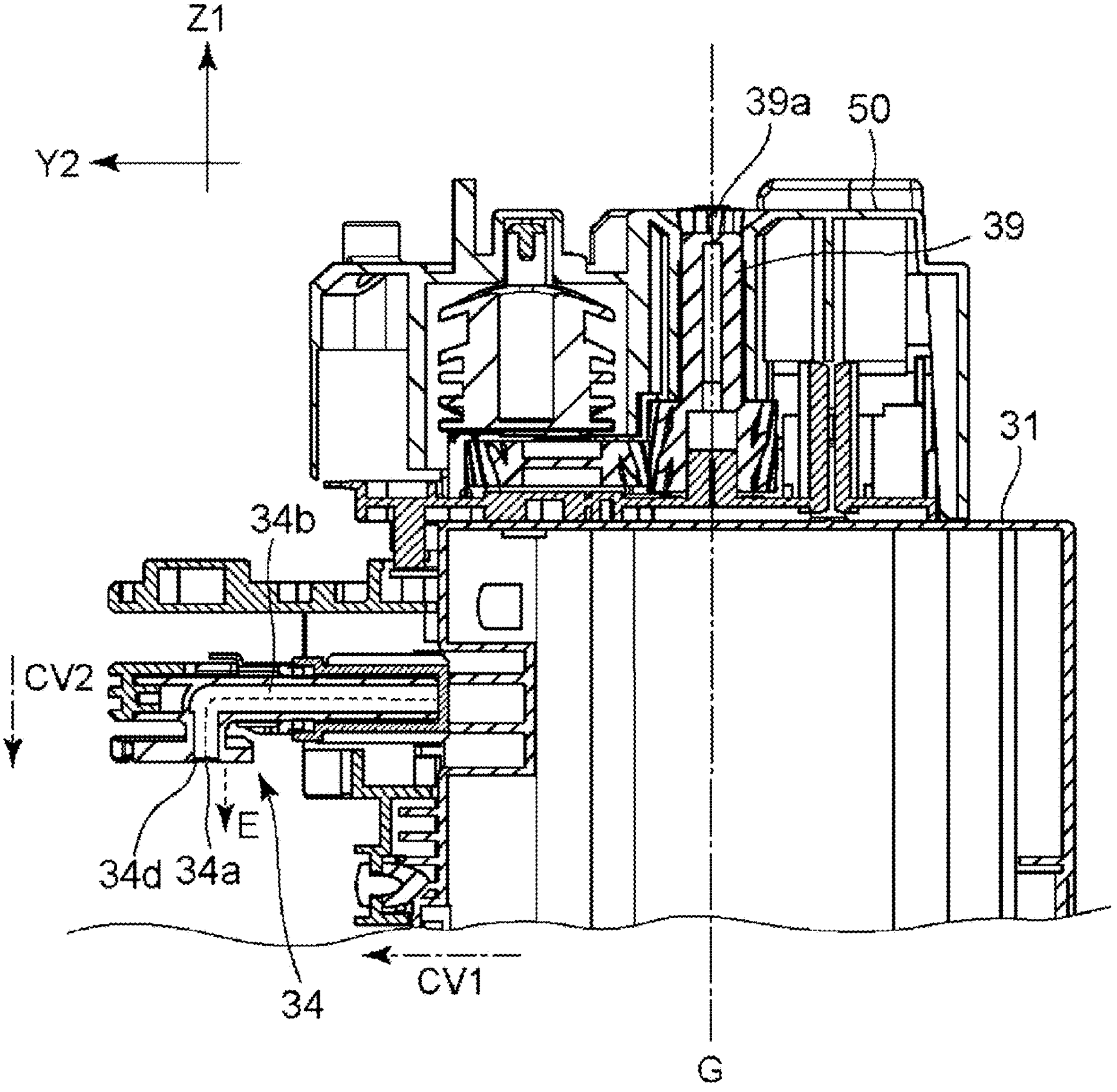
FIG. 14 is a cross-sectional view (cross section at the j-j line indicated in FIG. 9) of the toner cartridge according to an example of the present invention, centered around the rotation shaft of the shutter member.
Figures 15A, 15B, 15C, 15D, 15E, 15F:
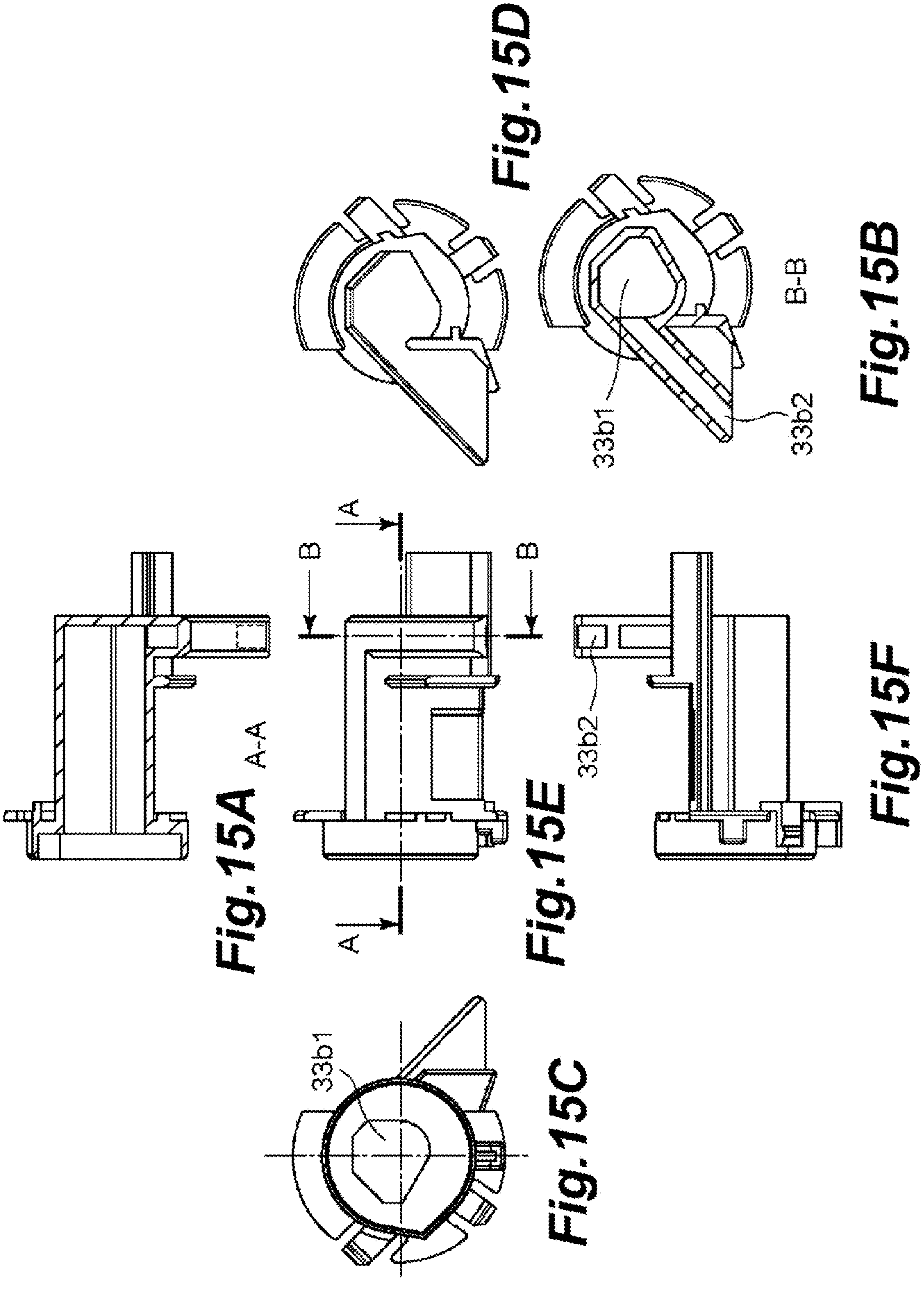
FIGS. 15A to 15F are a front view, a left side view, a right side view, a bottom view and cross-sectional views of a nozzle member according to an example of the present invention.

The toner cartridge C according to an example of the present invention will now be described in detail with reference to FIGS. 6 to 16A and 16B. FIG. 6 is a front view of the toner cartridge C according to an example of the present invention, and indicates a state where the toner cartridge C is attached to the printer main body A. FIG. 7 is a principal cross-sectional view (cross section at the e-e line indicated in FIG. 6) indicating a toner storing unit 30 of the toner cartridge C according to the example of the present invention. FIG. 8 is an exploded perspective view of the toner cartridge C according to the example of the present invention viewed from the driving side. FIG. 9 is a side view of the toner cartridge C according to the example of the present invention viewed from the driving side. FIG. 10 is a cross-sectional view (cross section at the i-i line indicated in FIG. 9) of the toner cartridge C according to the example of the present invention, centered around the rotation shaft of a conveying screw 35. FIG. 11 is a cross-sectional view (cross section at the h-h line indicated in FIG. 6) exemplifying a leveling portion 33*a*1 of the toner cartridge C according to the example of the present invention. FIG. 12 is a cross-sectional perspective view of the toner cartridge C, along the longitudinal direction, according to the example of the present invention. FIG. 13 is a cross-sectional view (cross section at the f-f line indicated in FIG. 6) of the toner cartridge C according to the example of the present invention, centered around the rotation shaft of a shutter member 34. FIG. 14 is a cross-sectional view (cross section of the j-j line indicated in FIG. 9) of the toner cartridge C according to the example of the present invention, centered around the rotation shaft of the shutter member 34. FIG. 15A is a cross-sectional view of a nozzle member 33*b* according to the example of the present invention, and is an AA cross section indicated in FIG. 15E. FIG. 15B is a cross-sectional view of the nozzle member 33*b*, and is a BB cross section indicated in FIG. 15E. FIG. 15C is a left side view of the nozzle member 33*b*, FIG. 15D is a right side view of the nozzle member 33*b*, FIG. 15E is a front view of the nozzle member 33*b*, and FIG. 15F is a bottom view of the nozzle member 33*b*. As illustrated in FIG. 6, FIG. 7 and the like, the toner cartridge C according to this example includes the toner storing unit 30 which stores toner to be supplied to the process cartridge B, and a waste toner storing unit 40 which collects waste toner from the process cartridge B. In the toner cartridge C, a driving side toner cartridge side cover 50 is disposed on one side in a direction parallel with a shaft line G of a later mentioned pump screw driving input unit 39, across toner storing unit 30 and the waste toner storing unit 40. Further, in the toner cartridge C, a non-driving side toner cartridge side cover 60 is disposed on the other side in the direction parallel with the shaft line G, across toner storing unit 30 and the waste toner storing unit 40. In other words, a frame forming an external shape of the toner cartridge C is constituted of the toner storing unit 30, the waste toner storing unit 40, the driving side toner cartridge side cover 50 and the non-driving side toner cartridge side cover 60. This means that the toner cartridge C is an assembly of individual frames of a plurality of storing units, side covers and the like.

In this example, an axis parallel with the shaft line G of the pump screw driving input unit 39 is the Z axis. The X axis, the Y axis and the Z axis of the toner cartridge C match with the X axis (X1 and X2 directions), the Y axis (Y1 and Y2 directions), and the Z axis (Z1 and Z2 directions) of the printer main body A and the process cartridge B in a state where the toner cartridge C is attached to the printer main body A.

The toner storing unit 30 (second toner storing unit) will now be described in detail. As illustrated in FIGS. 7 and 8, the toner storing unit 30 is constituted of a storing frame 31 and a storing unit cover 32. In a toner storing chamber 30*a* (first chamber), the conveying screw 35 which conveys toner toward a discharging port 34*a*, and a toner storing unit stirring conveying unit 36 which conveys toner toward the conveying screw 35 are disposed.

As illustrated in FIG. 7, the horizontal direction of the toner cartridge C in a state of being attached to the printer main body A is inclined 4.6° from the line connecting the rotation centers of the conveying screw 35 (conveying member) and the toner storing unit stirring conveying unit 36.

Further, as illustrated in FIG. 10, the storing frame 31 includes a discharging port 31*a* at the downstream side of the conveying screw 35 in the conveying direction. The storing frame 31 in a portion corresponding to a screw portion 35*a* of the conveying screw 35 has a curve-shaped portion 31*d* of which diameter is approximately the same as the screw diameter.

As illustrated in FIG. 7, a partition wall 31*c* is disposed at the upstream side of the conveying screw 35 in the conveying direction. The partition wall 31*c* is disposed continuously from the curve-shaped portion 31*d*, so as to face the curve-shaped portion 31*d*. A space created by the partition wall 31*c* and the curve-shaped portion 31*d* opens upward in the gravity direction. A toner containing portion 31*a*1 (second chamber) is formed by the curve-shaped portion 31*d* and the partition wall 31*c* in the storing frame 31. The toner containing portion 31*a*1 is closer to the discharging port 34*a* than the toner storing chamber 30*a* on the toner conveying path. The height of the partition wall 31*c* is higher than the top of the conveying screw 35, and the toner containing portion 31*a*1 has a shape where the upper side in the gravity direction is open in a state where the toner cartridge C is attached.

As illustrated in FIGS. 10 and 12, the partition wall 31*c* ends near the edge of the conveying screw 35 at the upstream side in the conveying direction, but contained toner can be maintained in the toner containing portion 31*a*1 using the conveying force of the conveying screw 35.

As illustrated in FIG. 8, the toner storing unit stirring conveying unit 36 is driven by a stirring driving input unit 38, which is rotatably supported at the end of the toner storing unit 30 in the longitudinal direction (that is, the outer side of the toner storing unit 30), and a stirring portion can be rotated thereby. The method of driving input from the printer main body A side to the stirring driving input unit 38 will be described in detail later. The capability of the toner storing unit stirring conveying unit 36 to convey toner changes depending on the amount of toner that exists in the toner storing unit 30. Therefore, in this example, the toner containing portion 31*a*1 is disposed as an area where the partition wall 31*c* is disposed near the conveying screw 35. Because of this configuration, the conveying screw 35 can minimize the change of powder pressure of the toner that exists in the toner containing portion 31*a*1 regardless the amount of toner existing inside the toner storing unit 30. In other words, by the presence of the toner containing portion 31*a*1, the toner cartridge C according to this example can suppress dispersion of the conveying amount of the conveying screw 35.

Further, as illustrated in FIG. 11, the leveling portion 33*a*1, to adjust the conveying amount of the toner to a predetermined amount, is disposed in the toner storing unit 30. The leveling portion 33*a*1 is formed at a partition member 33*a*, which is disposed between the partition wall 31*c* and the discharging port 31*a* in the conveying direction of the conveying screw 35.

The shape of the leveling portion 33*a*1 is curved, of which diameter is approximately the same as the outer diameter of the shape of the conveying screw 35. As mentioned above, the curve-shaped portion 31*d* is also disposed in the storing frame 31. In the toner cartridge C according to this example, the conveying screw 35 is disposed in the conveying direction thereof, in a space created by combining the curve-shaped portion of the leveling portion 33*a*1 and the curve-shaped portion 31*d* of the storing frame 31 (that is, in a region enclosed by the two curve-shaped portions). Therefore, inside the region formed by these two curve-shaped portions, the conveying amount of the toner, which is conveyed to the discharging port 31*a* by the conveying screw 35, can maintained to be constant. The space formed by combining the leveling portion 33*a*1 and the curve-shaped portion 31*d* of the storing frame 31 (the region enclosed by the two curve-shaped portions) is called a "conveying path 30*c*".

The length of the leveling portion 33*a*1 along the conveying direction is preferably at least two pitches (two consecutive threads) of the screw portion of the conveying screw 35. This is to prevent the backflow of the toner caused by the air supplied by a later mentioned pump 37*a* during conveying of the conveying screw 35.

As described above, in the toner cartridge C according to this example, the partition wall 31*c* and the leveling portion 33*a*1 are disposed, so that the dispersion of the amount of the toner conveyed toward the discharging port 31*a* of the storing frame 31 can be reduced.

Configuration of inputting the driving force from the outside, disposed in the toner cartridge C, will be described next. As illustrated in FIG. 8, the toner cartridge C includes a pump unit 37, the stirring driving input unit 38, the pump screw driving input unit 39, and the driving side toner cartridge side cover 50 which covers the pump 37*a* equipped in the pump unit 37. Each component mentioned above is disposed on a side where the stirring driving input unit 38 is disposed (driving side) in the toner cartridge C. On the other hand, on a non-driving side, which is the opposite side of the driving side in the toner cartridge C (in the longitudinal direction of the toner cartridge C), the above-mentioned waste toner storing unit 40 is disposed.

As illustrated in FIGS. 8, 9 and 12, the pump unit 37 includes: a pump 37*a* which can expand and contract and is used as a volume variable unit of the image forming apparatus according to this example; a cam gear 37*b* (cam) which is rotatable to expand and contract the pump 37*a*; and a link arm 37*c*. The stirring driving input unit 38 is a driving unit for driving the toner storing unit stirring conveying unit 36. The pump screw driving input unit 39 is a driving unit for driving the pump 37*a* and the conveying screw 35.

As illustrated in FIGS. 8, 9 and 12, the pump unit 37, the stirring driving input unit 38 and the pump screw driving input unit 39 are all disposed outside the toner storing unit 30. The stirring driving input unit 38 and the pump screw driving input unit 39 are rotatably supported outside the toner storing unit 30.

The pump screw driving input unit 39 is a first driving force receiving member according to this example, and includes a pump screw coupling portion 39*a* which protrudes and is exposed from the driving side toner cartridge side cover 50. The pump screw coupling portion 39*a* is a driving force receiving unit (first driving force receiving unit) according to this example.

The stirring driving input unit 38 is a second driving force receiving unit according to this example, and includes a driving stirring coupling portion 38*a* which protrudes and is exposed from the driving side toner cartridge side cover 50. The driving stirring coupling portion 38*a* is a driving force receiving unit (second driving force receiving unit) according to this example.

The pump screw coupling portion 39*a* and the driving stirring coupling portion 38*a* can receive the driving force from the printer main body A side in a state of being engaged with the first coupling member and the second coupling member of the main body, which correspond to the shapes of the pump screw coupling portion 39*a* and the driving stirring coupling portion 38*a* respectively. As illustrated in FIG. 12, a driving shaft line of rotation of the pump screw driving input unit 39 is assumed to be the shaft line G. The shaft line G is disposed approximately parallel with a rotation shaft line 11*b* of the photosensitive drum 11 (see FIG. 20) of the process cartridge B, and a driving shaft line of rotation of the stirring driving input unit 38.

Figure 28A:
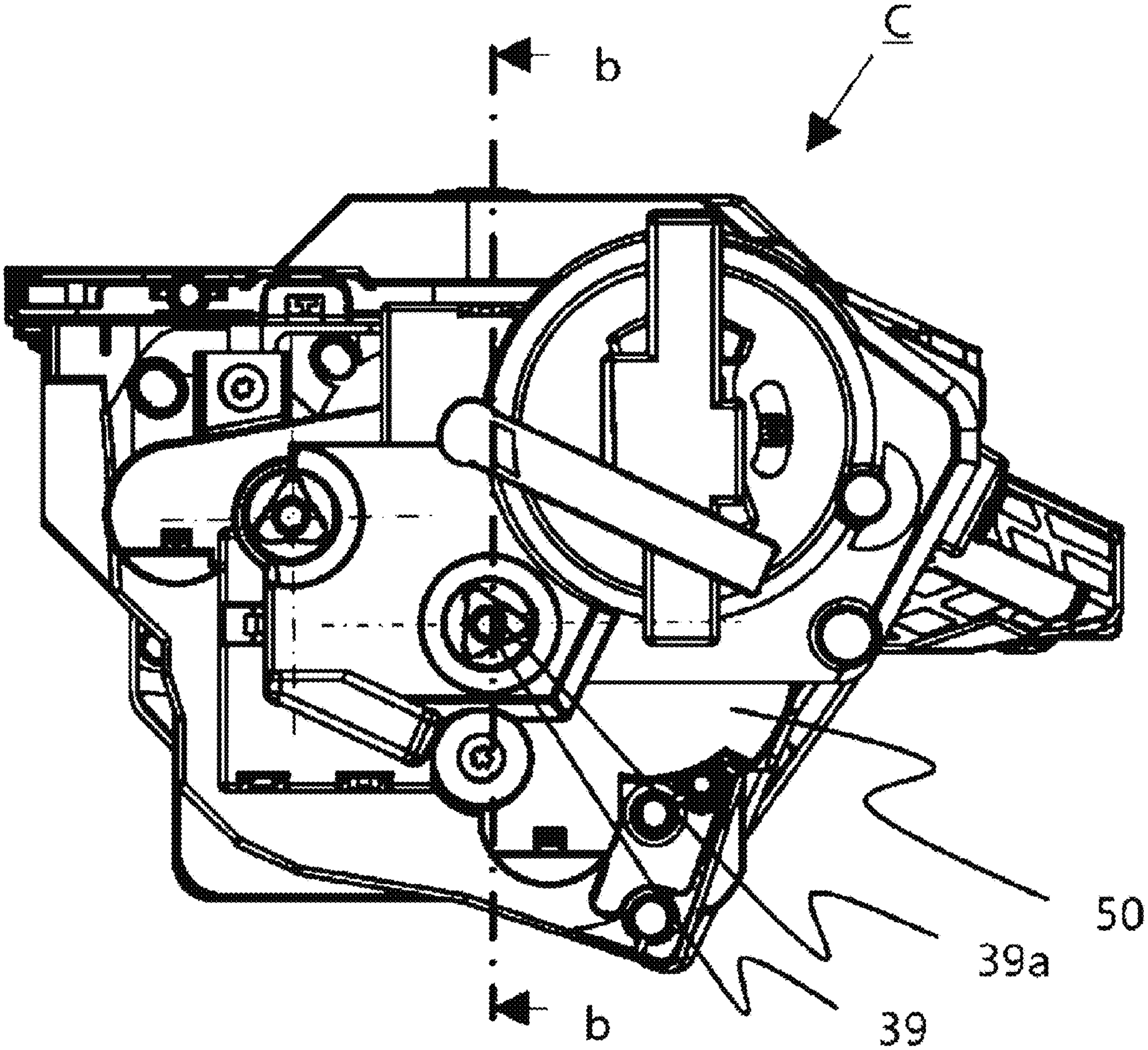
FIG. 28A is a side view of the toner cartridge according to an example of the present invention viewed from the driving side.
Figure 28B:
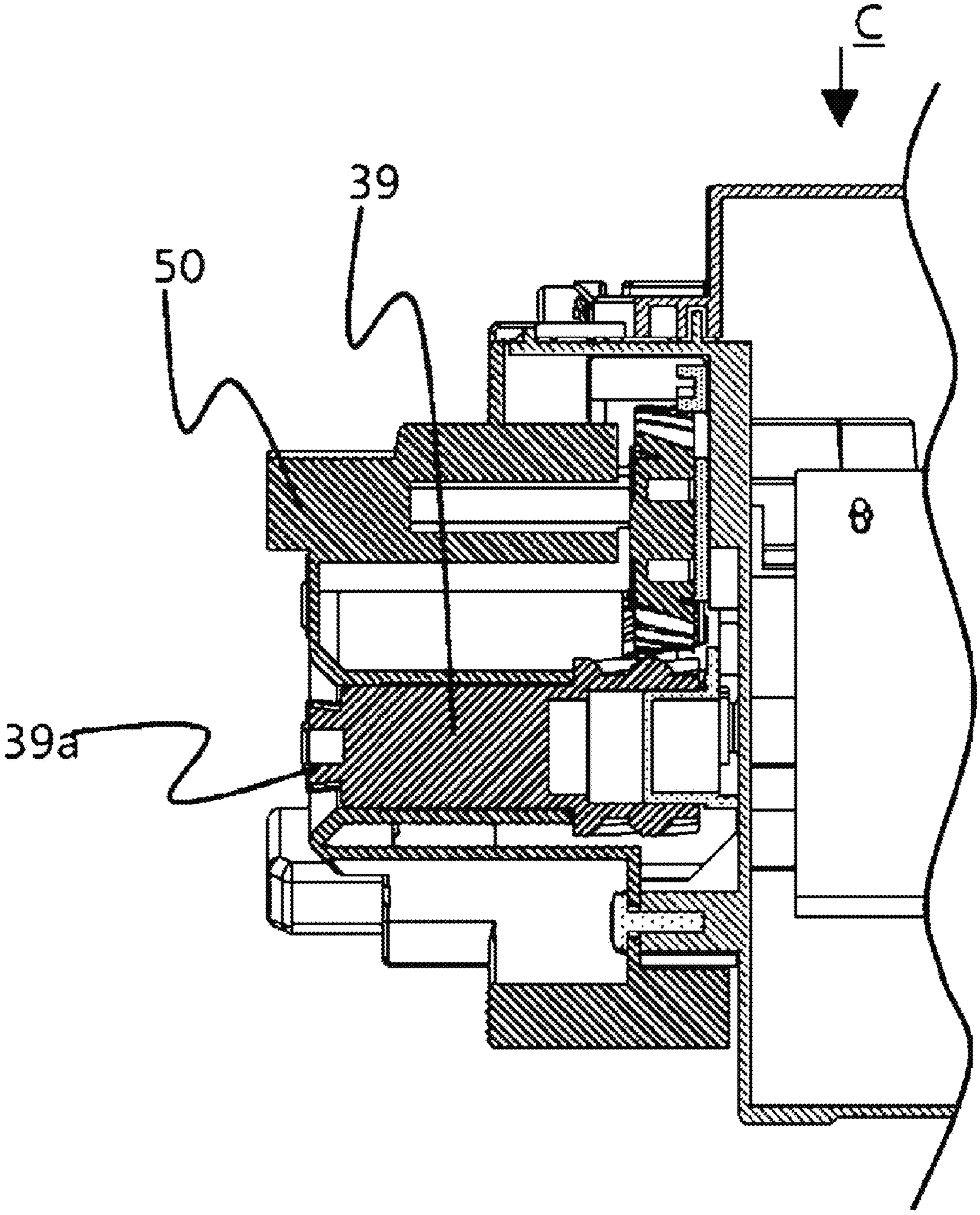
FIG. 28B is a cross-sectional view of the toner cartridge sectioned at the shaft line of a pump screw driving input unit.
Figure 29A:
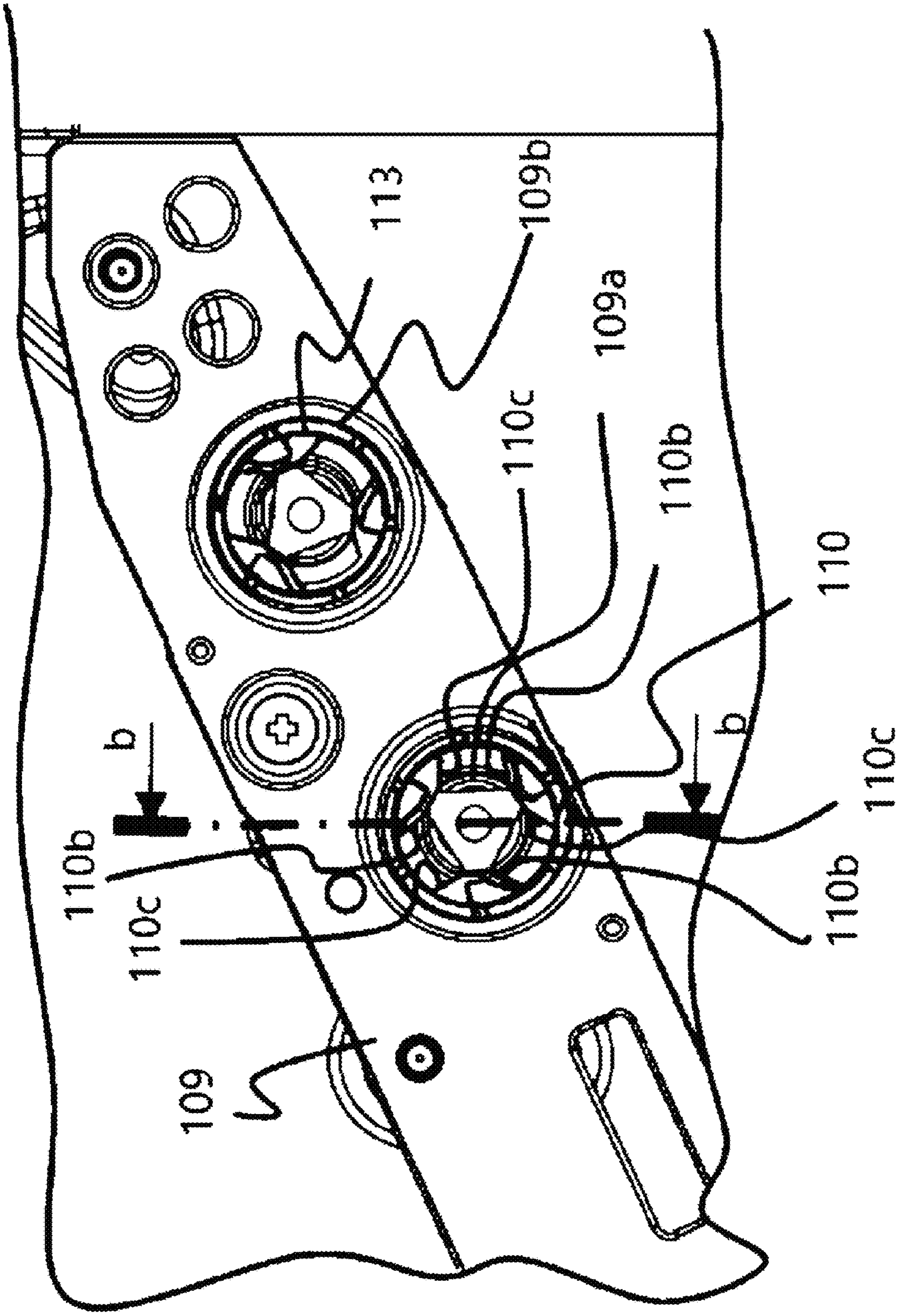
FIG. 29A is a detailed view of a main body pump coupling and a second guide unit according to an example of the present invention.
Figure 29B:
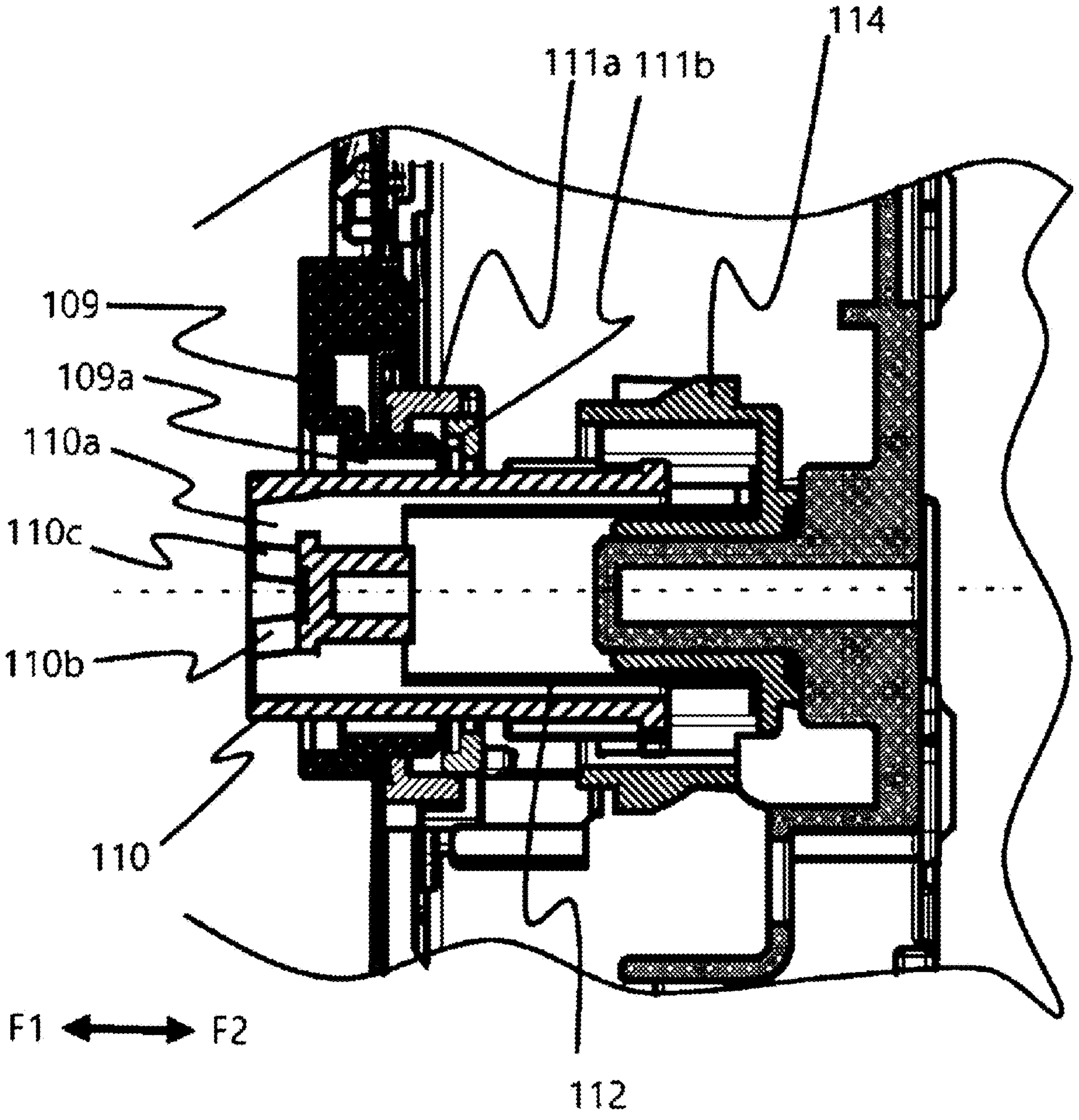
FIG. 29B is a cross-sectional view sectioned at a shaft line of the main body pump coupling, and is a cross-sectional view sectioned at the b-b line indicated in FIG. 29A.
Figure 30:
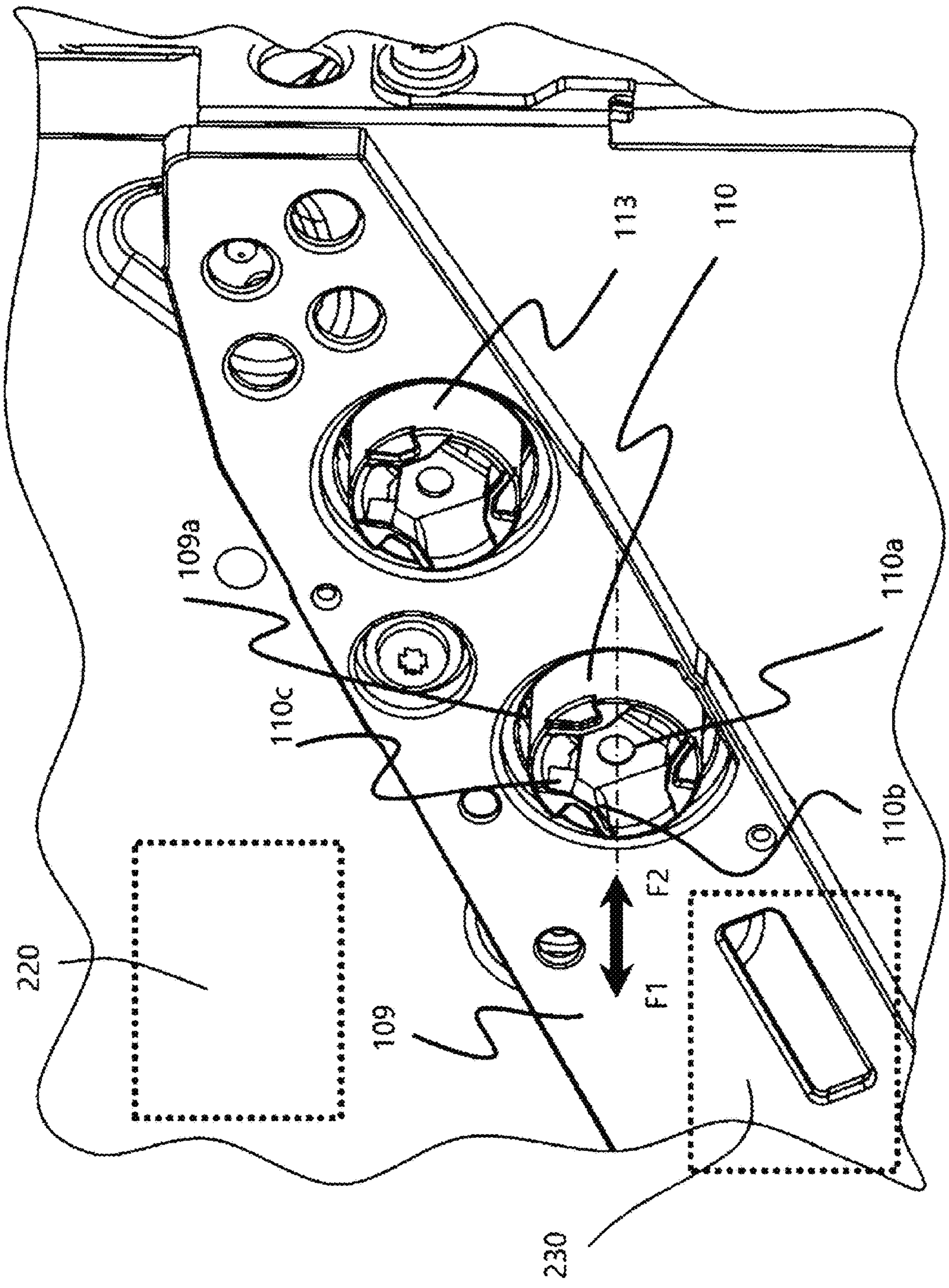
FIG. 30 is a peripheral view indicating the main body pump coupling and the second guide unit according to an example of the present invention.
Figure 31:
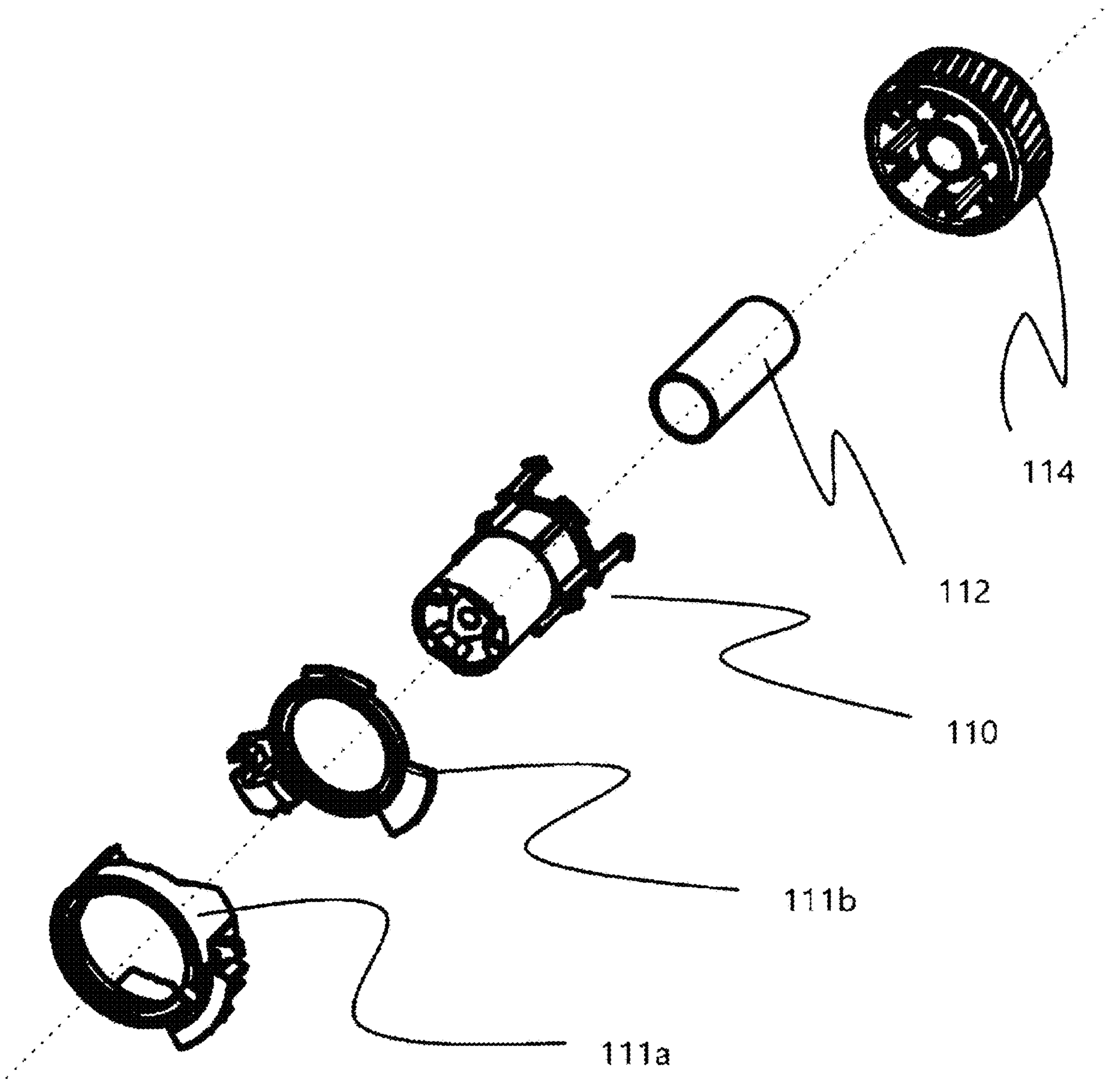
FIG. 31 is an exploded perspective view of peripheral components of the main body pump coupling according to an example of the present invention.

Now how the pump screw coupling portion 39*a* receives driving will be described with reference to FIGS. 18A to 18C, 28A and 28B, 29A and 29B, 30 and 31. FIG. 28A is a side view of the toner cartridge C viewed from the driving side, FIG. 28B is a cross-sectional view of the toner cartridge C sectioned at the shaft line G of the pump screw driving input unit 39, and is a cross section at the b-b line indicated in FIG. 28A. FIG. 29A is a detailed diagram of a main body pump coupling 110 and a second guide portion 109 of the printer main body A, and FIG. 29B is a cross-sectional view of the main body pump coupling 110 sectioned at the shaft line, and is a cross section at the b-b line indicated in FIG. 29A. FIG. 30 is a perspective view of the main body pump coupling 110 and the second guide portion 109 of the printer main body A. FIG. 31 is an exploded perspective view of peripheral components of the main body pump coupling 110.

As mentioned above, the pump screw coupling portion 39*a* is protruded and exposed from the driving side toner cartridge side cover 50 in the shaft line G of the pump screw driving input unit 39, and is engaged with a concave-shaped main body pump coupling 110 indicated in FIGS. 29A and 29B, whereby the pump screw coupling portion 39*a* is driven to rotate by the printer main body A.

In this example, as illustrated in FIG. 28A, the pump screw coupling portion 39*a* transfers driving using its triangular shape having three sides, which are disposed approximately evenly with respect to the shaft line G. The shape however is not limited to a triangle, as long as driving can be transferred. Further, as illustrated in FIG. 28B, the pump screw coupling portion 39*a* need not be disposed outside the outermost shape of the driving side toner cartridge side cover 50 on the shaft line G, as long as it is exposed from the driving side toner cartridge side cover 50.

The main body pump coupling 110 indicated in FIGS. 29A, 29B and 30 has a main body pump coupling concave 110*a*, which has a concave shape to receive the pump screw coupling portion 39*a*. On the side face of the main body pump coupling concave 110*a*, a main body pump coupling driving transfer surface 110*b*, which transfers driving force by contacting with the pump screw coupling portion 39*a* during normal rotation, and a reverse rotation driving transfer surface 110*c*, which transfers driving force during reverse rotation, are disposed.

The main body pump coupling 110 is disposed to be retractable (F1, F2) through a hole 109*a* which is disposed on the second guide portion 109 indicated in FIGS. 18A to 18C and 30. As illustrated in FIGS. 29A, 29B and 31, in the main body pump coupling 110, a cam mechanism 111 (111*a* and 111*b*) which advances and retracts the main body pump coupling 110 in accordance with the open operation of the door 107, a main body gear 114 which transfers driving force to the main body pump coupling 110, and a main body energizing spring 112 which energizes the main body pump coupling 110 in the protruding direction, are disposed.

When the main body pump coupling 110 is retracted by opening the door 107, the door 107 is open in this state, the toner cartridge C can be attached and detached by retracting the main body pump coupling 110 to the inner side of the second guide portion 109 in the shaft direction.

If the door 107 is closed, the main body pump coupling 110 moves in the shaft line direction F1 by the cam mechanism 111 and the main body energizing spring 112, and protrudes out of the second guide portion 109.

In a case where the phases of the pump screw coupling portion 39*a* and the main body pump coupling concave 110*a* match, the main body pump coupling 110 protrudes until engagement is possible by the closing of the door, whereby engagement can be performed.

In a case where the phases of the pump screw coupling portion 39*a* and the main body pump coupling concave 110*a* do not match, the main body energizing spring 112 is compressed and stops the protruding operation of the main body pump coupling 110. When the main body pump coupling 110 rotates and the phases of the pump screw coupling portion 39*a* and the main body pump coupling concave 110*a* match thereafter, compression of the main body energizing spring 112 is released, and the main body pump coupling 110 protrudes in the shaft line direction F1 whereby engagement can be performed.

By the above configuration, the pump screw coupling portion 39*a* and the main body pump coupling 110 can be engaged and released, and the shaft line of the pump screw coupling portion 39*a* and the shaft line of the main body pump coupling 110 approximately align with a same shaft line.

The same configuration is disposed in the main body stirring coupling 113 for the driving stirring coupling portion 38*a*. As illustrated in FIG. 30, a stirring motor 220 for driving the main body stirring coupling 113 to rotate, and a main body pump motor 230 for driving the main body pump coupling 110 to rotate, are disposed respectively, and respective driving force to rotate is transferred by a gear train (not illustrated).

Figure 32:
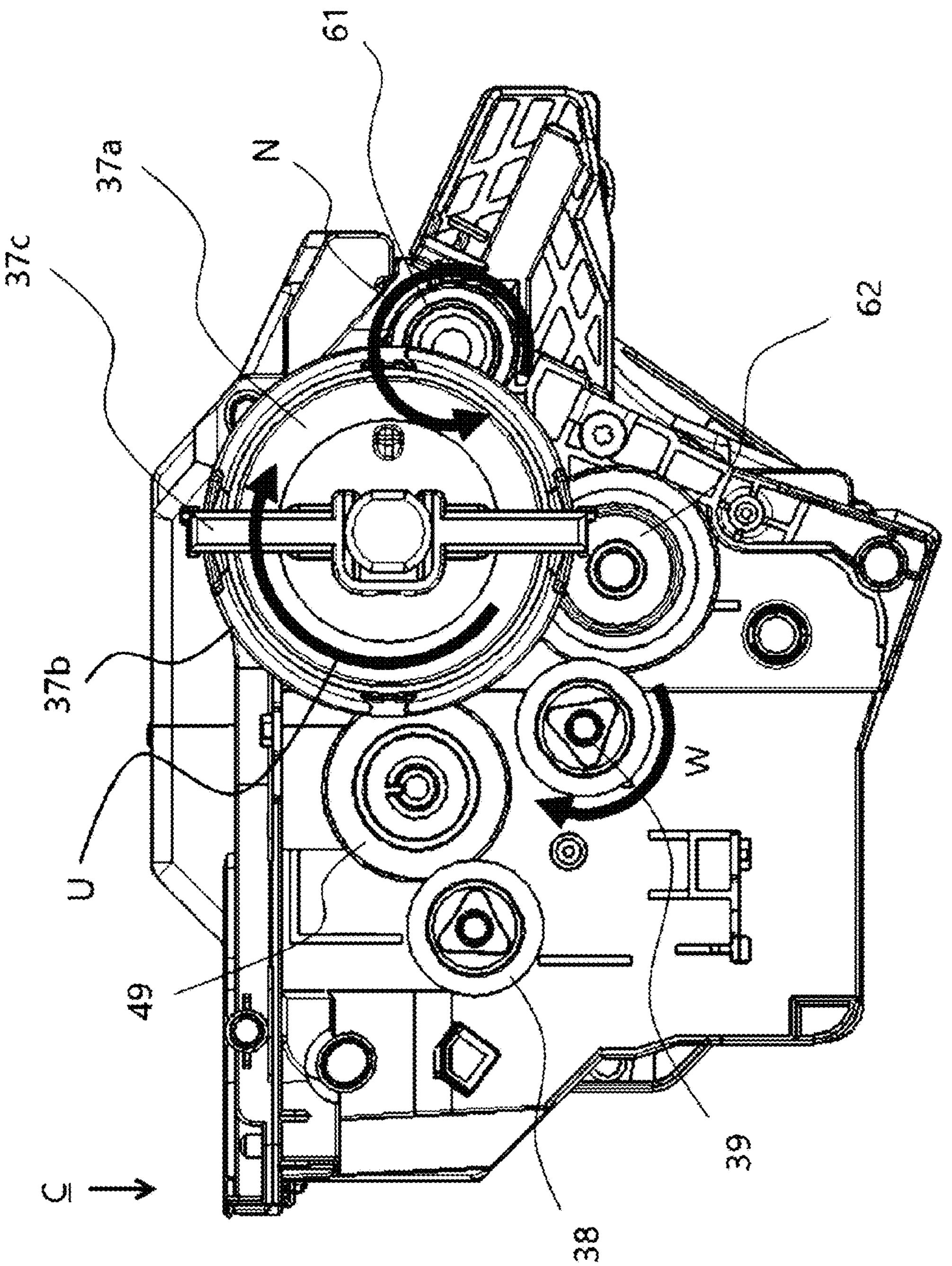
FIG. 32 is a side view of the toner cartridge viewed from the driving side, in a state where the driving side toner cartridge side cover is removed, according to an example of the present invention.

As illustrated in FIGS. 12 and 32, the pump unit 37 (air supply unit) includes: the pump 37*a* which is a volume variable unit of the image forming apparatus according to this example; the cam gear 37*b* which expands and contracts the pump 37*a*; and the link arm 37*c*. The cam gear 37*b* includes a gear portion 37*b*1 to input the driving force to rotate outputted from the pump screw coupling portion 39*a*. Hence the driving force transferred from the pump screw coupling portion 39*a* rotates the gear portion 37*b* 1 (that is, the cam gear 37*b*) via an idler gear 62. The link arm 37*c*, which is linked to the cam gear 37*b*, reciprocates in the shaft line G direction by the rotation of the cam gear 37*b*. The contact surface of the link arm 37*c* with the pump 37*a* is located more outward of the toner storing unit 30 than the pump 37*a* in the shaft line G direction, hence the pump 37*a* expands and contracts along the shaft line G by the above-mentioned reciprocating motion of the link arm 37*c*. In other words, the expanding and contracting direction of the pump 37*a* is approximately parallel with the shaft line G. On the other hand, the driving force to rotate is transferred from the cam gear 37*b* to a screw driving gear 61, whereby the conveying screw 35 is rotated.

As illustrated in FIGS. 13 and 14, the toner storing unit 30 includes the nozzle member 33*b* which is connected to the pump 37*a*. Further, the discharging port 34*a* of the shutter member 34 is disposed below the discharging port 31*a*. The shutter member 34 is a conveying pipe member of the image forming apparatus according to this example, and is rotatably installed to the toner cartridge C. The discharging port 34*a* is opened toward the outside of the toner cartridge C.

As illustrated in FIGS. 13 and 15A to 15F, the nozzle member 33*b* includes a pump side port 33*b*1 and a toner side port 33*b*2. The nozzle member 33*b* has a space inside, where a space, extending from the pump side port 33*b*1 in the shaft line G direction, is connected with a space extending from the toner side port 33*b*2 in a direction crossing with the shaft line G, that is, in a direction crossing with the conveying direction of the conveying screw 35. As illustrated in FIGS. 15A to 15F, a cross-sectional area of the toner side port 33*b*2 is smaller than a cross-sectional area of the pump side port 33*b*1.

As illustrated in FIG. 13, the toner side port 33*b*2 is disposed above the discharging port 31*a*. In the height direction of the toner cartridge C, the toner side port 33*b*2 is disposed between the rotation center of the conveying screw 35 and the discharging port 31*a*. Further, as illustrated in FIG. 13, when the toner cartridge C is viewed in the rotation shaft direction of the shutter member 34, the nozzle member 33*b* is disposed such that a part of the discharging port 31*a* overlaps with the extended line of the toner side port 33*b*2.

Air generated by the contracting operation of the pump 37*a* flows from the pump side port 33*b*1 toward the toner side port 33*b*2. Here the speed (flow rate) of the air flowing through the toner side port 33*b*2 becomes faster since the cross-sectional area of the toner side port 33*b*2 is smaller than the pump side port 33*b*1. The air flowing through the toner side port 33*b*2 is sent to the toner containing portion 31*a*1 (FIG. 7), in which toner conveyed by the conveying screw 35 is contained, and is mixed with the toner. This toner mixed with air is discharged from the discharging port 31*a* and is then discharged from the discharging port 34*a* via a shutter entrance 34*g*, is conveyed, and is supplied to the replenishing port 21*c* of the process cartridge B. In other words, the pump 37*a* supplies air, so as to convey the toner in the toner containing portion 31*a*1 from the discharging port 34*a* toward the replenishing port 21*c*.

As described above, the replenishing operation (first operation) is an operation of the conveying screw 35 conveying the toner from the toner storing chamber 30*a* to the toner containing portion 31*a*1, and the pump 37*a* supplying air from the discharging port 34*a* toward the replenishing port 21*c* via the toner containing portion 31*a*1.

As described above, in the toner cartridge C of the image forming apparatus according to this example, the toner side port 33*b*2 of the nozzle member 33*b* is located at a position distant from the discharging port 31*a*, facing in the direction crossing the conveying direction of the conveying screw 35. By this configuration, in the image forming apparatus according to this example 1, the entry of toner into the pump 37*a* can be prevented even if the user turns the pump 37*a* of the toner cartridge C downward. If the toner enters into the pump 37*a*, force required to expand and contract the pump 37*a* increases. Since the image forming apparatus according to this example, which has the above-mentioned configuration, can reduce the amount of toner entering the pump 37*a*, an increase of the torque applied to the pump screw coupling portion 39*a* can be prevented.

Further, in the toner cartridge C according to this example, in order to efficiently send the air, generated by the contracting operation of the pump 37*a*, toward the discharging port 34*a*, a supply chamber 30*b* is disposed along the conveying direction of the conveying screw 35. Specifically, the supply chamber 30*b* is disposed at the downstream side of the leveling portion 33*a*1 in the conveying direction of the conveying screw 35, and the supply chamber 30*b* is separated by the partition member 33*a*, the nozzle member 33*b*, the storing unit cover 32 and the storing frame 31, so as to part from the toner storing chamber 30*a*. Concerning the cross-sectional areas of the toner storing chamber 30*a*, the supply chamber 30*b* and the conveying path 30*c*, the toner storing chamber 30*a* is the largest, the supply chamber 30*b* is the second largest, and the conveying path 30*c* is the smallest.

The shutter member 34 is a toner conveying unit which includes the toner conveying nozzle (toner conveying member) of the toner cartridge C according to this example, and is equipped with the conveying path CP and the discharging unit, which are used to supply toner from the toner cartridge C to the process cartridge B. The shutter member 34 is rotatable in accordance with the operation to attach the toner cartridge C to the printer main body A, and the later mentioned discharging port 34*a* can be opened and closed by this rotation. Specifically, the shutter member 34 according to this example can enter the state to discharge toner (open state) or the state of sealing toner (close state) by the shutter member 34 rotating. By switching between the open state and the closed state, the shutter member 34 can control whether or not the toner is supplied to the process cartridge B. The close state of the shutter member 34 is a state where the path from the discharging port 31*a* of the storing frame 31 to a conveying portion 34*b* of the shutter member 34 is closed.

As illustrated in FIGS. 13 and 14, the shutter member 34 includes a shutter entrance 34*g* which receives toner from the discharging port 31*a*, the discharging port 34*a*, the conveying portion 34*b* which conveys toner between the shutter entrance 34*g* and the discharging port 34*a*, and an edge portion 34*d*. The discharging port 34*a* functions as a discharging portion of toner of the toner cartridge according to this example, and is an opening formed by the edge portion 34*d*. In other words, the edge portion 34*d* forms a tubular front end area, which is formed by an opening part of the conveying portion 34*b* and the discharging port 34*a*.

The state illustrated in FIG. 14 is a state where the shutter member 34 is open. In this example, the discharging direction in which toner is discharged from the discharging port 34*a* is a discharging direction E, and is indicated by a broken line arrow in FIG. 14. The conveying direction in which toner is conveyed by the conveying portion 34*b* is a conveying direction CV, and is indicated by a two dot chain line arrow in FIG. 14. In this example, the conveying portion 34*b* is bent halfway, as mentioned later, hence the conveying direction CV is indicated as divided into a plurality of components (first conveying direction CV1, second conveying direction CV2).

As illustrated in FIG. 14, in a state where the toner cartridge C is attached to the printer main body A, a part of the conveying portion 34*b* crosses with the shaft line G, which is the driving shaft line of rotation of the pump screw driving input unit 39, and extends in a direction departing from the shaft line G. In other words, the first conveying direction (first direction) CV1 of the toner conveyed by the conveying portion 34*b* includes a component of a direction, which crosses with the shaft line G of the pump screw driving input unit 39 and departs from the shaft line G.

Further, as illustrated in FIG. 14, the other part of the conveying portion 34*b* extends in a direction parallel with the shaft line G, which is the driving shaft line of rotation of the pump screw driving input unit 39, and extends in a direction departing from the pump screw coupling portion 39*a*. In other words, the second conveying direction CV2 of the toner by the conveying portion 34*b* includes a component of a direction, which is parallel with the shaft line G of the pump screw driving input unit 39 and departs from the pump screw coupling portion 39*a* which receives driving force to convey the toner.

As illustrated in FIG. 14, the toner discharged from the discharging port 34*a* is discharged in a discharging direction E, which is parallel with the shaft line G and departs from the pump screw coupling portion 39*a*. In other words, the discharging direction (second direction) E of toner discharged from the discharging port 34*a* includes a component of a direction, which is parallel with the shaft line G of the pump screw driving input unit 39 and departs from the pump screw coupling portion 39*a* to receive the driving force to convey toner. The component included in the discharging direction E of the toner in the discharging port 34*a* and the component included in the second conveying direction CV2 related to the path from the conveying portion 34*b* to the discharging port 34*a* at least partially match.

Figure 16A:
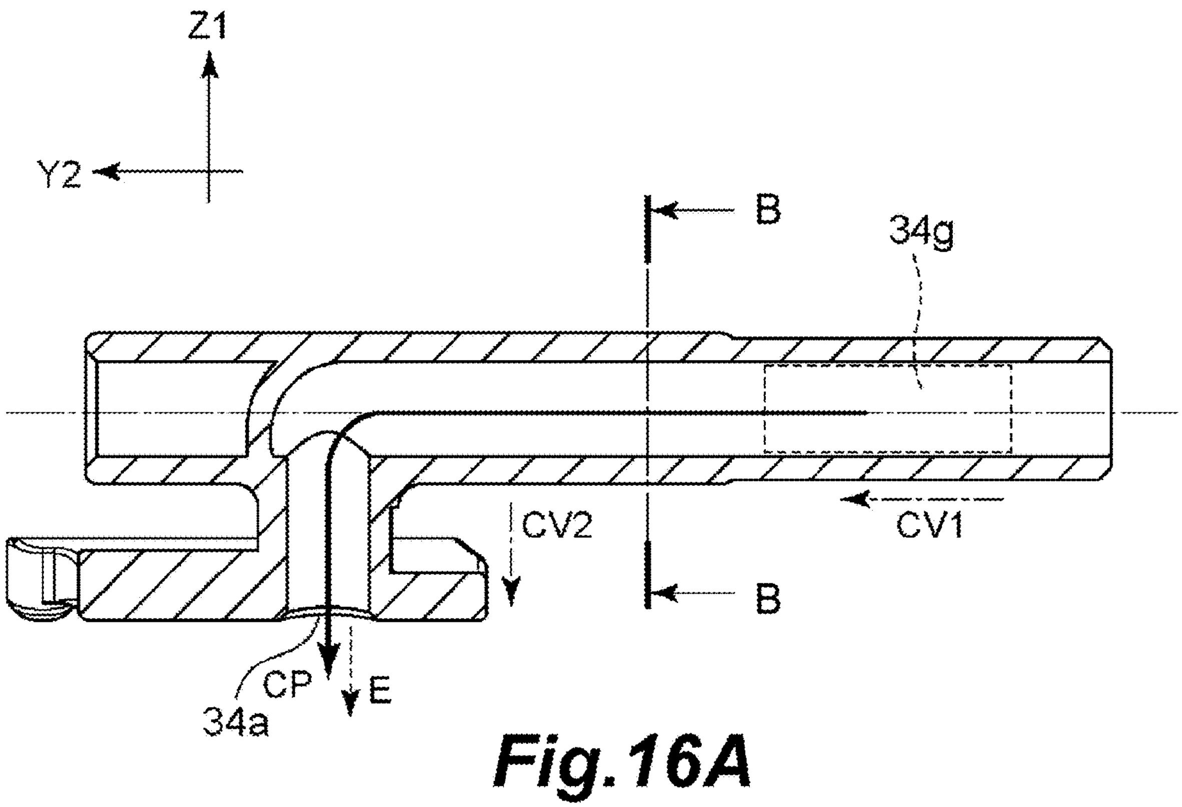
FIGS. 16A and 16B are cross-sectional views of a shutter member exemplifying a conveying path of the shutter member according to an example of the present invention.
Figure 16B:
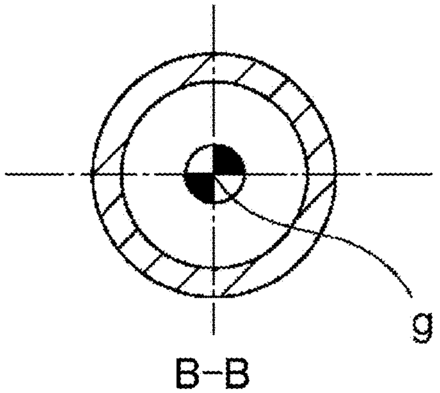

The conveying path CP of the toner in the shutter member 34 will be described in detail with reference to FIGS. 16A and 16B. FIG. 16A is a cross-sectional view of the shutter member 34 at a cross section parallel with the first conveying direction CV1 of the toner conveyed by the conveying portion 34*b*, FIG. 16B is a cross-sectional view of the shutter member 34 at a cross section orthogonal to the first conveying direction CV1, and is the cross section at the B-B line in FIG. 16A. The conveying path CP of the toner is a path where the toner moves on the conveying portion 34*b* on the shutter member 34. As illustrated in FIG. 16B, in the cross section of the conveying portion 34*b* orthogonal to the conveying path CP indicated by the solid line arrow, a center of gravity g of the cross section is assumed to be at an arbitrary position on the conveying path CP. However, in the case of an area where the cross section of the conveying portion 34*b* is partially missing, it is difficult to define the accurate position of the center of gravity g. Therefore, in this example, a point at the most upstream side of the conveying portion 34*b*, of which cross section has no defects, is defined as the start point of the conveying path CP, and a point at the most downstream side thereof is defined as the end point of the conveying path CP. The cross section of the conveying portion 34*b* related to the conveying path CP of the toner is not limited to a circle. For example, the cross section of the conveying portion 34*b* may be any shape, as long as the center of gravity g can be easily calculated or estimated, that is, unless the edge line of the cross section of the conveying portion 34*b* is disconnected, or the form changes radically, for example.

In this example, the continuous line connecting each center of gravity of the cross section of the conveying path CP of the toner is defined as a toner conveying line. The toner conveying line is a line indicating the major path in the conveying path CP of the toner, and normally passes through approximately the center of each cross section, except in an area where there are major angular variations in the shape of the conveying portion 34*b*. The direction of the conveying line of the toner is the toner conveying direction at each point. The second conveying direction CV2, which is the toner conveying direction at the end point of the conveying path CP of the toner, is the same as the discharging direction E of the toner.

As described above, the toner discharged from the discharging port 34*a* is discharged in the discharging direction E, which has a component of a direction, which is parallel with the shaft line G and departs from the pump screw driving input unit 39 (see FIG. 14). Because of this configuration, the image forming apparatus according to this example can prevent the coupling portion of the printer main body A, which is engaged with the pump screw coupling portion 39*a* of the toner cartridge C, from being soiled by the toner.

Further, as illustrated in FIG. 8, the shutter member 34 is disposed on the side where the pump screw driving input unit 39 of the toner storing unit 30 is located in the longitudinal direction (direction parallel with the above-mentioned Z axis) of the toner cartridge. Specifically, the shutter member 34 according to this example is located on the side where the pump screw driving input unit 39 is disposed, with respect to the center position of the toner storing unit 30 at least along the Z axis. Therefore, in the toner cartridge C according to this example, the loss of the discharging force when discharging toner caused by the volume change of the pump 37*a* can be minimized, and an increase in the size of the discharge mechanism is prevented.

Further, as illustrated in FIG. 6, a recording medium (electric substrate) 203 having an electric contact portion 203*a*, which is an electrode used for electrical connection with the printer main body A side, is disposed on the same side as the shutter member 34 in the longitudinal direction of the toner cartridge C. The recording medium 203 is a recording unit for the toner cartridge C to store various information related to itself. When the electric contact portion 203*a* is connected with a main body side contact portion (not illustrated) disposed on the printer main body A, the communication between the printer main body A and the toner cartridge C is established, and an exchange of information therebetween becomes possible. In the state where the toner cartridge C is attached to the printer main body A, the electric contact portion 203*a* is located above the discharging port 34*a* of the shutter member 34 in the gravity direction, which is approximately orthogonal to the longitudinal direction of the toner cartridge C. Hence in the configuration of the toner cartridge C of this example, the electric contact portion 203*a* is less affected by the scattering of toner. Further, the electric contact portion 203*a* is disposed on the driving side toner cartridge side cover 50, which will be described later. Furthermore, a shutter opening and closing rib 200 (shutter opening and closing member) is disposed on the storing unit cover 32, as illustrated in FIGS. 8, 10 and 11. The shutter opening and closing rib 200 is a member that opens and closes a laser shutter RS which covers the laser scanner 101 disposed inside the laser printer 1. Specifically, when the shutter opening and closing rib 200 moves the above-mentioned mechanism to open the laser shutter RS in the opening direction interlocking with insertion of the toner cartridge C, the laser scanner 101 can expose the surface of the photosensitive drum 11. In other words, interlocking with the insertion of the toner cartridge C to the printer main body A, the laser shutter RS in the closed state opens. Here the process cartridge B has been inserted into the printer main body A before the toner cartridge C, but the operation to open and close the laser shutter RS by the shutter opening and closing rib 200 is performed without using the process cartridge B.

When the toner cartridge C is not attached to the printer main body A, the laser shutter RS is in the closed state. Therefore, even if a laser beam is emitted from the laser scanner 101 in error in a state where the toner cartridge C is attached, a laser beam leak from the printer main body A can be prevented.

As illustrated in FIG. 10, it is preferable that the shutter opening and closing rib 200 is disposed above the conveying screw 35 when the toner cartridge C is viewed from the rear face side, so as to overlap with the supply chamber 30*b* and/or the conveying path 30*c*. In other words, in the direction parallel with the Z axis, the shutter opening and closing rib 200 is disposed at the same position as the supply chamber 30*b* and/or the conveying path 30*c*. Here the upper side of the toner cartridge C is the opposite side of the gravity direction, in the case of attaching the toner cartridge C to the printer main body A positioned on a flat surface.

In order for the cross-sectional area of the toner storing unit 30 in the toner conveying direction to be toner storing chamber 30*a*>supply chamber 30*b*>conveying path 30*c*, as mentioned above, the space of the area overlapping with the supply chamber 30*b* and the conveying path 30*c* must be smaller than the toner containing portion 31*a*1. Specifically, the dimension of the toner storing chamber 30*a* on the opposite side of the gravity direction (that is, the upper side) must be limited such that the dimension of the supply chamber 30*b* and the conveying path 30*c* become smaller than the toner containing portion 31*a*1. Therefore, in the image forming apparatus according to this example, the shutter opening and closing rib 200 is disposed in an area that is at the upstream side of the toner cartridge C in the attaching direction, where the influence on the volume of the toner cartridge Cis small. By disposing the shutter opening and closing rib 200 at the upstream side in the attaching direction, the mechanism to open and close the laser shutter, interlocking with the attaching operation of the toner cartridge C to the printer main body A, can be easily implemented.

In the cartridge detachable type image forming apparatus, a cartridge of which compatibility with the printer main body A is known may be attached in error.

Anticipating such a case, in this example, a plurality of slits 32*c*, to selectively insert the shutter opening and closing rib 200, are disposed on the storing unit cover 32. Since an incompatible cartridge interferes with the shutter opening and closing rib 200 in this configuration, attaching an incompatible cartridge to the printer main body A in error can be prevented.

Method of Attaching and Detaching Process Cartridge B and Toner Cartridge C

Figure 17A:
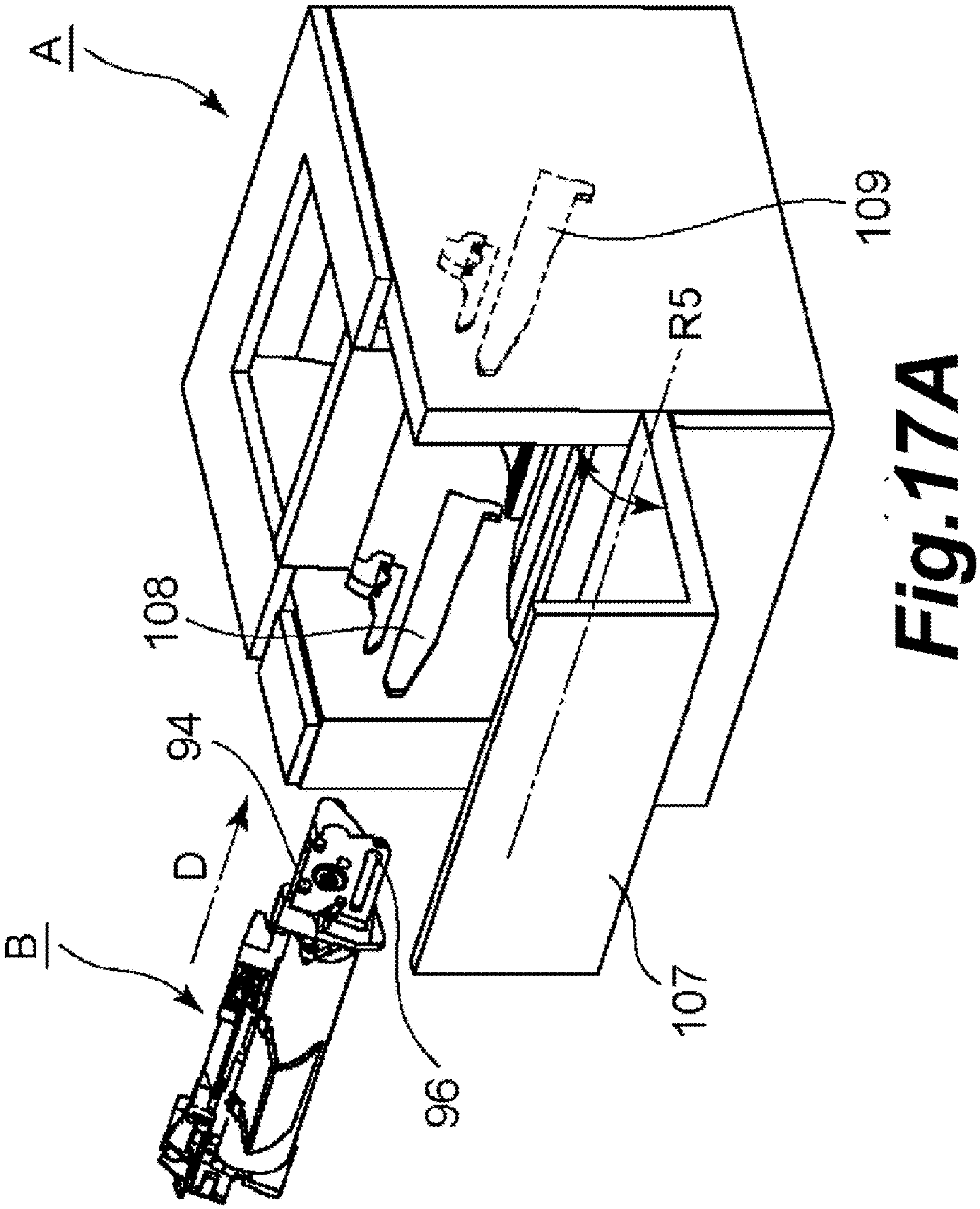
FIG. 17A is a perspective view exemplifying a method of attaching the process cartridge according to an example of the present invention to the printer main body A.
Figure 17B:
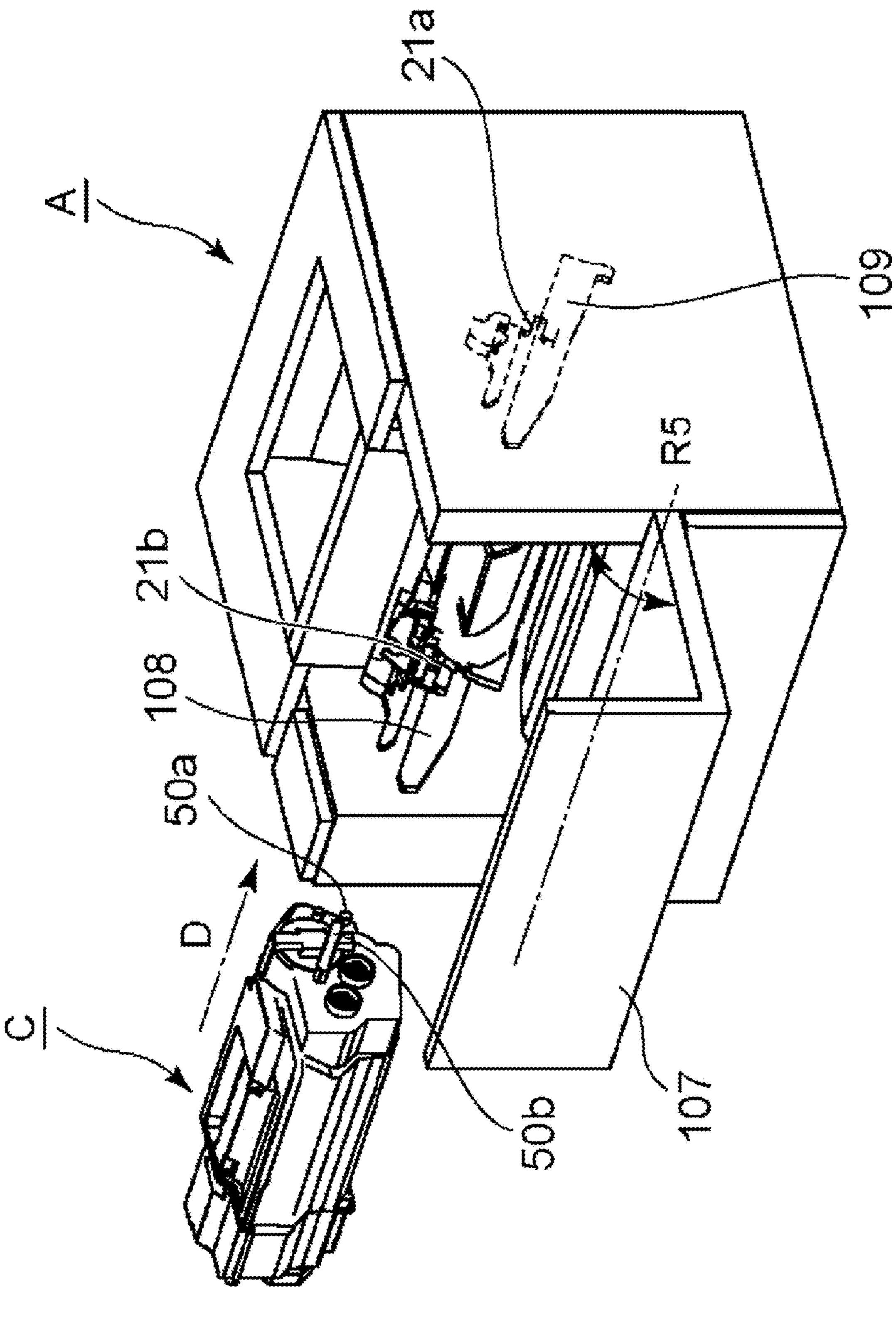
FIG. 17B is a perspective view exemplifying a method of attaching the toner cartridge to the printer main body A.
Figure 18A:
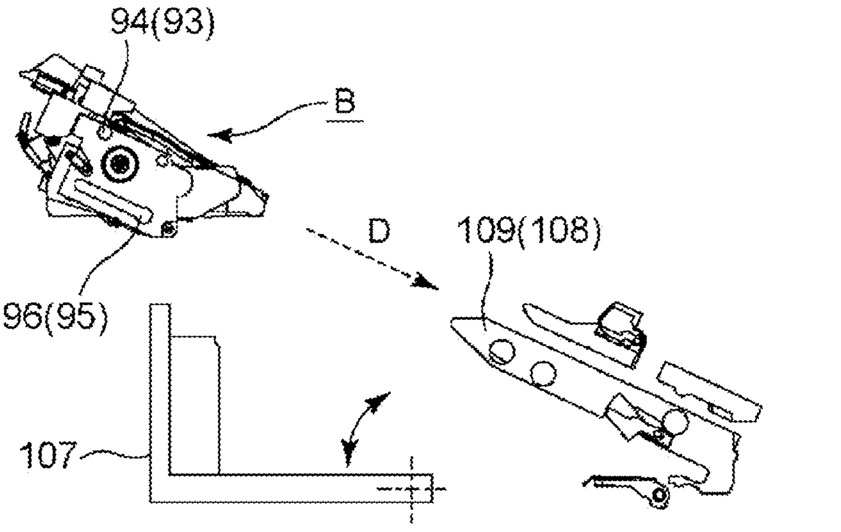
FIG. 18A is a side view exemplifying a method of attaching the process cartridge according to an example of the present invention to the printer main body A.
Figure 18B:
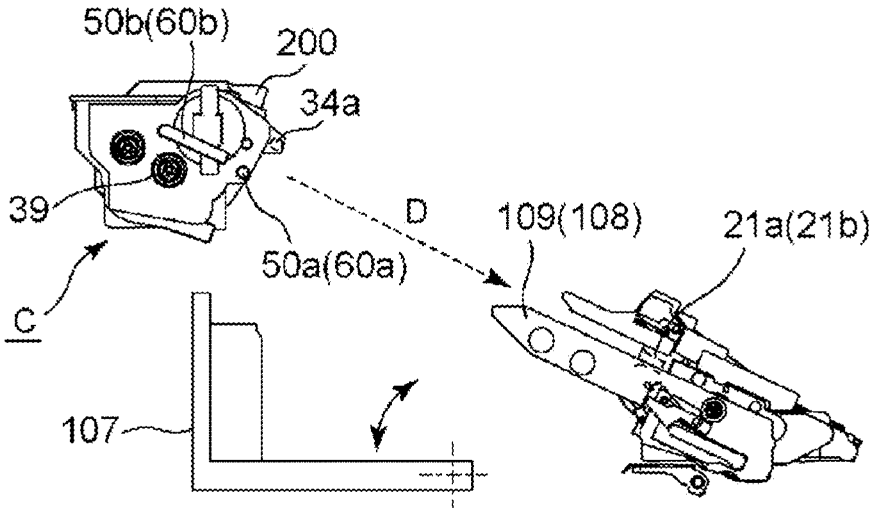
FIGS. 18B and 18C are side views exemplifying a method of attaching the toner cartridge to the printer main body A.
Figure 18C:
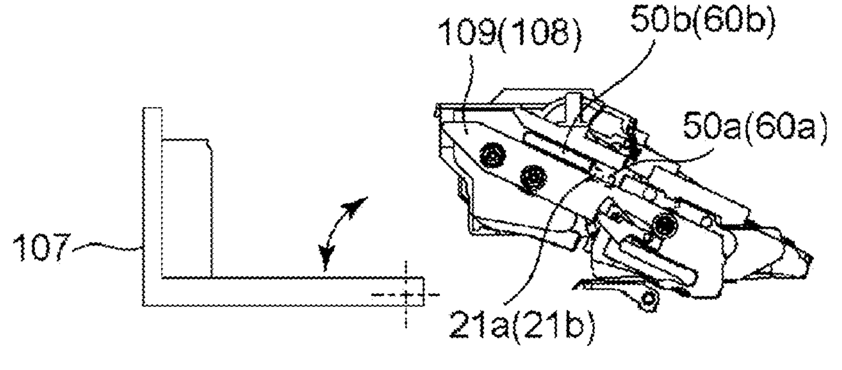

The method of attaching and detaching the process cartridge B and the toner cartridge C to and from the printer main body A will now be described in detail with reference to FIGS. 17A and 17B and 18A to 18C. FIGS. 17A and 17B are perspective views exemplifying the method of attaching the process cartridge B and the toner cartridge C to the printer main body A according to an example of the present invention. FIG. 17A indicates the method of attaching the process cartridge B, and FIG. 17B indicates the method of attaching the toner cartridge C respectively. FIGS. 18A to 18C are side views exemplifying the method of attaching the process cartridge B and the toner cartridge C to the printer main body A according to an example of the present invention. FIG. 18A indicates the method of attaching the process cartridge B, FIG. 18B indicates the method of attaching the toner cartridge C, and FIG. 18C indicates the state where the process cartridge B and the toner cartridge C are attached to the printer main body A.

As illustrated in FIG. 17A, the space inside the printer main body A is the attaching portions of the process cartridge B and the toner cartridge C. The door 107 is disposed in the printer main body A, so as to be rotatable around the rotation shaft line R5, and the state illustrated in FIG. 17A indicates a state where the door 107 is open.

The printer main body A includes the first guide portion 108 and the second guide portion 109. In the process cartridge B, an upper boss 93, an upper boss 94, a lower boss 95 and a lower boss 96 are disposed both on the left and right sides in the longitudinal direction respectively, as illustrated in FIGS. 17A and 17B.

Now a procedure to attach the process cartridge B and the toner cartridge C to the printer main body A will be described. First the process cartridge B attached to the printer main body A will be described. As illustrated in FIG. 17A, the upper boss 93 and the lower boss 95 hold the first guide portion 108 therebetween, the upper boss 94 and the lower boss 96 hold the second guide portion 109 therebetween, and the process cartridge B is inserted in the arrow D direction while being guided by the first and second guide portions. When insertion of the process cartridge B completes, the process cartridge B is positioned in the printer main body A.

Then the toner cartridge C is attached to the printer main body A. The user can hold a surface 32*a* disposed in the storing unit cover 32 and a surface 31*b* facing thereto with their fingers, and insert or extract the entire toner cartridge C. As illustrated in FIG. 18B, the toner cartridge C has a positioning boss 50*a* and a positioning boss 60*a* in a front area in the attaching direction, on both ends in the longitudinal direction. Guided portions 50*b* and 60*b* are disposed at the downstream side of the positioning boss 50*a* and the positioning boss 60*a* in the attaching direction. The positioning boss 60*a* is disposed on the non-driving side of the toner cartridge C, and is located at the same position (overlapping position) as the positioning boss 50*a* on the driving side in a case of projecting the toner cartridge C onto a plane orthogonal to the shaft line G. The guided portion 60*b* is disposed on the non-driving side of the toner cartridge C, and is located at the same position (overlapping position) as the guided portion 50*b* on the driving side, in the case of projecting the toner cartridge C onto a plane orthogonal to the shaft line G.

As illustrated in FIGS. 17A and 17B, the process cartridge B includes concave-shaped first positioning portion 21*a* and second positioning portion 21*b* on the stay 21, which are used for positioning the toner cartridge C.

Further, as illustrated in FIGS. 17B and 18B, the toner cartridge C is inserted in the D direction with the guided portion 50*b* and the guided portion 60*b* placed on the first guide portion 108 and the second guide portion 109 respectively. The state illustrated in FIG. 18C is a state where the process cartridge B and the toner cartridge C are completely attached. As illustrated in FIG. 18C, when the toner cartridge C is inserted until the attachment completion state, the positioning boss 50*a* and the positioning boss 60*a* are inserted into the first positioning portion 21*a* and the second positioning portion 21*b* respectively. At this time, the respective front ends of the guided portion 50*b* and the guided portion 60*b* in the inserting direction depart from the first guide portion 108 and the second guide portion 109, and the rear ends thereof contact with the first guide portion 108 and the second guide portion 109. In this state, the toner cartridge C is positioned at the process cartridge B. By the rear ends of the guided portion 50*b* and the guided portion 60*b* contacting the first guide portion 108 and the second guide portion 109 respectively, the position of the toner cartridge C inside the printer main body A is determined. In this state, the process cartridge B and the toner cartridge C are completely attached to the printer main body A. When the door 107 is closed thereafter, the laser printer 1 according to this example enters the state where image forming is possible. To extract (detach) the toner cartridge C and the process cartridge B from the printer main body A, each component operates in the reverse procedure of the above-mentioned procedure for attachment.

Toner Replenishing Path From Toner Cartridge C to Process Cartridge B

Figure 19A:
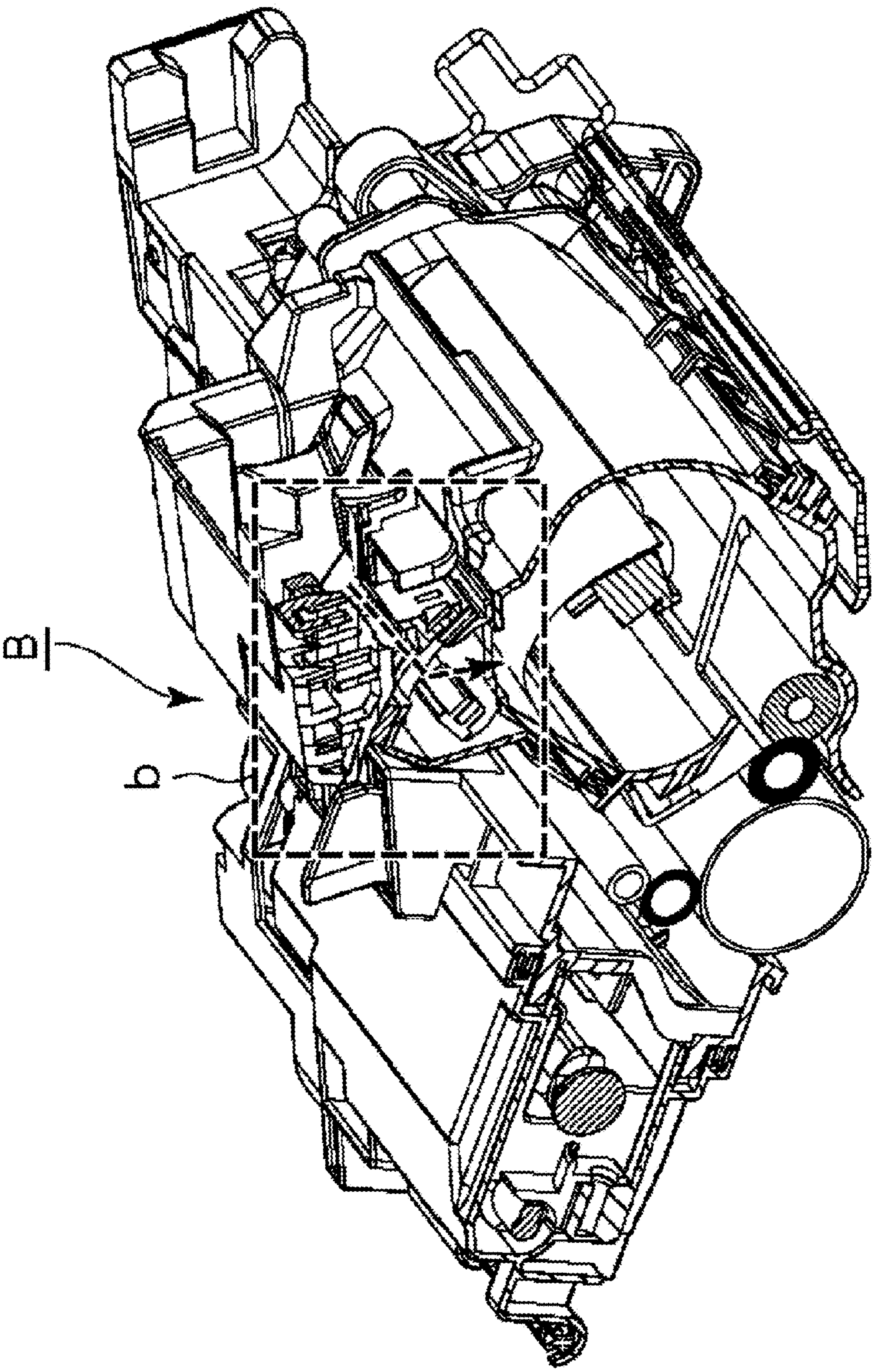
FIG. 19A is a cross-sectional perspective view exemplifying a replenishing port of the cartridge according to an example of the present invention.
Figure 19B:
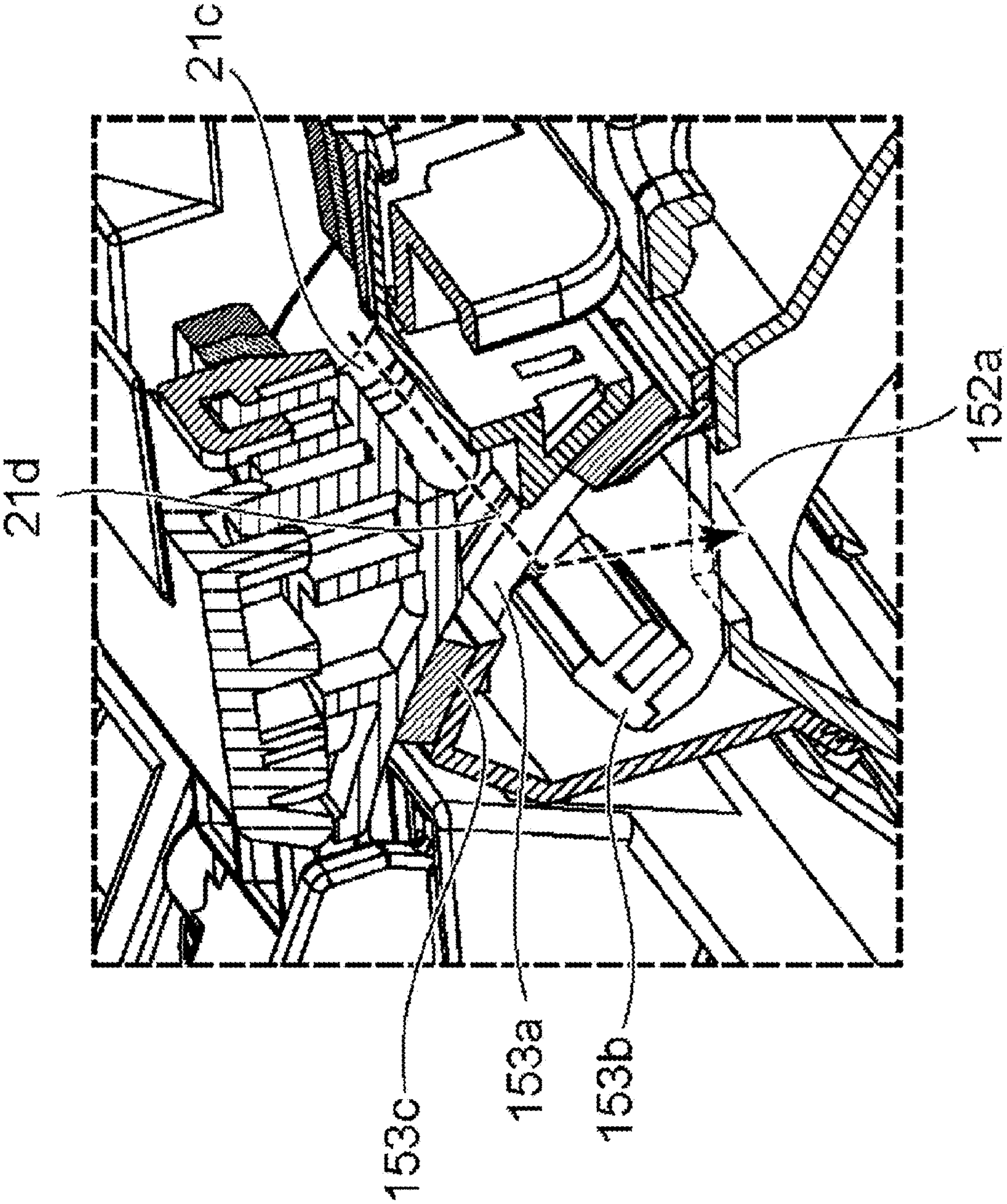
FIG. 19B is a cross-sectional perspective view exemplifying a replenishing port of the cartridge according to an example of the present invention.
Figure 20:
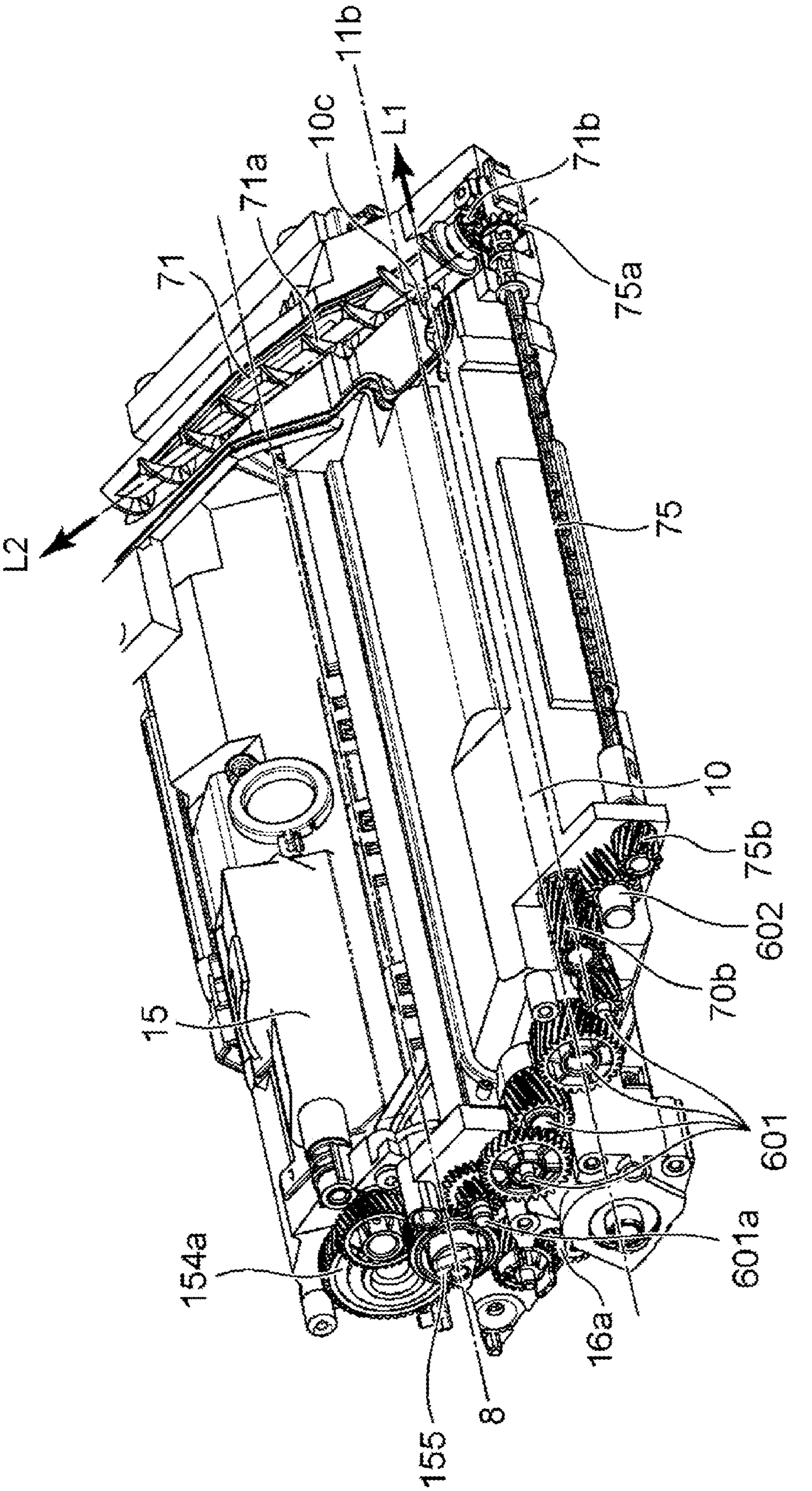
FIG. 20 is an exploded perspective view exemplifying a driving unit related to developing operation of the process cartridge according to an example of the present invention.
Figure 21:
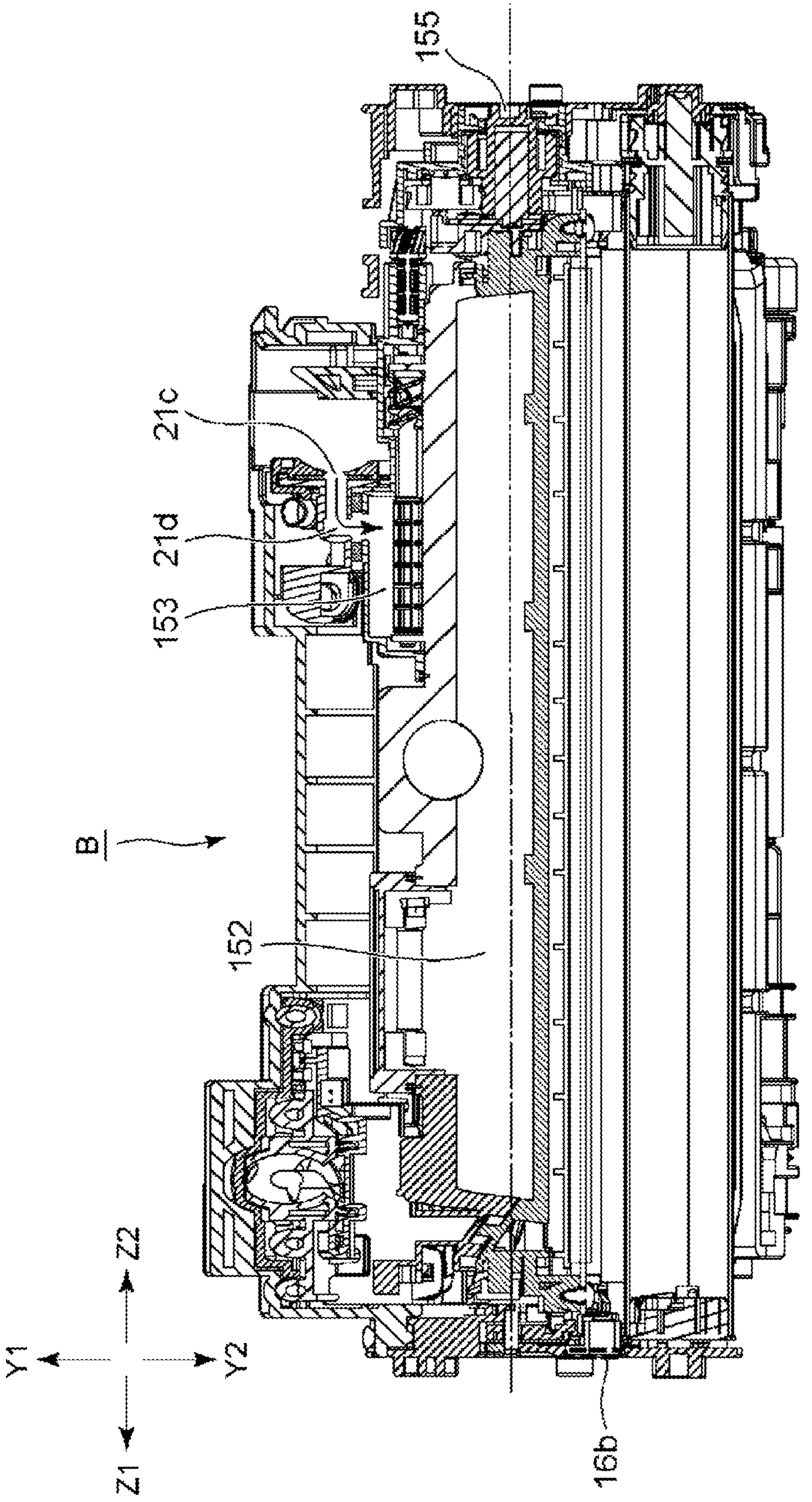
FIG. 21 is a schematic cross-sectional view of the process cartridge according to an example of the present invention.
Figure 22A:
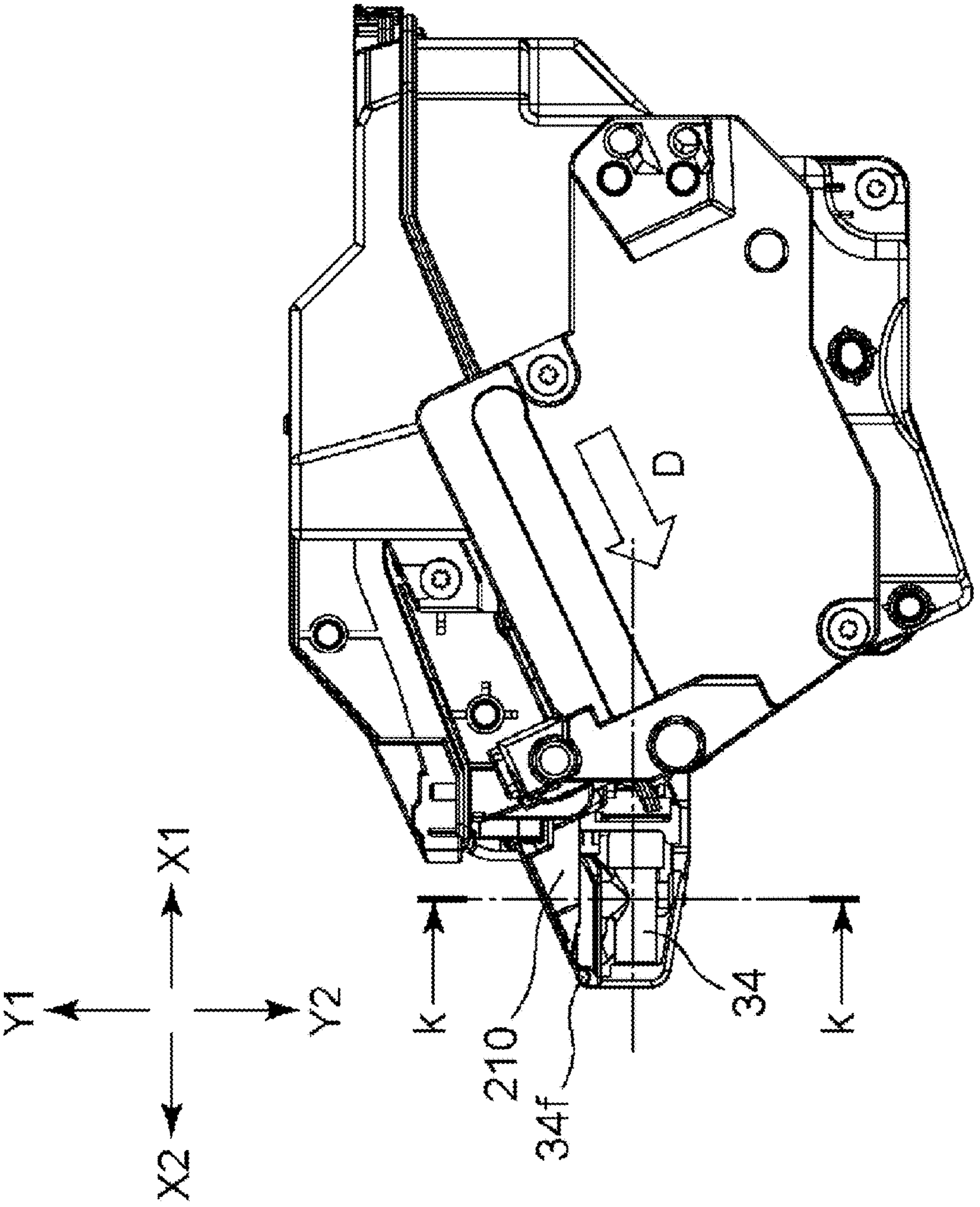
FIG. 22A is a side view of exemplifying a state of a shutter member of the toner cartridge sealing toner according to an example of the present invention.
Figure 22B:
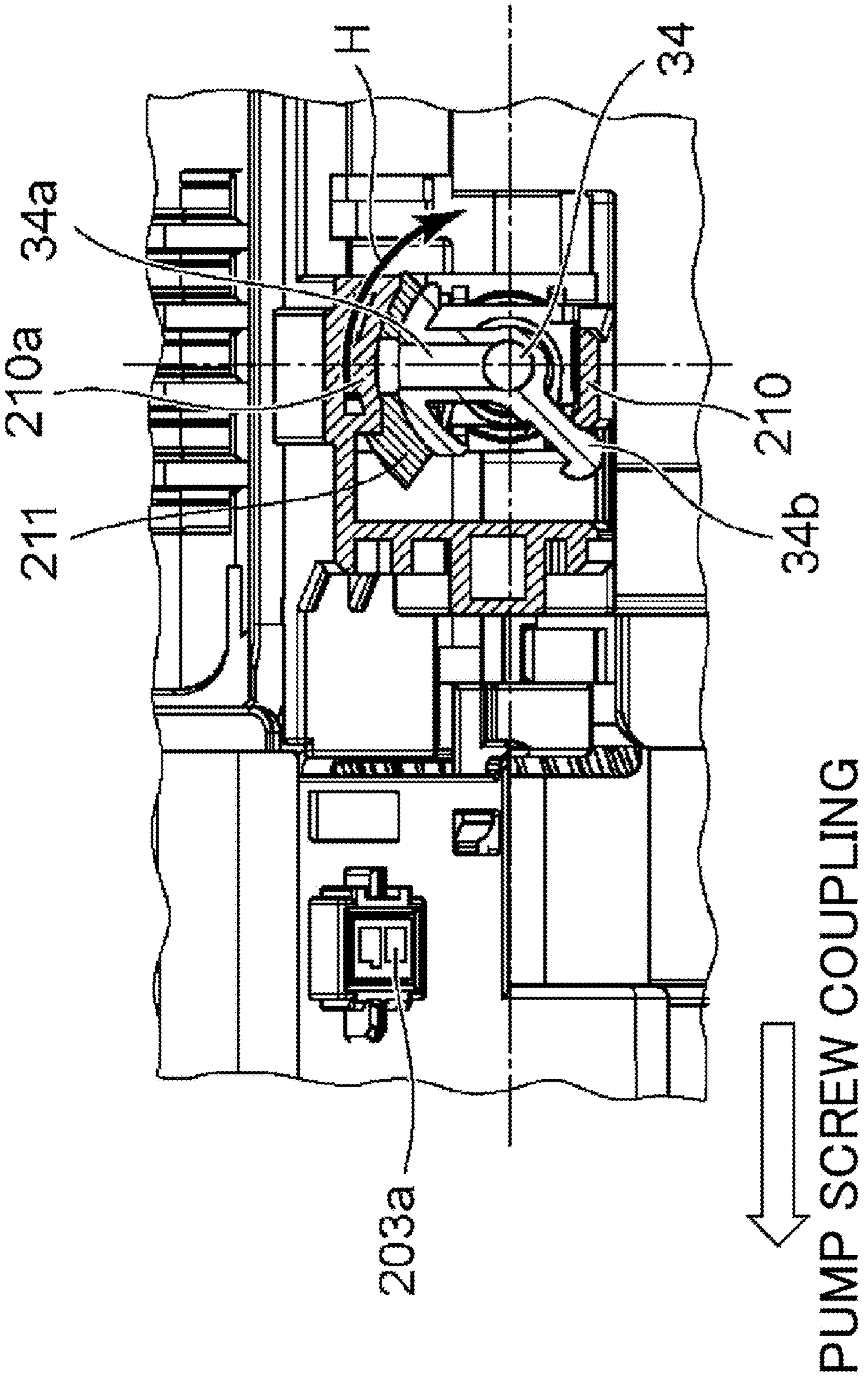
FIG. 22B is a cross-sectional view at the k-k line indicated in FIG. 22A.
Figure 23:
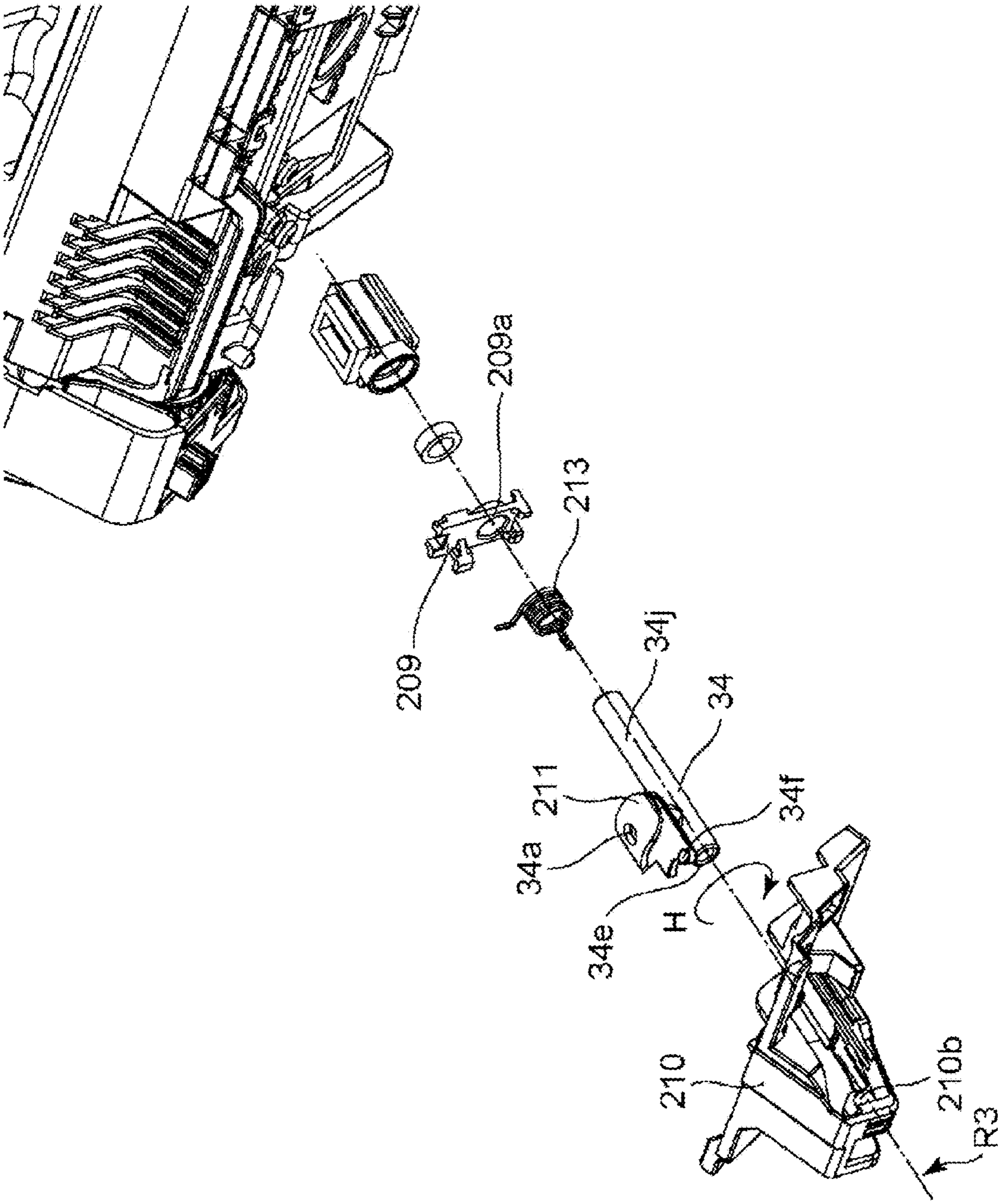
FIG. 23 is an exploded perspective view of the shutter member of the toner cartridge and peripheral components thereof according to an example of the present invention.
Figure 24G:
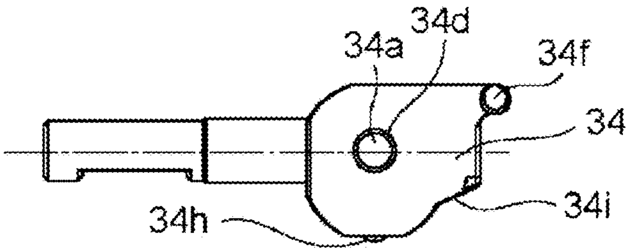
FIGS. 24A to 24H are a front view, a left side view, a right side view, a bottom view, and cross-sectional views of the shutter member according to an example of the present invention.
Figure 24C:
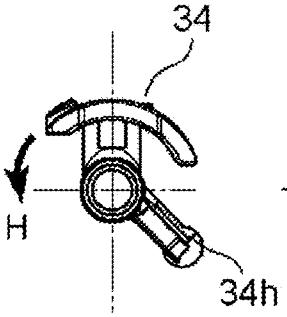
Figure 24A:
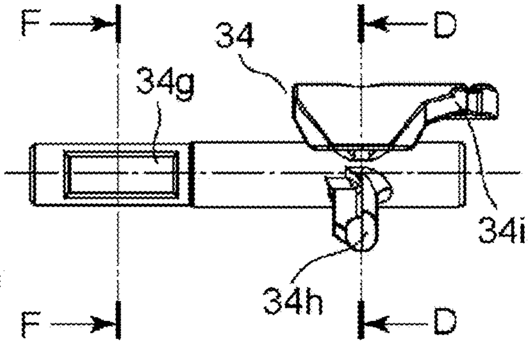
Figure 24H:
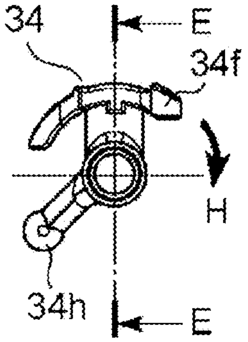
Figure 24F:
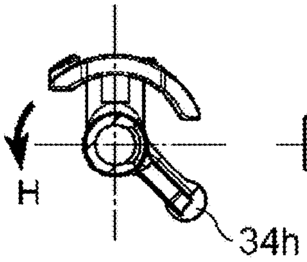
Figure 24B:
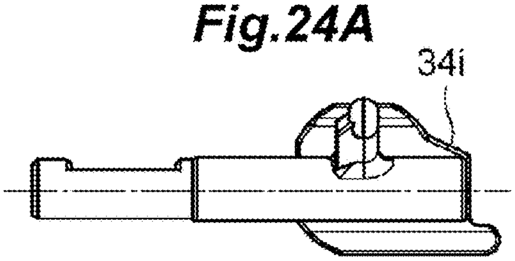
Figure 24D:
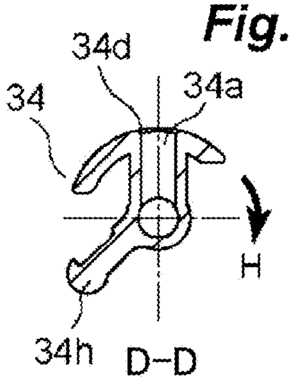
Figure 24E:
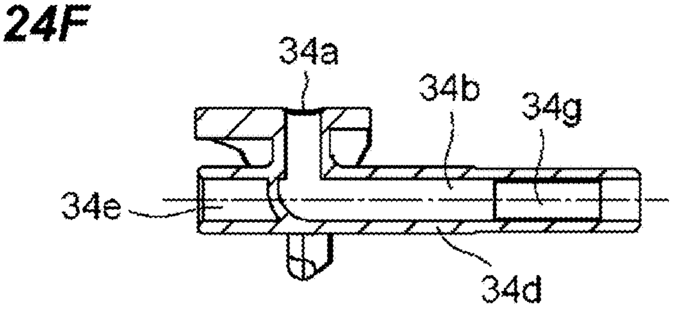
Figure 25A:
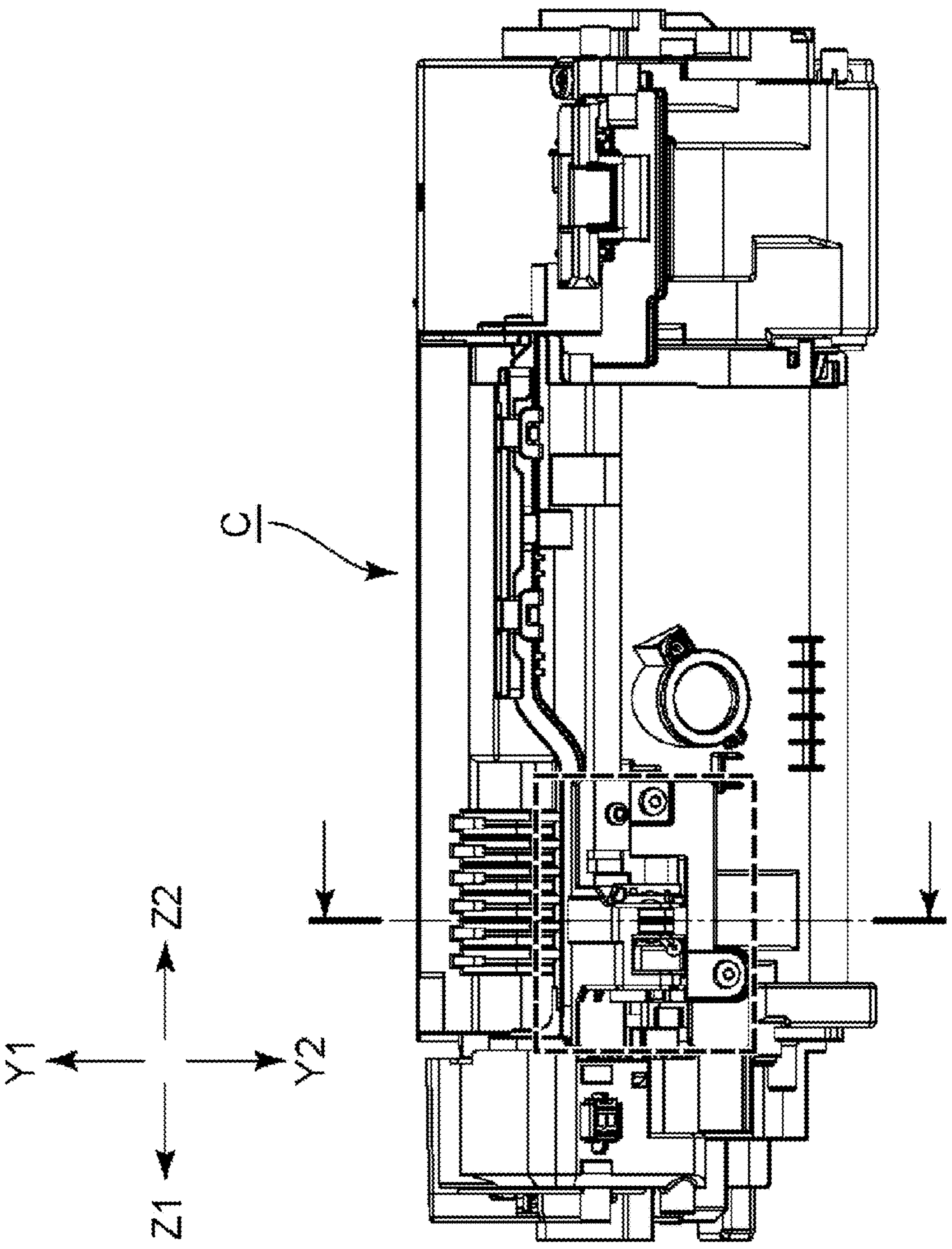
FIG. 25A is a front view indicating a state of the shutter member of the toner cartridge sealing toner according to an example of the present invention.
Figure 25B:
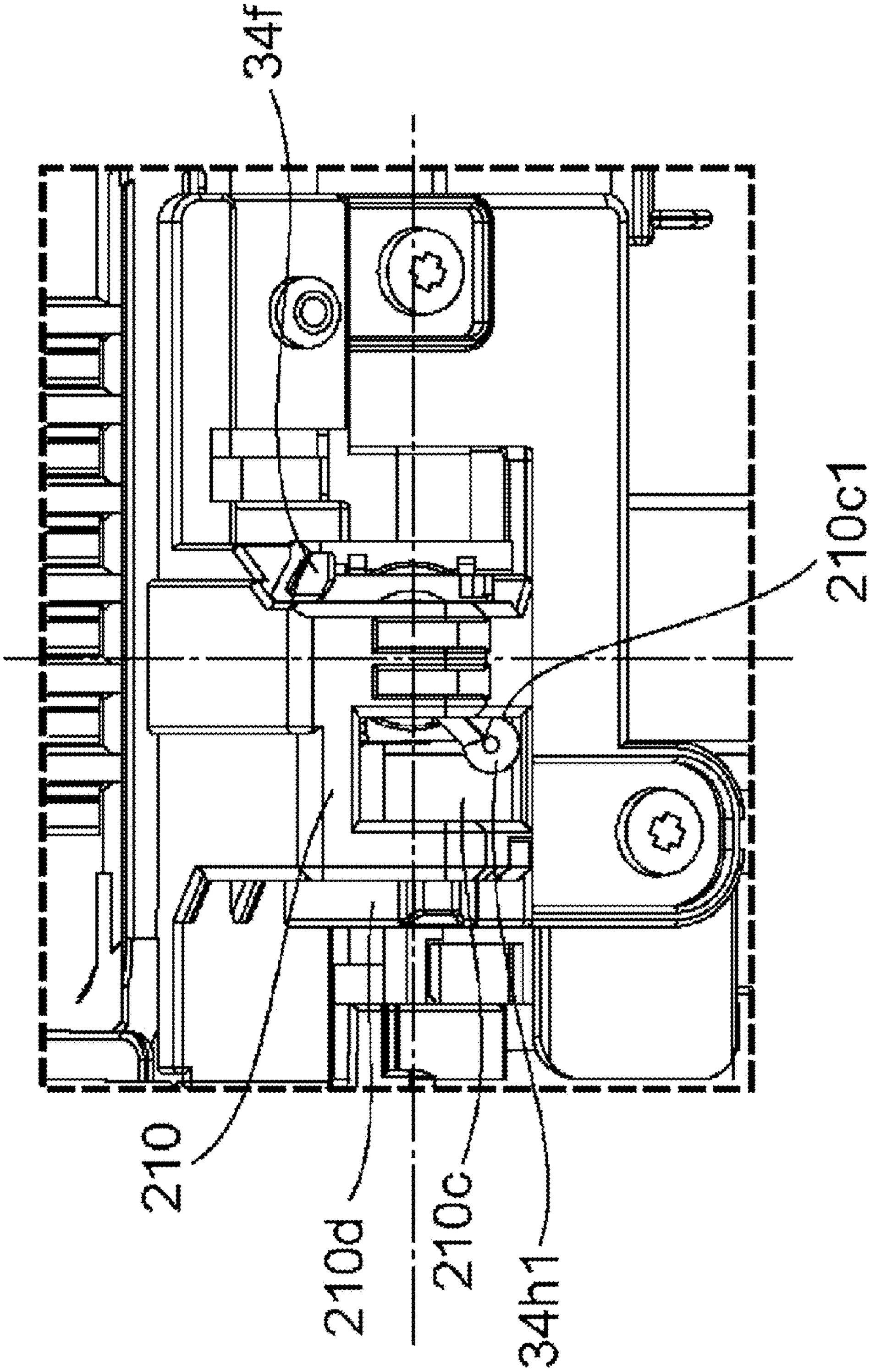
FIG. 25B is an enlarged view of a portion indicated by the reference sign b in FIG. 25A.
Figure 26A:
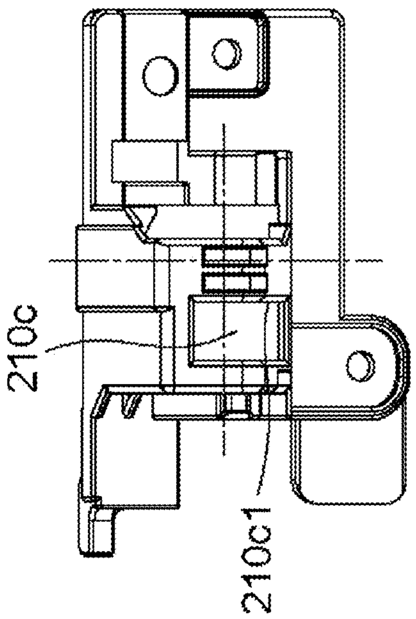
FIGS. 26A to 26E are a front view, a left side view, a right side view, a bottom view and cross-sectional views of a shutter protective member according to an example of the present invention.
Figure 26B:
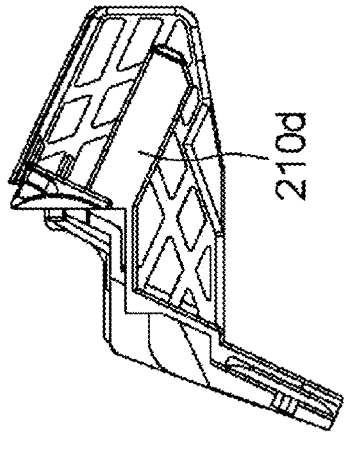
Figure 26C:
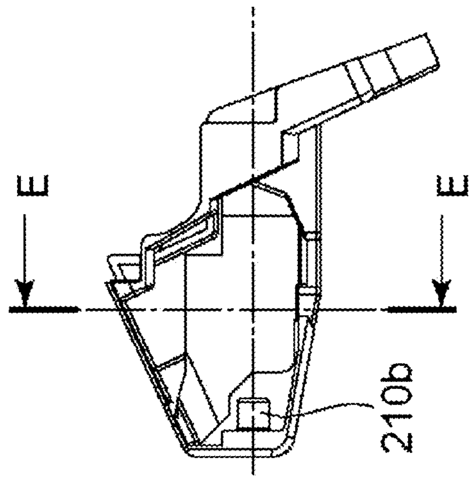
Figure 26D:
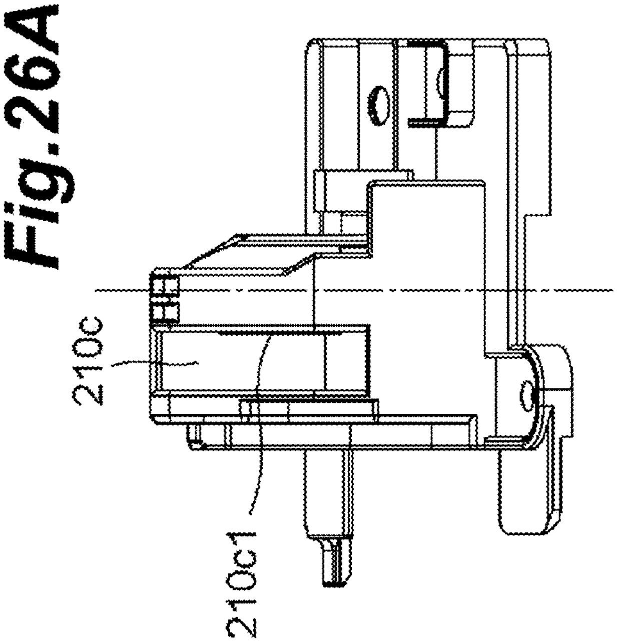
Figure 26E:
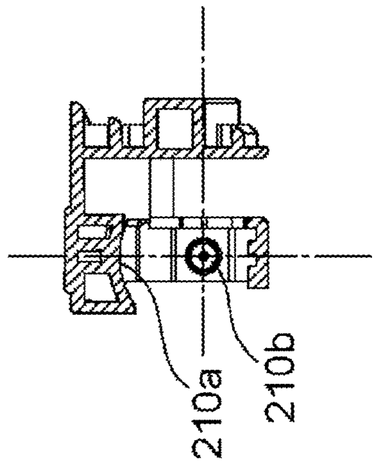
Figure 27:
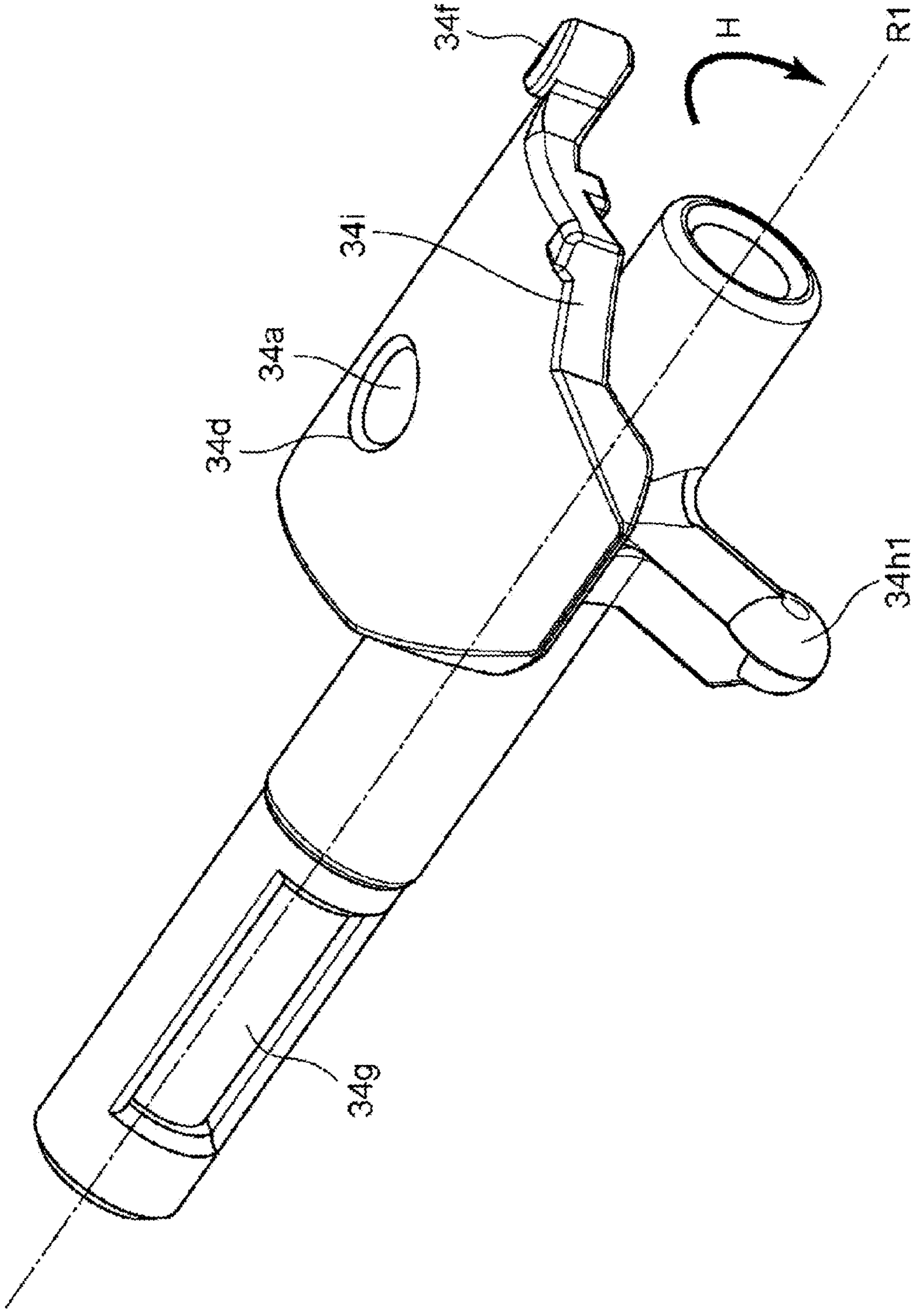
FIG. 27 is a perspective view of the shutter member according to an example of the present invention.

A toner replenishing path from the toner cartridge C to the process cartridge B will now be described in detail with reference to FIGS. 19A, 19B and 20. FIG. 19A is a cross-sectional perspective view exemplifying a replenishing port of the process cartridge B according to this example of the present invention, and FIG. 19B is an enlarged view of a portion indicated by a reference sign b in FIG. 19A. FIG. 20 is an exploded perspective view exemplifying a driving unit related to the developing operation of the process cartridge B. FIG. 21 is a schematic cross-sectional view of the process cartridge B according to an example of the present invention, and indicates a cross section parallel with the Y axis and the Z axis passing through the center of the replenishing port 21*c*.

As mentioned above, toner is supplied (replenished) from the toner cartridge C to the process cartridge B. Specifically, as illustrated in FIGS. 19A and 19B, the stay 21 has a replenishing port 21*c* (receiving port) to receive toner supplied from the toner cartridge C. The toner received through the toner replenishing port 21*c* is conveyed to the toner receiving chamber 153 of the developing unit 15 via the transfer port 21*d* and a receiving port 153*a*. The toner replenished to the toner receiving chamber 153 is replenished by a receiving chamber conveying member 153*b* from a developer storing chamber receiving port 152*a* to the developer storing unit 152. A receiving port seal member 153*c* is attached around the receiving port 153*a* to seal the transfer port 21*d* and the receiving port 153*a* on the stay 21 without creating a gap, so that toner does not leak.

Further, as illustrated in FIG. 20, in the process cartridge B, a developing coupling 155 is disposed in the developing unit 15 as a driving input member to receiving driving force from the printer main body A. The developing coupling 155 according to this example can transfer the rotating force to, for example, a developing roller gear 16*a* to transfer the rotating force to the developing roller 16, and a stirring gear 154*a* to transfer the rotating force to the stirring member 154, as mentioned above.

In the rotation shaft line 11*b* direction of the photosensitive drum 11, a developing contact 16*b* and a developing blade contact 18*a* are disposed respectively at the edge on the opposite side of the developing coupling 155. The developing contact 16*b* is a member (power supply member) to which voltage, to be applied from the printer main body A to the developing roller 16, is supplied. The developing blade contact 18*a* is a member (power supply member) to which voltage, to be applied from the printer main body A to the developing blade 18, is supplied.

Further, as illustrated in FIG. 21, the replenishing port 21*c* of the process cartridge B is disposed closer to the developing coupling 155 than the developing contact 16*b* in the longitudinal direction (left and right direction in FIG. 21) of the process cartridge B. The toner replenished from the replenishing port 21*c* is conveyed in a direction departing from the developing coupling 155, and is then conveyed to the developing unit 15. Because of this configuration, in the process cartridge B according to an example of the present invention, toner is conveyed in a direction departing from the developing coupling 155, hence soiling of the developing coupling 155 by the toner can be prevented. In the process cartridge B, the replenishing port 21*c* of the toner is disposed at a position distant from the developing contact 16*b*, hence soiling of the developing contact 16*b* by the toner can be prevented.

The functions, materials, shapes and the like of the components described in this example and relative positions thereof are not intended to limit the scope of the invention thereto, unless otherwise specified. For example, in the example described above, the shutter member 34, disposed in the toner cartridge C, can rotate around the rotation shaft R3, but the present invention is not limited to this. For example, if the components of the conveying direction and the discharging direction of the toner in the shutter member 34 are the same components of the direction of the example described above, the shutter member 34 may be configured to not rotate. In this case, the opening of the discharging port 34*a* of the shutter member 34 is disposed so as to face the opening of the replenishing port 21*c* disposed in the process cartridge B. Further, in this case, at one end (first end) of the shaft line G, the pump screw coupling portion 39*a* is engaged with the coupling on the printer main body A side, and the opening of the discharging port 34*a* faces the other end (second end).

Cleaning Operation of Toner Discharging Port and Replenishing Port

The cleaning operation (second operation) will now be described in detail with reference to FIGS. 1, 30 and 32. FIGS. 1A to 1D are schematic cross-sectional views of the process cartridge B and the toner supply unit of the toner cartridge C, and FIG. 32 is a side view of the toner cartridge C from the driving side in a state where the driving side toner cartridge side cover 50 is removed.

Figures 1A, 1B, 1C, 1D:
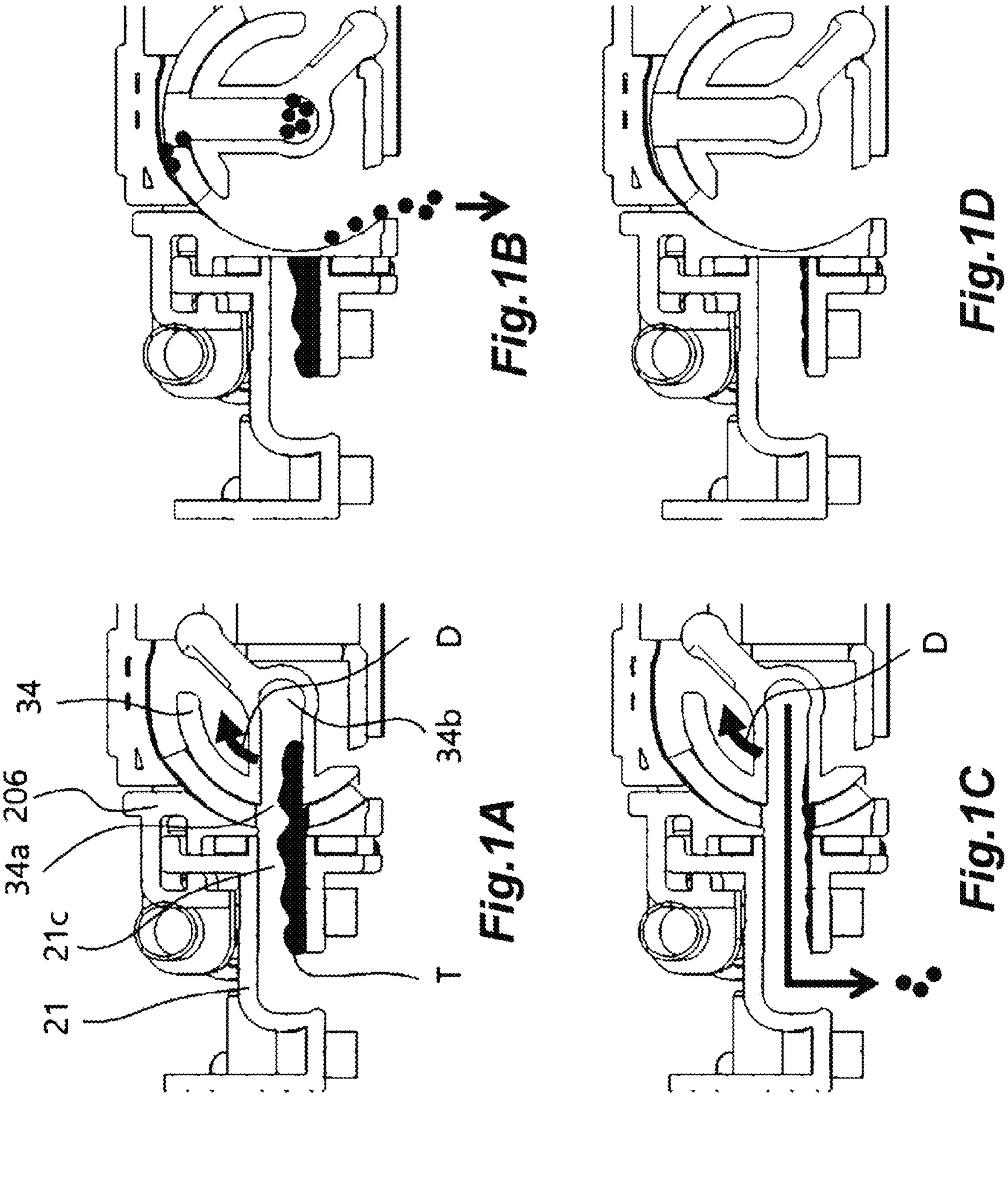
FIGS. 1A to 1D are schematic cross-sectional views of a toner cartridge and an area around a replenishing port of the toner cartridge according to an embodiment of the present invention.

In some cases where toner is supplied from the toner cartridge C to the process cartridge B using the above mentioned configuration, toner T may remain in the discharging port 34*a*, the conveying portion 34*b* of the toner cartridge C, and the replenishing port 21*c* of the process cartridge B, as illustrated in FIG. 1A. If the toner cartridge C is detached in this state, toner may drop when the shutter member 34 rotates in the arrow D direction, as illustrated in FIG. 1B. A purpose of the cleaning operation is to minimize the amount of toner remaining in these portions after the supply operation.

The cleaning operation for the discharging port 34*a* and the replenishing port 21*c* is performed by rotating the main body pump motor 230 (FIG. 30), which rotates the main body pump coupling 110, for a predetermined time in the reverse-rotating direction (second rotating direction), which is the opposite to the first rotating direction when the toner is replenished (direction during replenishing operation). In this cleaning operation, the main body stirring coupling 113 is stopped.

By reverse-rotating of the main body pump coupling 110, the pump screw driving input unit 39 is rotated in the rotation direction (arrow W direction in FIG. 32) that is opposite to the direction during supplying the toner, and the screw driving gear 61 and the conveying screw 35 are rotated in the rotating direction (arrow N direction in FIG. 32) that is opposite to the direction during replenishing the toner. Therefore, by the conveying force of the conveying screw 35, the toner in the toner containing portion 31*a*1 and the leveling portion 33*a*1 is conveyed in the direction toward the toner storing chamber 30*a* (arrow Z2 direction in FIG. 10).

On the other hand, by the rotation of the pump screw driving input unit 39, the cam gear 37*b* is rotated in a direction (arrow U direction in FIG. 32) that is opposite to the direction during replenishing the toner, and the link arm 37*c* is reciprocated, whereby the pump 37*a* expands and contracts in the same manner as the time of replenishing the toner. As mentioned above, air is supplied to the discharging port 34*a* by the expansion and contraction of the pump 37*a*. In other words, the pump 37*a* is configured to supply air from the discharging port 34*a* toward the replenishing port 21*c* via the toner containing portion 31*a*1, regardless of whether the main body pump motor 230 is rotated in the first rotating direction or the second rotating direction. By the pump 37*a* repeating expansion and contraction in a state where the toner is not supplied (conveyed) to the toner containing portion 31*a*1 (FIG. 7) by the conveying screw 35 (second state), the amount of toner contained in the air sent from the discharging port 34*a* gradually decreases, and finally only air passes through the discharging port 34*a*. The cleaning operation is an operation where the conveying screw 35 does not convey toner from the toner storing chamber 30*a* to the toner containing portion 31*a*1, and the pump 37*a* sends air from the discharging port 34*a* toward the replenishing port 21*c* via the toner containing portion 31*a*1.

Furthermore, by the air passing through the discharging port 34*a*, the toner remaining in the discharging port 34*a*, the conveying portion 34*b* and the replenishing port 21*c* is sent to the developer storing unit 152 of the process cartridge. As illustrated in FIGS. 1C and 1D, the amount of toner which dropped from the discharging port 34*a* and the replenishing port 21*c* during attaching and detaching the toner cartridge C can be decreased by minimizing the amount of toner remaining in these areas.

Here in the cleaning operation, conveying toner from the toner storing chamber 30*a* to the toner containing portion 31*a*1 is stopped by rotating the conveying screw 35 in the reverse direction of the direction of the replenishing operation, but the present invention is not limited to this, and the conveying screw 35 may be stopped during the reverse rotation by disposing a one-way clutch (not illustrated) in the screw driving gear 61, for example.

Further, when the rotation speed, during the supply operation by the main body pump coupling, is A, and the rotation speed in the reverse rotation during cleaning operation is B, A>B is established here in the setting. The number of rotation per unit time of the main body pump motor 230 is set such that the value is higher when the cleaning operation is executed than when the replenishing operation is executed. Thereby the cycle of expansion and contraction of the pump 37*a* becomes shorter when the cleaning operation is executed than when the replenishing operation is executed, so that the flow rate of the air passing through the discharging port 34*a* increases when the cleaning operation is executed, further decreasing the remaining toner. The time required for the cleaning operation can also be decreased.

Execution Timing of Cleaning Operation

FIG. 33 is a functional block diagram indicating a functional configuration of this example. Here a timing of executing the cleaning operation will be described. When the engine control unit 302 executes the cleaning operation, a small amount of toner is supplied from the discharging port 34*a* to the developer storing unit 152 via the replenishing port 21*c* when operation starts. It is preferable to execute the cleaning operation during printing operation where the stirring member 154 (FIG. 4) of the process cartridge is rotating, so that the supplying of the toner is not interrupted by the stirring member 154. The printing operation here includes the pre-rotation operation and the post-rotation operation which are required before and after forming an image. Generally, the pre-rotation operation is performed for heating the fixing unit 105 to a predetermined temperature, and the post-rotation operation is performed to deliver the sheet S after forming an image. The cleaning operation may also be executed during the replenishing operation when operation is stopped due to an error or the like. The cleaning operation may be executed every time immediately after executing the replenishing operation.

Thereby the cleaning operation has been completed at a timing when the user is likely to attach and detach the toner cartridge C, and leaking of toner from the discharging port 34*a* can be prevented during attaching and detaching the toner cartridge C.

Functional Block Diagrams

FIG. 33 is a functional block diagram indicating a functional configuration of this example. When the controller 301 instructs printing to the engine control unit 302 (control unit), a paper conveying control unit 330 feeds paper and conveys the paper to the image forming unit, the fixing unit, and the delivery tray. An image forming control unit 320 forms an image and a fixing control unit 310 performs fixing control. The paper on which the image is formed and fixed is discharged to the delivery tray.

A toner replenishing control unit 340 drives the stirring motor 220 and rotates the main body pump motor 230 in a first direction, whereby the replenishing operation, to supply (replenish) toner from the toner cartridge C to the process cartridge B, is executed.

A cartridge cleaning control unit 350 executes the cleaning operation to clean the discharging port 34*a* and the replenishing port 21*c* by rotating the main body pump motor 230 in a second rotation direction in a case where a cleaning operation execution determining unit 351 determines that the cleaning operation is executed. The cleaning operation execution determining unit 351 determines whether the cleaning operation is executed based on such conditions as the execution count of the cleaning operation, when an abnormality is detected, when it is determined to shut off the power supply to the image forming unit of the image forming apparatus, or when the replenishing operation is completed. A cleaning operation execution count storing unit 352 (storage unit) stores a number of times when the cleaning operation was executed. A cleaning state storing unit 353 is means for storing the cleaning states of the discharging port 34*a* and the replenishing port 21*c*, and stores: a cleaned state (cleaning is completed); an initial replenishing state (replenishing toner is started in the cleaned state); a stable replenishing state (predetermine time passed since start of replenishing toner); and a cleaning progressing state (from start of cleaning to completion of cleaning).

A toner residual amount detecting control unit 360 detects the residual amount of the toner in the developer storing unit 152 using the residual amount detecting unit 231. An abnormality detecting control unit 370 (abnormality detecting unit) detects an abnormality of the image forming apparatus. In this example, the generation of a paper jam (jam), caused by the conveying roller or the like while the paper is being conveyed, is detected. A power supply control unit 380 starts up the power when the image forming apparatus is turned ON, or shuts off the power of the image forming apparatus when the image forming apparatus is turned OFF, or when energy saving mode is specified.

In this example, the type of abnormality of the image forming apparatus is a jam. If a jam is generated, the cartridge is detached to remove the paper jammed inside the image forming apparatus. This is because inside the image forming apparatus may be soiled at this time. However, the type of abnormality may be other than a jam. In particular, it is preferable to consider any type of abnormality that may require detaching the toner cartridge to determine whether the cleaning operation is executed.

Flow Chart

Figure 34:
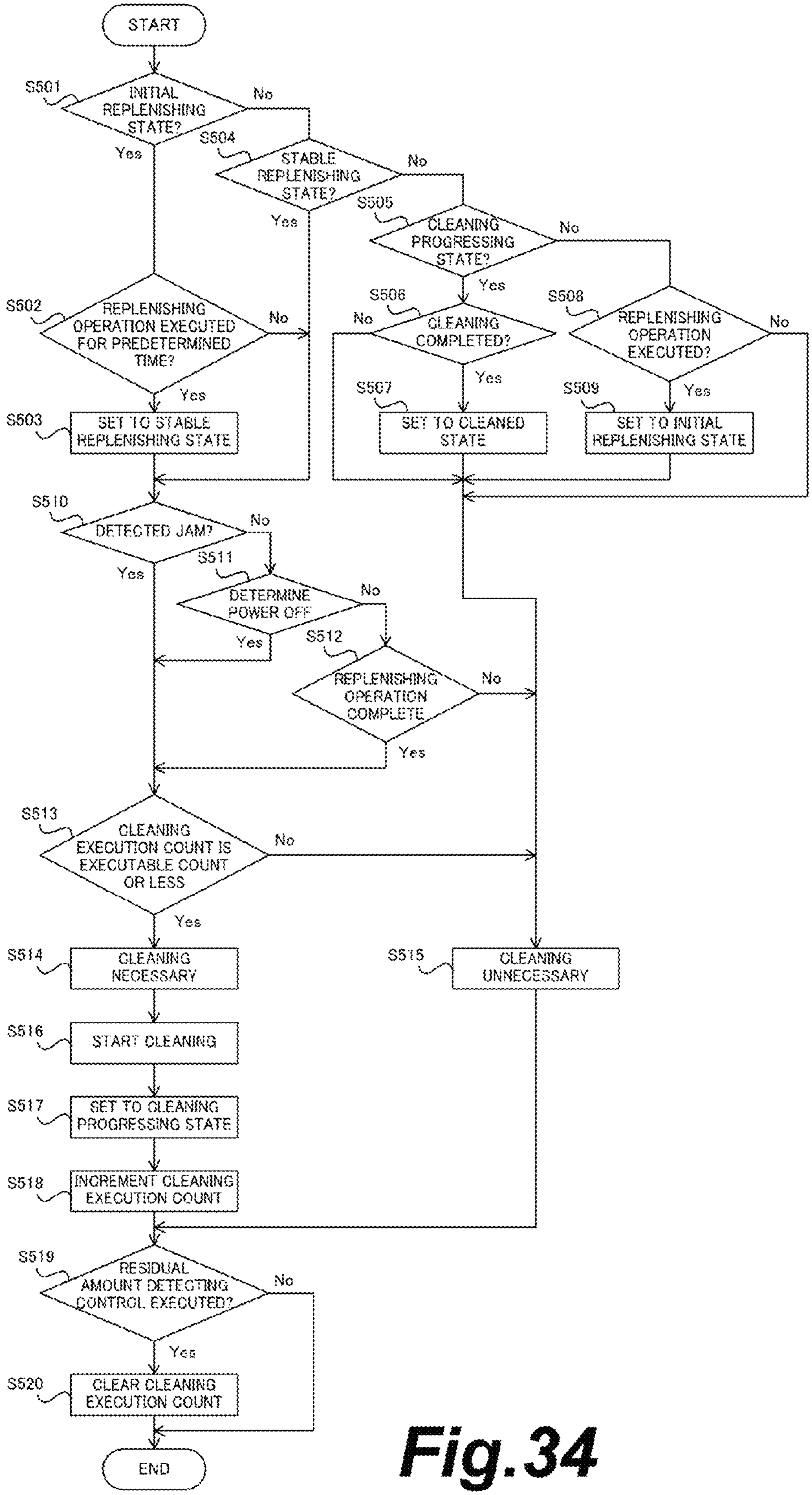
FIG. 34 is a flow chart of cartridge cleaning control according to an example of the present invention.

FIG. 34 is a flow chart on the control of the cartridge cleaning control unit 350. For the cartridge cleaning control unit 350, control of the cleaning state storing unit 353, control to determine the execution of the cleaning, and control of the cleaning operation execution count storing unit 352 will be described.

The control of the cleaning state storing unit 353 will be described. As indicated in the block diagram in FIG. 33, the cleaning state storing unit 353 stores the cleaned state, the initial replenishing state, the stable replenishing state, and the cleaning progressing state. In the case where the cleaning state storing unit 353 is in the initial replenishing state (S501), it is checked whether a predetermined time has elapsed since the replenishing operation started in the cleaned state (S502). When the replenishing operation is executed for a predetermined time, toner is supplied to the discharging port 34*a*, the conveying portion 34*b* of the toner cartridge C, and the replenishing port 21*c* of the process cartridge B, and toner starts to be replenished stably, hence the cleaning state storing unit 353 is set to the stable replenishing state (S503). In a case where the cleaning state storing unit 353 is in the initial replenishing state and the stable replenishing state (S504), if the cleaning operation started in S516, the cleaning state storing unit 353 is set to the cleaning progressing state (S517). In the case where the cleaning state storing unit 353 is in the cleaning progressing state (S505), if cleaning completes (S506), the cleaning state storing unit 353 is set to the cleaned state (S507). In the case where the cleaning state storing unit 353 is not the cleaning progressing state in S505, this means that the cleaning state storing unit 353 is in the cleaned state. And in the case where the replenishing operation is executed (S508), the cleaning state storing unit 353 is set to the initial replenishing state (S509).

The control of determining execution of the cleaning will be described next. In the case where the cleaning state storing unit 353 is in the initial state and a jam is detected in the stable replenishing state (S510), in the case where shutting power off is determined (S511), in the case where the replenishing operation completes (S512), or in the case where the cleaning execution count is less than the executable count (predetermined count) (S513), it is determined that execution of cleaning is necessary (S514). Otherwise, it is determined that execution of cleaning is unnecessary (S515). In the case where the cleaning state storing unit 353 is in the cleaning progressing state or cleaned state, it is determined that execution of cleaning is unnecessary, since cleaning is currently in progress or completed (S515). To determine the necessity of the cleaning operation, it is determined whether or not the cleaning execution count is the executable count or less (S513), and the necessity of cleaning is determined based on the result. When the cleaning operation is executed (S516), the cleaning state storing unit 353 is set to the cleaning progressing state (S517), and the cleaning execution count is incremented (S518). When the toner residual amount detection is executed (S519), the cleaning execution count is cleared (S520).

The cleaning operation execution count storing unit 352 used for the determination in S513 will be described. In the case of replenishing toner when the cleaning state storing unit 353 is in the stable replenishing state, toner is being supplied to the discharging port 34*a*, the conveying portion 34*b* of the toner cartridge C, and the replenishing port 21*c* of the process cartridge B, hence if the main body pump motor 230 is driven, toner is immediately supplied to the process cartridge B. In the case of replenishing toner in the cleaned state, on the other hand, the toner amount is insufficient in the discharging port 34*a*, the conveying portion 34*b* of the toner cartridge C, and the replenishing port 21*c* of the process cartridge B, hence even if the main body pump motor 230 is driven, it takes time until toner is stably supplied to the process cartridge B. This means that in the case where cleaning is executed, the toner replenishing amount becomes more unstable compared with the case where cleaning is not performed. There is no problem if the toner residual amount detecting control unit 360 is constantly detecting the toner residual amount for the process cartridge B, but if the toner residual amount is not constantly detected and the cleaning operation is executed after executing the toner residual amount detection, the toner amount, replenished in the period when the cleaning state storing unit 353, is in the initial replenishing state and varies, and becomes unstable in the replenishment after the cleaning.

In this example, the toner amount when the toner is replenished in the cleaned state is 0.5 g less than the toner amount when the toner is replenished in the non-cleaned state, and in the case where the toner is replenished to the process cartridge B, an allowable insufficiency of the actually supplied toner, with respect to the estimated amount, is set to 1 g, and the allowable execution count is set to 2 times.

In this example, the allowable execution count is 2 times, but the allowable execution count may be changed in accordance with the difference of the toner amount in the case of replenishment in the cleaned state, and the toner amount in the case of replenishment in the non-cleaned state, or in the case where the cleaning state storing unit 353 is interrupted in the initial replenishing state or cleaning progressing state, the allowable execution count may be changed in accordance with the interruptive state.

In a case where the cleaning execution count exceeds the executable count and it is therefore determined that cleaning is not executed, the toner residual amount detection control may be performed to reset the cleaning execution count.

According to the present disclosure, an image forming apparatus having a function to clean toner in an area around the discharging port of the toner cartridge can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-215718, filed on Dec. 21, 2023, which is hereby incorporated by reference herein in its entirety.

What is claimed is:

1. An image forming apparatus comprising: a toner cartridge; an apparatus main body from which the toner cartridge is detachable; and an air supply unit,
- wherein the toner cartridge includes:
  - a first chamber storing toner;
  - a discharging port through which the toner in the first chamber is discharged to an outside of the toner cartridge;
  - a second chamber communicated with the discharging port and provided closer to the discharging port than the first chamber is; and
  - a conveying member conveying the toner in the first chamber toward the second chamber by a rotation of the conveying member,
- wherein the apparatus main body includes:
  - a toner storing unit provided with a receiving port for receiving toner discharged from the discharging port and storing toner; and
  - a control unit,
- wherein the air supply unit supplies air such that the toner in the second chamber is conveyed from the discharging port toward the receiving port, and
- wherein the control unit is configured to execute:
  - a first operation in which the conveying member conveys toner from the first chamber toward the second chamber, and the air supply unit supplies air from the discharging port toward the receiving port through the second chamber, and
  - a second operation in which the conveying member does not convey toner from the first chamber toward the second chamber, and the air supply unit supplies air from the discharging port toward the receiving port through the second chamber.

2. The image forming apparatus according to claim 1, wherein in the second operation, the conveying member is rotated in a direction in which the toner is conveyed from the second chamber to the first chamber.

3. The image forming apparatus according to claim 1, wherein in the second operation, the rotation of the conveying member is stopped.

4. The image forming apparatus according to claim 2,
- wherein the air supply unit includes a pump generating air by expansion and contraction of the pump and a rotatable cam expanding and contracting the pump by a rotation of the rotatable cam,
- wherein the apparatus main body includes a motor for driving the conveying member and the cam and rotatable in a first rotating direction and a second rotating direction opposite to the first rotating direction,
- wherein the conveying member is configured to rotate in a direction in which the toner is conveyed from the first chamber toward the second chamber in a case where the motor is rotated in the first rotating direction, and to rotate in a direction in which the toner is conveyed from the second chamber toward the first chamber in a case where the motor is rotated in the second rotating direction,
- wherein the air supply unit is configured to supply air from the discharging port toward the receiving port through the second chamber in a case where the motor is rotated in the first rotating direction and the second rotating direction, and
- wherein the control unit controls such that the motor is rotated in the first rotating direction in the first operation and the motor is rotated in the second rotating direction in the second operation.

5. The image forming apparatus according to claim 4, wherein the number of rotations of the motor per unit time is higher in the second operation than in the first operation.

6. The image forming apparatus according to claim 1, wherein
- the air supply unit is an expandable and contractable pump, and
- a cycle of expansion and contraction of the pump is shorter in the second operation than in the first operation.

7. The image forming apparatus according to claim 1, wherein
- the apparatus main body includes an abnormality detecting unit detecting an abnormality of the image forming apparatus, and
- the control unit executes the second operation based on detection of an abnormality by the abnormality detecting unit.

8. The image forming apparatus according to claim 1,
- wherein the apparatus main body includes a storage unit storing a count of executing the second operation, and an abnormality detecting unit detecting an abnormality of the image forming apparatus, and
- wherein in a case where the count is less than a predetermined count, the control unit executes the second operation based on detection of an abnormality by the abnormality detecting unit, and in a case where the count is higher than the predetermined count, the control unit does not execute the second operation based on detection of an abnormality by the abnormality detecting unit.

9. The image forming apparatus according to claim 1, wherein based on determination that power supply to the image forming apparatus is shut off, the control unit executes the second operation before the power supply is shut off.

10. The image forming apparatus according to claim 1, wherein the apparatus main body includes a storage unit storing a count of executing the second operation, and wherein in a case where the count is less than a predetermined count, the control unit executes the second operation based on determination that power supply to the image forming apparatus is shut off, and in a case where the count is higher than the predetermined count, the control unit does not execute the second operation before the power supply is shut off, based on determination that the power supply to the image forming apparatus is shut off.

11. The image forming apparatus according to claim 1, wherein the apparatus main body includes: an image forming unit forming an image on a recording material; a conveying roller conveying a recording material to the image forming unit; a conveying path on which a recording material conveyed by the conveying roller passes; and a jam detecting unit detecting a jam of a recording material on the conveying path, and wherein the control unit executes the second operation based on detection of a jam of a recording material by the jam detecting unit.

12. The image forming apparatus according to claim 1, wherein the apparatus main body includes: a storage unit storing a count of executing the second operation; an image forming unit forming an image on a recording material; a conveying roller conveying a recording material to the image forming unit; a conveying path on which a recording material conveyed by the conveying roller passes; and a jam detecting unit detecting a jam of a recording material on the conveying path, and wherein in a case where the count is less than a predetermined count, the control unit executes the second operation based on detection of a jam of a recording material by the jam detecting unit, and in a case where the count is higher than the predetermined count, the control unit does not execute the second operation based on detection of a jam of a recording material by the jam detecting unit.

13. The image forming apparatus according to claim 1, wherein the control unit executes the second operation immediately after executing the first operation.

14. The image forming apparatus according to claim 1, wherein the air supply unit is provided in the toner cartridge.

* * * * *